US011978424B2

(12) United States Patent
Elkayam et al.

(10) Patent No.: US 11,978,424 B2
(45) Date of Patent: May 7, 2024

(54) MODULAR STRING INSTRUMENT

(71) Applicant: BOAZ INNOVATIVE STRINGED INSTRUMENTS LTD., Aloney HaBashan (IL)

(72) Inventors: Boaz Elkayam, Aloney HaBashan (IL); Gilad Ben-Tsur, Gan Ner (IL)

(73) Assignee: .BOAZ INNOVATIVE STRINGED INSTRUMENTS LTD, Aloney HaBashan (IL)

( * ) Notice: Subject to any disclaimer, the term of this patent is extended or adjusted under 35 U.S.C. 154(b) by 456 days.

(21) Appl. No.: 17/292,725

(22) PCT Filed: Nov. 14, 2019

(86) PCT No.: PCT/IL2019/051241
§ 371 (c)(1),
(2) Date: May 11, 2021

(87) PCT Pub. No.: WO2020/100141
PCT Pub. Date: May 22, 2020

(65) Prior Publication Data

US 2021/0398510 A1 Dec. 23, 2021

Related U.S. Application Data

(60) Provisional application No. 62/767,539, filed on Nov. 15, 2018.

(51) Int. Cl.

*G10D 1/08* (2006.01)
*G10D 3/04* (2020.01)
(Continued)

(52) U.S. Cl.
CPC ............... *G10D 1/085* (2013.01); *G10D 3/04* (2013.01); *G10D 3/095* (2020.02); *G10D 3/12* (2013.01);
(Continued)

(58) Field of Classification Search
CPC .......... G10D 1/085; G10D 3/095; G10D 3/22; G10D 3/04; G10D 3/12; G10D 3/14; G10G 5/00; G10H 3/181; G10H 2220/461
(Continued)

(56) References Cited

U.S. PATENT DOCUMENTS

| | | | | |
|---|---|---|---|---|
| 4,254,683 A * | 3/1981 | Nulman | G10H 3/183 | 84/727 |
| 4,359,923 A * | 11/1982 | Brunet | G10D 1/085 | 984/107 |

(Continued)

FOREIGN PATENT DOCUMENTS

| | | | |
|---|---|---|---|
| DE | 202009004266 U1 * | 8/2009 | G10D 1/085 |
| EP | 3435367 A2 * | 1/2019 | G10D 1/00 |

(Continued)

*Primary Examiner* — Christina M Schreiber
(74) *Attorney, Agent, or Firm* — SOROKER AGMON NORDMAN RIBA

(57) ABSTRACT

Provided is a modular string instrument including a core string instrument and interchangeable instrument body types. The core including: a core shell forming a basic shape of the core string instrument, a string instrument head, a neck base, a chassis assembly configured to be inserted into the core shell, extending from the head to the neck base and comprising a strings anchoring bridge, a plastic fret board configured to have frets attached thereon, the fret board configured to cover the core shell and to encase the chassis assembly within the core shell, a neck base cover configured to be attached to the neck base, a pickup cassette bay configured to encase an interchangeable pickup cassette, and strings stretched from the bridge over the pickup cassette bay, over the neck base to the head.

15 Claims, 45 Drawing Sheets

(51) Int. Cl.
*G10D 3/095* (2020.01)
*G10D 3/12* (2020.01)
*G10D 3/14* (2020.01)
*G10D 3/22* (2020.01)
*G10G 5/00* (2006.01)
*G10H 3/18* (2006.01)

(52) U.S. Cl.
CPC ................. *G10D 3/14* (2013.01); *G10D 3/22* (2020.02); *G10G 5/00* (2013.01); *G10H 3/181* (2013.01); *G10H 2220/461* (2013.01)

(58) Field of Classification Search
USPC ............................................................ 84/723
See application file for complete search history.

(56) References Cited

U.S. PATENT DOCUMENTS 4,829,870 A * 5/1989 Ralston .................. G10D 1/085 984/107
5,421,233 A * 6/1995 Bunker .................... G10D 1/08 84/293
5,637,823 A * 6/1997 Dodge ..................... G10H 3/18 84/743
5,911,168 A * 6/1999 Enserink ................ G10D 1/085 264/258
5,929,362 A * 7/1999 Oteyza ..................... G10H 3/18 84/723
5,945,614 A * 8/1999 White ...................... G10D 1/08 84/293
5,994,633 A * 11/1999 Norton ................... G10D 1/085 84/723
6,025,548 A * 2/2000 Ehrlich .................... G10D 3/00 84/293
6,043,422 A * 3/2000 Chapman ................. G10H 3/18 84/723
6,188,005 B1 * 2/2001 White ...................... G10D 1/08 84/293
6,194,644 B1 * 2/2001 Hendrickson .......... G10D 1/085 84/723
6,653,538 B1 * 11/2003 Wells ....................... G10D 3/02 84/290
6,911,590 B2 * 6/2005 Childress ............... G10D 3/095 84/293
8,975,502 B1 * 3/2015 Delgado .................. G10H 3/18 84/723
11,120,776 B2 * 9/2021 Spangler .................. G10D 3/12
11,158,293 B1 * 10/2021 Milligan .................. G10D 3/04
11,176,912 B1 * 11/2021 Moon ...................... G10D 3/22
2002/0104424 A1 * 8/2002 Spalt ...................... G10D 1/085 84/291
2003/0070528 A1 * 4/2003 Davis ..................... G10D 1/085 84/291
2003/0164080 A1 * 9/2003 Childress ............... G10D 3/095 84/291
2005/0211051 A1 * 9/2005 Petersen ................ G10D 1/085 84/290
2006/0123971 A1 * 6/2006 Moghaddam .......... G10D 1/085 84/290
2016/0019870 A1 * 1/2016 Park ....................... G10D 1/085 84/291
2018/0025705 A1 * 1/2018 Oberg ...................... G10D 1/00 84/731
2019/0237047 A1 * 8/2019 Reddick ................... G10D 3/12
2020/0365119 A1 * 11/2020 Reddick ................... G10H 1/32
2021/0287635 A1 * 9/2021 Maisler .................... G10H 1/32
2021/0390930 A1 * 12/2021 Singh ....................... G10D 3/14
2021/0398510 A1 * 12/2021 Elkayam .................. G10D 3/12
2022/0262333 A1 * 8/2022 Edwards ................ G10D 1/085
2023/0162711 A1 * 5/2023 Suda ........................ G10D 3/12 84/291
2023/0222996 A1 * 7/2023 Singh ....................... G10D 3/12 84/297 R

FOREIGN PATENT DOCUMENTS

JP 2018028639 A * 2/2018
JP 6809694 B2 * 1/2021
WO 2016139658 A1 9/2016
WO WO-2016139658 A1 * 9/2016

* cited by examiner

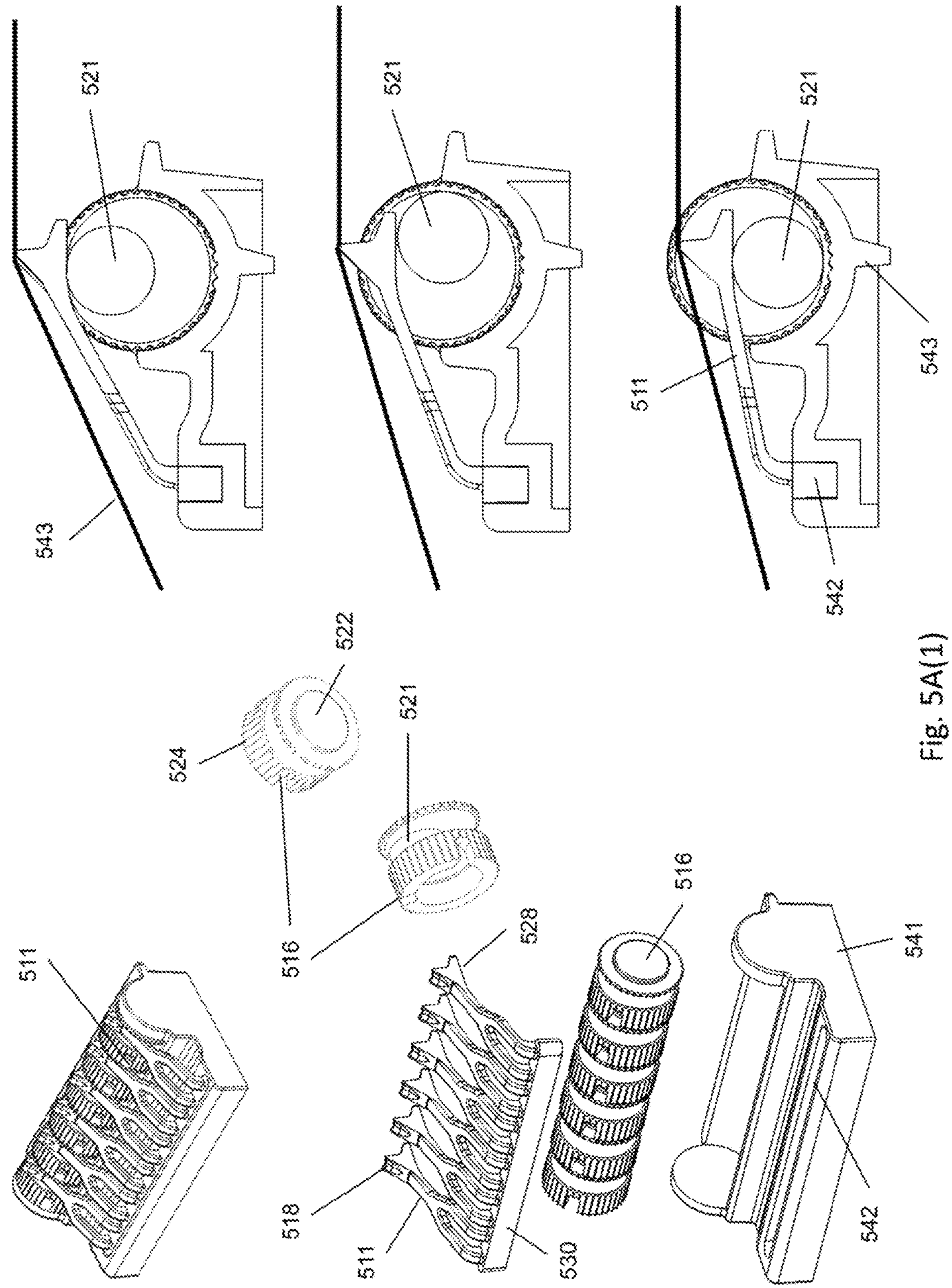
Fig. 5A(1)

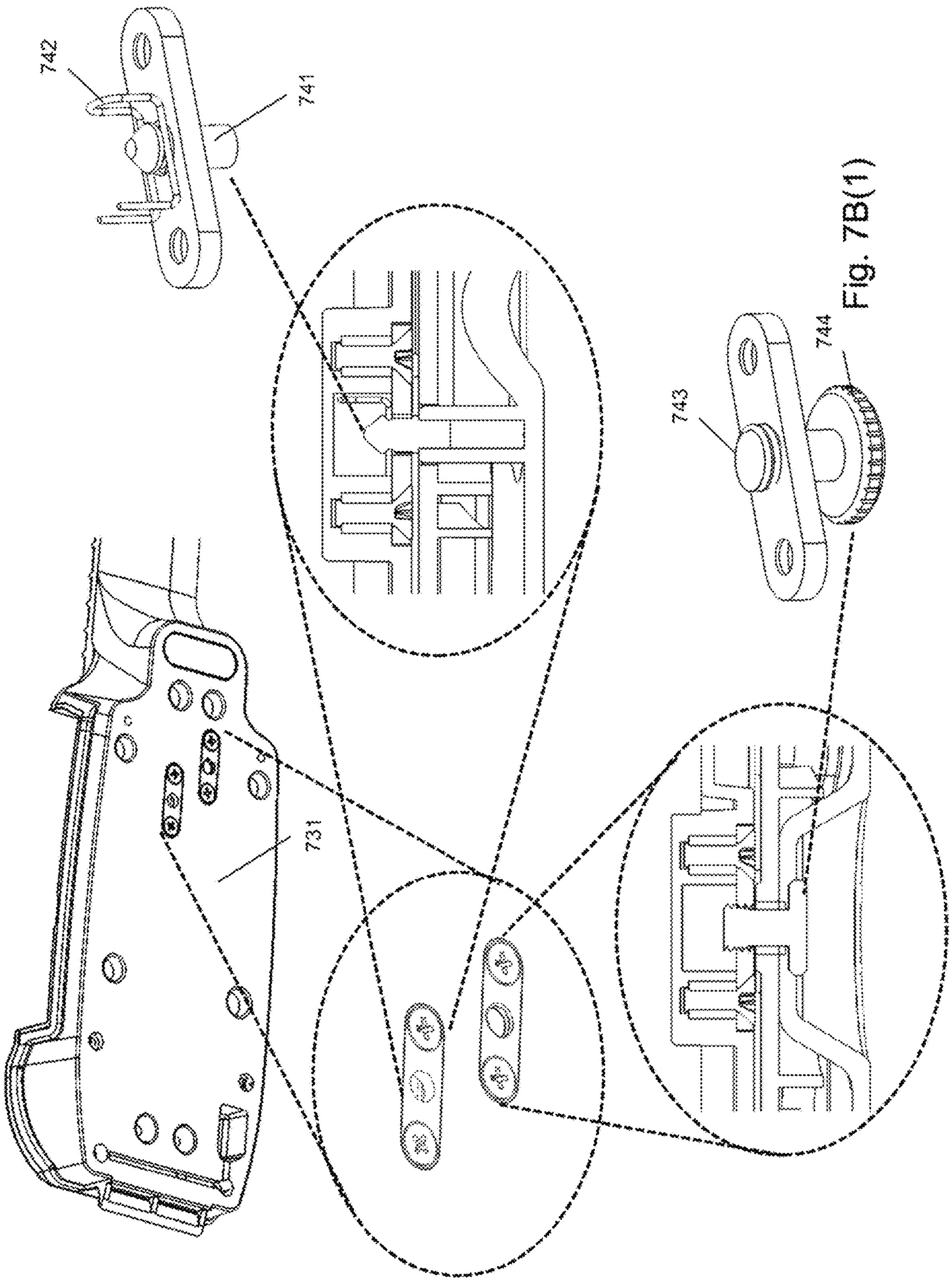
Fig. 7B(1)

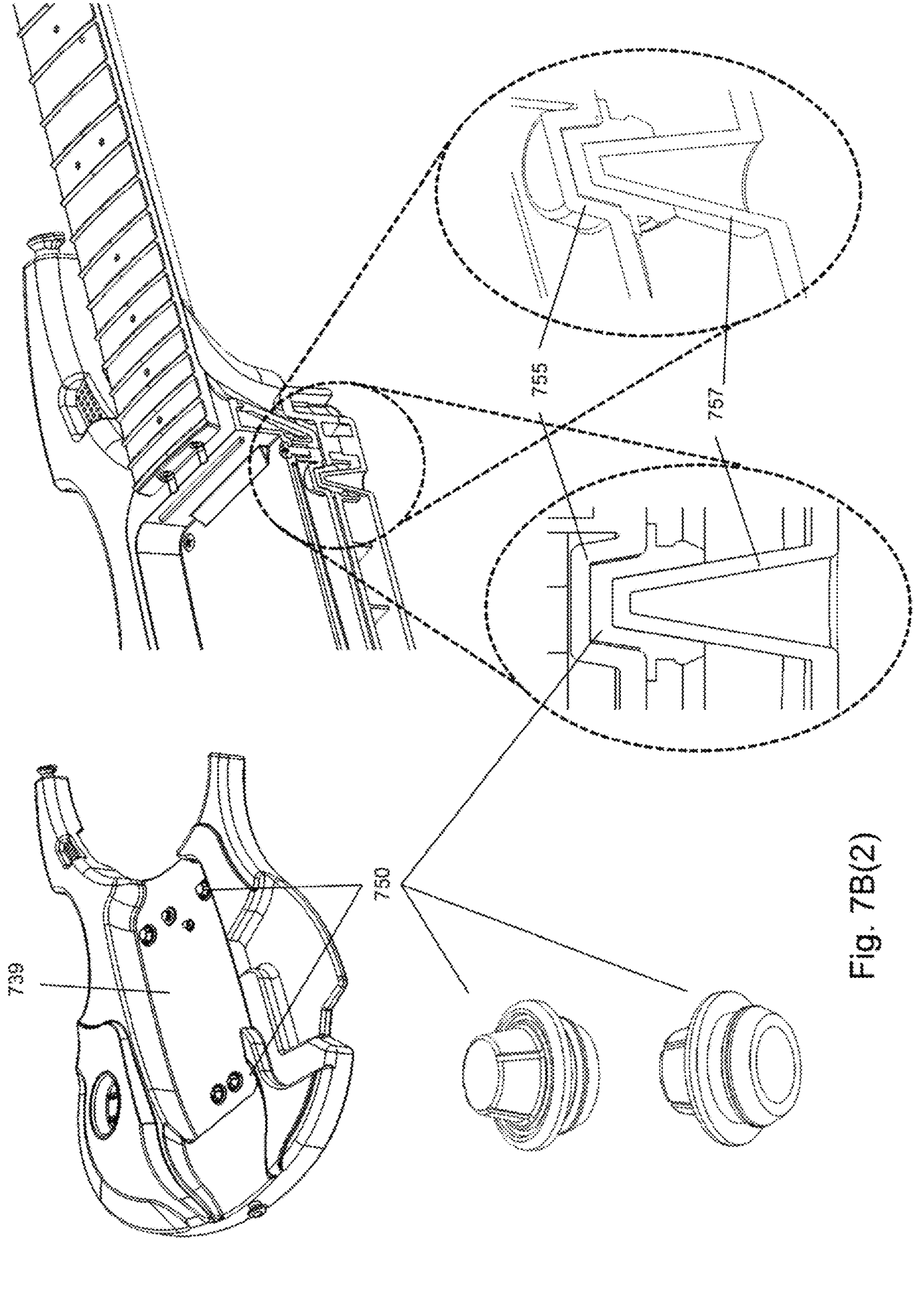
Fig. 7B(2)

MODULAR STRING INSTRUMENT

TECHNICAL FIELD

The present disclosure relates to a modular string instrument and method for its manufacturing, integration, and adjusting.

BACKGROUND

Electric guitars are one type of a string instrument, which is a very popular instrument used by amateur and professional musicians.

As the player becomes more advanced, his needs and requirements may change. To meet the new need, the player has to purchase a new instrument, which is costly.

Alternatively, the player may modify the old instrument to meet the new need. Such modifications require special skills and tools and are usually done by a professional repair shop at high cost.

Additionally, tuning and adjusting the Action and Intonation has to be done at some time intervals, or whenever the strings are replaced, specifically with a different type of strings.

SUMMARY

There is thus a need for a modular string instrument, e.g., an electric guitar that the player himself can upgrade, modify, tune and adjust, at his house or on the road, without the need of special tools or skills.

One aspect of the current disclosure provides an expandable and upgradable modular string instrument, e.g., an electric guitar allowing the player to modify the string instrument, e.g., a guitar by adding, removing or exchanging parts without using tools or requiring special skills.

For example, different pickup types may be provided in interchangeable pickup drawer of such a modular electric guitar.

For example, different body types and styles may be provided as interchangeable units.

Another aspect of the current disclosure is to provide a modular electric guitar which is low cost to manufacture, repair (by replacing defective pans) and upgrade.

Another aspect of the current disclosure is to provide a bridge system that allows the player to adjust the Action of individual strings without using special tools or requiring special skills.

Another aspect of the current disclosure is to provide a bridge system that allows the player to adjust both the Action and Intonation of individual strings without using special tools or requiring special skills.

Another aspect of the current disclosure is to provide a modular electric guitar having retractable kickstand enabling to have it securely stand on the floor when not in use.

Yet another aspect of the current disclosure is to provide a modular electric guitar having means to suppress rattling of its components while it is played.

According to some embodiments, there is provided a modular string instrument comprising:

a core string instrument which may comprise:

- a core shell forming a basic shape of the core string instrument;
- a string instrument head connected to the core shell on a proximal end of the core shell;

- a neck base connected to the core shell on a distal end of the core shell;
- a chassis assembly configured to be inserted into the core shell, extending from the head to the neck base, the chassis comprising a strings anchoring bridge at the distal end of the chassis assembly to be positioned at the neck base;
- a plastic fret board configured to have frets attached thereon, the fret board configured to cover the core shell and to encase the chassis assembly within the core shell;
- a neck base cover configured to be attached to the neck base;
- a pickup cassette bay configured to encase an interchangeable pickup cassette; and
- strings stretched from the bridge over the pickup cassette bay, over the neck base to the head.

According to some embodiments, the core shell may be made of plastic, the chassis assembly may be made of metal and liquid resin may be inserted into gaps between the fret hoard and the core shell for holding the metal chassis assembly in place, providing the core string instrument additional rigidity and weight, and preventing anti-resonances and rattling of the components of the modular string instrument.

In some embodiments, the core string instrument may be configured to enable easy assembly or disassembly of the core string instrument into or out of different interchangeable string instrument body types without the need for special tools.

In some embodiments, the pickup cassette bay may be configured to enable easy insertion or extraction of different interchangeable pickup cassettes into or out of the pickup cassette bay, without the need for special tools.

In some embodiments, the strings anchoring bridge may be configured to enable easy adjustment of the Action and Intonation of individual strings without using special tools.

In some embodiments, the modular string instrument may further comprise a retractable kickstand to enable the modular string instrument to securely stand on the floor when not in use.

In some embodiments, the modular string instrument may further comprise means to suppress rattling of its components while in use.

In some embodiments, the bridge may comprise an intonation comb comprising a plurality of leg members each connected to one of a plurality of string cradles; and

- an actuator assembly comprising a plurality of action wheels that are able to rotate such that each action wheel causes the end of each leg member to move up or down, thereby to control intonation.

In some embodiments, the intonation comb may be selected from different intonation combs each having different lengths of leg members and different heights of the string cradles in order to change the intonation of the modular string instrument.

In some embodiments, each of the action wheels may be inserted into a wheel cradle, each wheel cradle comprising striation interlock with bump lines on a bottom side of each wheel cradle, to avoid undesired spinning of each action wheel within a corresponding wheel cradle.

In some embodiments, the pickup cassette bay may comprise a releaser button to be pushed before a pickup cassette is to be removed, and at least one elastomeric pillow configured to prevent buzzing and to create an ejection effect pushing a pickup cassette out of the pickup cassette bay once the releaser button is pressed.

Unless otherwise defined, all technical and scientific terms used herein have the same meaning as commonly understood by one of ordinary skill in the art to which this disclosure belongs. Although methods and materials similar or equivalent to those described herein can be used in the practice or testing of the present disclosure, suitable methods and materials are described below. In case of conflict, the patent specification, including definitions, will control. In addition, the materials, methods, and examples are illustrative only and not intended to be limiting.

BRIEF DESCRIPTION OF THE DRAWINGS

The disclosure is herein described, by way of example only, with reference to the accompanying drawings. With specific reference now to the drawings in detail, it is stressed that the particulars shown are by way of example and for purposes of illustrative discussion of the preferred embodiments of the present disclosure only, and are presented in the cause of providing what is believed to be the most useful and readily understood description of the principles and conceptual aspects of the disclosure. In this regard, no attempt is made to show structural details of the disclosure in more detail than is necessary for a fundamental understanding of the disclosure, the description taken with the drawings making apparent to those skilled in the art how the several forms of the disclosure may be embodied in practice.

In the drawings:

FIGS. 3A to 3D schematically depict metal chassis 202 according to some embodiments of the current disclosure; FIG. 3A schematically depicts metal chassis 202*b* according to some embodiments of the current disclosure; FIG. 3B-1 schematically depicts metal chassis 202*c* according to some embodiments of the current disclosure; FIG. 3B-2 schematically depicts more details of metal laser cut chassis 202*z* for assembly with finger joints according to some embodiments of the current disclosure; FIG. 3C schematically depicts metal chassis 202*d* according to some embodiments of the current disclosure; FIG. 3D schematically depicts metal chassis 202*e* according to some embodiments of the current disclosure; FIG. 5A schematically depicts a general view of a core guitar 105 with pickup cassette 107 installed and a bridge system 106*a* in which the Action may be adjusted, and the intonation is pre-set by the intonation comb 510 according to some embodiments of the current disclosure; FIG. 5A(1) schematically depicts some details of a bridge system 106*a* in which the Action may be adjusted, and the intonation is pre-set by the intonation comb 510 according to some embodiments of the current disclosure;

FIG. 5B schematically depicts an exploded view of a bridge system 106*a* in which the Action may be adjusted by the player according to some embodiments of the current disclosure;

FIG. 5C schematically depicts enlarged views of the intonation comb 510 and actuator assembly 512 according to some embodiments of the current disclosure; FIG. 5D(i) shows an action wheel 516 rotated such that the eccentric axis (and thus string 410) is at its minimum height;

FIG. 5D(ii) shows an action wheel 516 rotated such that the eccentric axis (and thus string 410) is at its maximum height;

FIG. 5E(i) shows an action wheel 516 before it was inserted into wheels cradle 517 according to some embodiments of the current disclosure; FIG. 5E(ii) shows an action wheel 516 inserted into wheels cradle according to some embodiments of the current disclosure; FIG. 6A schematically depicts a general view of a modular guitar 100 having a bridge system 106*b* in which both the Action and the Intonation of each string 410 may be individually adjusted by the player according to some embodiments of the current disclosure;

FIG. 6B schematically depicts more detailed views of bridge system 106*b* and its function according to some embodiments of the current disclosure;

FIG. 6C schematically depicts more detailed views of bridge system 106*b* and its function according to some embodiments of the current disclosure;

FIG. 7A(iii) schematically depicts a core guitar 105 as it is attached to a body 102 by the player according to some embodiments of the current disclosure; FIG. 7B(i) schematically depicts the body 102 before it is attached to a core guitar 105 according to some embodiments of the current disclosure; FIG. 7B(ii) schematically depicts the back side of assembled modular guitar 100 showing the body 102 attached to a core guitar 105 according to some embodiments of the current disclosure; FIG. 7B(1) schematically depicts a core guitar 105 as it is locked to a body 102 by the player, according to some embodiments of the current disclosure;

FIG. 7B(2) schematically depicts elastomeric units of body 102 preventing noise occurring due to friction between core guitar 105 and body 102, according to some embodiments of the current disclosure;

FIG. 7C schematically depicts a core guitar 105 in the process of being attached to a body 102 before the two parts are fully engaged (as seen in FIG. 7A(ii)), according to some embodiments of the current disclosure; FIG. 7D schematically depicts a core guitar 105 as it is attached to a body 102 (as seen in FIG. 7A(ii)), according to some embodiments of the current disclosure; FIG. 7E schematically depicts several views of the neck's release button 721 according to some embodiments of the current disclosure; FIG. 7F schematically depicts cutoff views showing the operation of elastomeric pillows 740 according to some embodiments of the current disclosure; FIG. 8A schematically shows front and back views of a modular guitar 100 installed with a body 102L having a built-in retractable kickstand 800 according to some embodiments of the current disclosure; FIG. 8B schematically shows back views of a modular guitar 100 installed with a body 102L having a built in retractable kickstand 800 in different stages of deploying the built in retractable kickstand 800, according to some embodiments of the current disclosure;

FIG. 8C schematically depicts some details of retractable kickstand 800 according to some embodiments of the current disclosure; FIG. 8D schematically depicts some details showing how retractable kickstand 800 is locked in the deployed state, according to some embodiments of the current disclosure;

FIG. 12A schematically depicts a modular guitar before and after installation of a Quick Release Locking System, according to some embodiments of the current disclosure;

FIG. 12B schematically depicts a modular guitar installed with a Quick Release Locking System, when the entire Quick Release Locking System is locked and when one of the handles is in open state, according to some embodiments of the current disclosure;

FIG. 12C schematically depicts an exploded view of a modular guitar installed with a Quick Release Locking System, according to some embodiments of the current disclosure; and FIG. 12D schematically depicts a modular guitar installed with a Quick Release Locking System illustrating the angle at which a string is inserted into the Quick Release Locking System, according to some embodiments of the current disclosure.

DETAILED DESCRIPTION

Figure 1A:
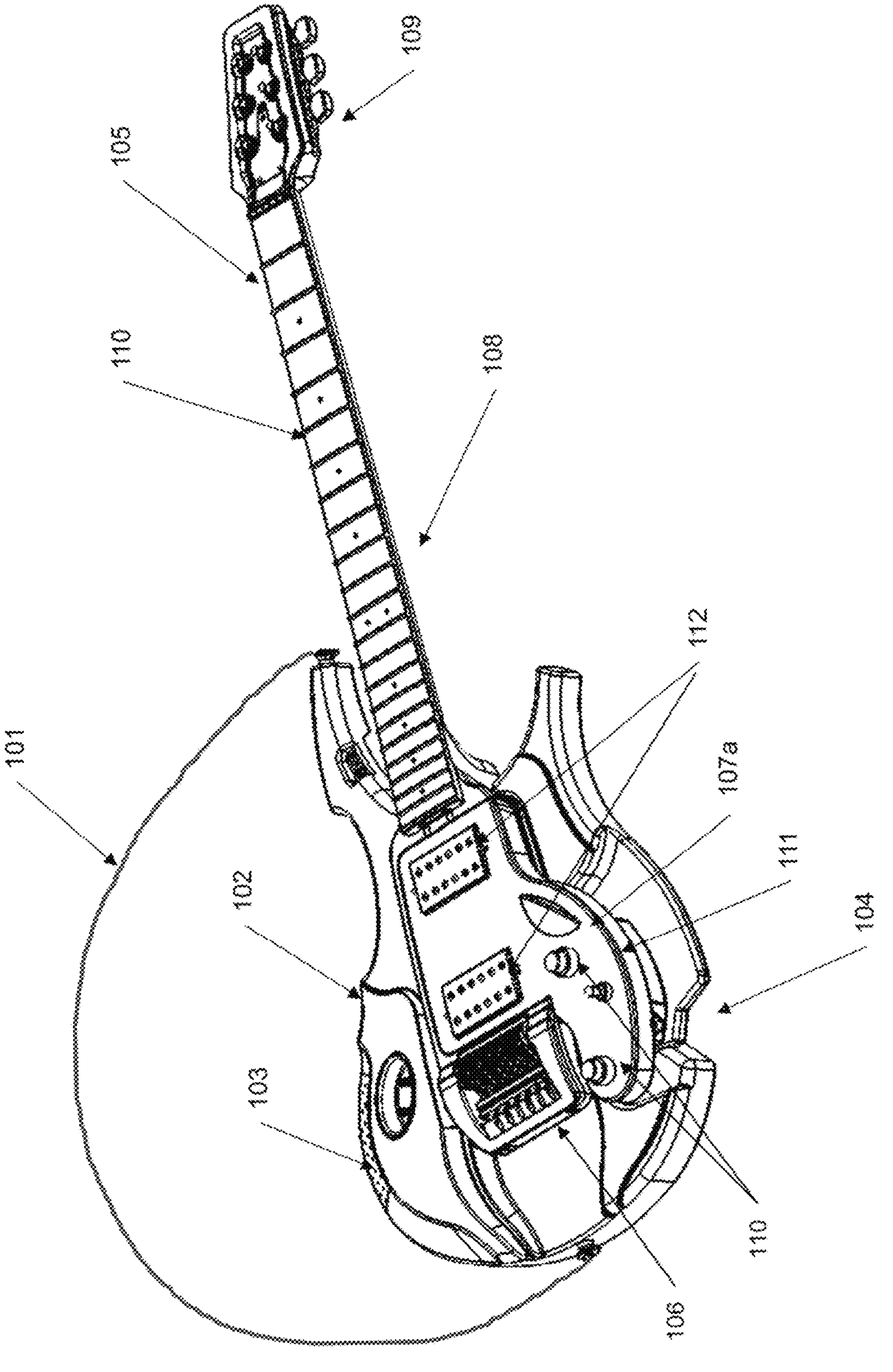
FIG. 1A schematically shows a full view of an assembled modular string, instrument, e.g., a guitar 100 according to some embodiments of the current disclosure.

The present disclosure relates to a modular string instrument and method for its manufacturing, integration, operation and adjusting.

Before explaining at least one embodiment of the disclosure in detail, it is to be understood that the disclosure is not limited in its application to the details of construction and the arrangement of the components set forth in the following description or illustrated in the drawings. The disclosure is capable of other embodiments or of being practiced or carried out in various ways. Also, it is to be understood that the phraseology and terminology employed herein is for the purpose of description and should not be regarded as limiting.

In discussion of the various figures described herein below, like numbers refer to like parts. Different variety of similar, interchange elements may be marked by adding a different letter after the number assigned to the generic class of elements.

For clarity, non-essential elements were omitted from some of the drawings.

FIG. 1A schematically shows a full view of an assembled modular string instrument, modular guitar 100 according to some embodiments of the current disclosure.

In a conventional electric guitar, the entire guitar (excluding the belt 101 which can be exchanged at ease) is a single instrument, integrated at the manufacturing factory.

In contrast, modular guitar 100 comprises replaceable, interchangeable sub units that the player may assemble and disassemble at ease and without having to use tools.

In the depicted example, modular guitar 100 comprises a body 102 variety of body types 102 may be offered providing different colors, shape styles and accessories.

It should be noted that an electrical guitar is merely an example for any other string instrument, which may comprise replaceable, interchangeable sub units that the player may assemble and disassemble at ease and without having to use tools.

In this FIG. 1A body 102 includes a built-in speaker 103. A built-in amplifier (not shown in the figure) may be housed within body 102 and powered by (optionally rechargeable) batteries also housed within body 102. Optionally, an electrical connector or connectors (not seen herein) connects the pickup cassette 107 with the built-in amplifier within body 102. Such a connection may be a USB cable connecting the pickup cassette 107 to the amplifier section. Alternatively, an analog wire connection may be used. Alternatively, a wireless connection such as Bluetooth may be used.

Additionally or alternatively, a conventional external amplifier may be connected with an amplifier cord 104. Optionally, additionally, or alternatively, an external amplifier may be connected wirelessly using WiFi, Bluetooth, or other wireless protocols. The wireless communication device (not seen here) may be integrated into body 102 or may be formed as a dongle inserted into a mating jack. The wireless connection may also be indirect. For example, the wireless or wired connection may not be directly or at all connected to an amplifier. For example, signals from the pickup cassette may be directed to a smart-phone and from the smart phone the signals may be communicated to an amplifier or be played by other means available from the smartphone or may be recorded or may be processed and then played or recorded. Instead of a smartphone, any other computerized or traditional audio device may be used.

The core guitar 105 is the part that holds the strings (not seen in this figure) that stretch from the bridge 106, over the pickup cassette 107 and the neck 108 to the head 109.

As will be seen in the next figures, core guitar 105 may accept a variety of pickup cassette types 107. In the example depicted here, pickup cassette 107*a* has three rows of pickup sensors 112 and sound control dials 110 and pickup selector switch 111.

Figure 1B:
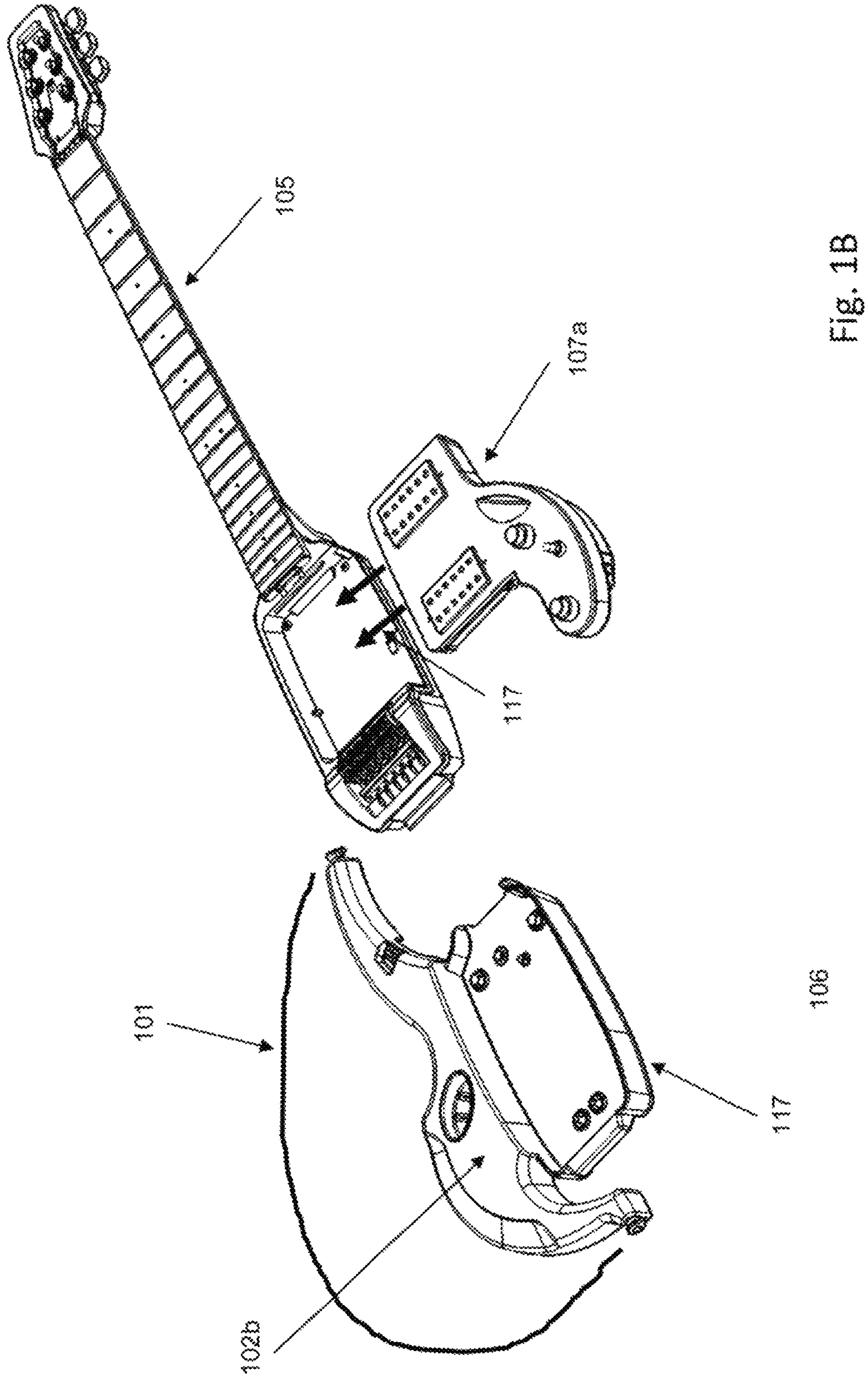
FIG. 1B schematically shows how a belt adaptor 102*b* is attached to the core guitar 105, and how a pickup cassette 107*a* is attached 117 to the core guitar 105 to form the modular guitar 100 according to some embodiments of the current disclosure.

FIG. 1B schematically shows how a belt adaptor 102*b* is attached to the core guitar 105, and how a pickup cassette 107*a* is attached 117 to the core guitar 105 to form the modular guitar 100 according to an exemplary embodiment of the current disclosure.

In FIG. 1B, the belt adaptor 102*b* is just a rudimentary body 102 having the simple shape to be used for anchoring a belt 101.

Figure 2A:
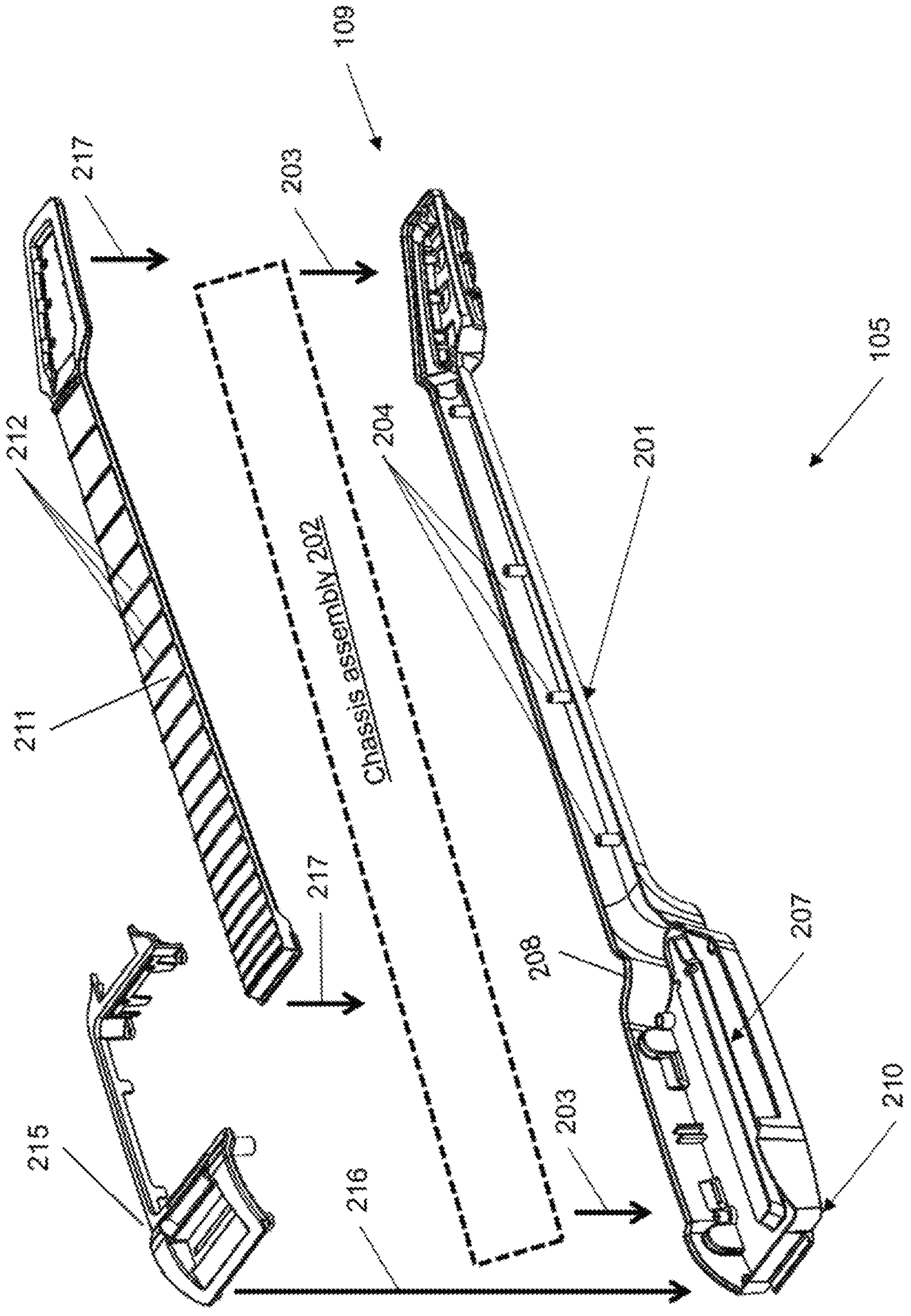
FIG. 2A schematically depicts the construction of the core guitar 105 according to some embodiments of the current disclosure.

FIG. 2A schematically depicts the construction of the core guitar 105 according to exemplary embodiments of the current disclosure.

Core guitar 105 comprises a core shell 201 which form the basic shape of the core guitar. Core shell 201 is made of plastic material. Plastic materials are being used for various parts of the modular guitar due to its low cost of material and manufacturing. Plastic may be formed by molding, stamping, or 3D printing as known in the art. ABS or PC (polycarbonate) are currently preferably used, but other type of plastic materials may also be used.

Metal chassis assembly 202 is then inserted 203 into the core shell 201. Location pins 204 provide accuracy placement of the chassis assembly 202.

Optionally plastic will be injected over the metal chassis in a mold as known in the art. This known technique may create stronger bond between the plastic and the metal part.

Several optional types of chassis assemblies 202 will be detailed in later figures. Metal chassis assembly 202 extends from the head 109, under the pickup cassette bay 207 in the neck base 208 to the back 210 of the guitar core 105. Metal chassis assembly 202 provides rigidity needed to withstand the tension of the strings. Metal chassis assembly 202 is preferably made of steel. Other rigid materials such as aluminum or glass or carbon fibers may be used.

Fret board 211 is installed 217 and covers the neck section of the core shell 201, encasing the metal chassis assembly. Fret board is optionally held in place by screws (not seen in this figure) or other plastic joining techniques known in the art. Fret board 211 is preferably made of plastic. Frets 212 may be made of plastic and be part of the fret board 211. Alternatively, fret board 211 is made with slots into which metallic frets are inserted.

Neck base cover 215 is then attached 216 to the neck base 208, using plastic joining techniques known in the art.

As will be seen later, epoxy or other liquid resin is inserted into the gap between the Fret board 211 and the core shell 201, holding the metal chassis assembly 202 in place, and giving the core guitar 105 additional rigidity and weight, as well as preventing anti-resonances and rattling of the parts.

Figure 2B:
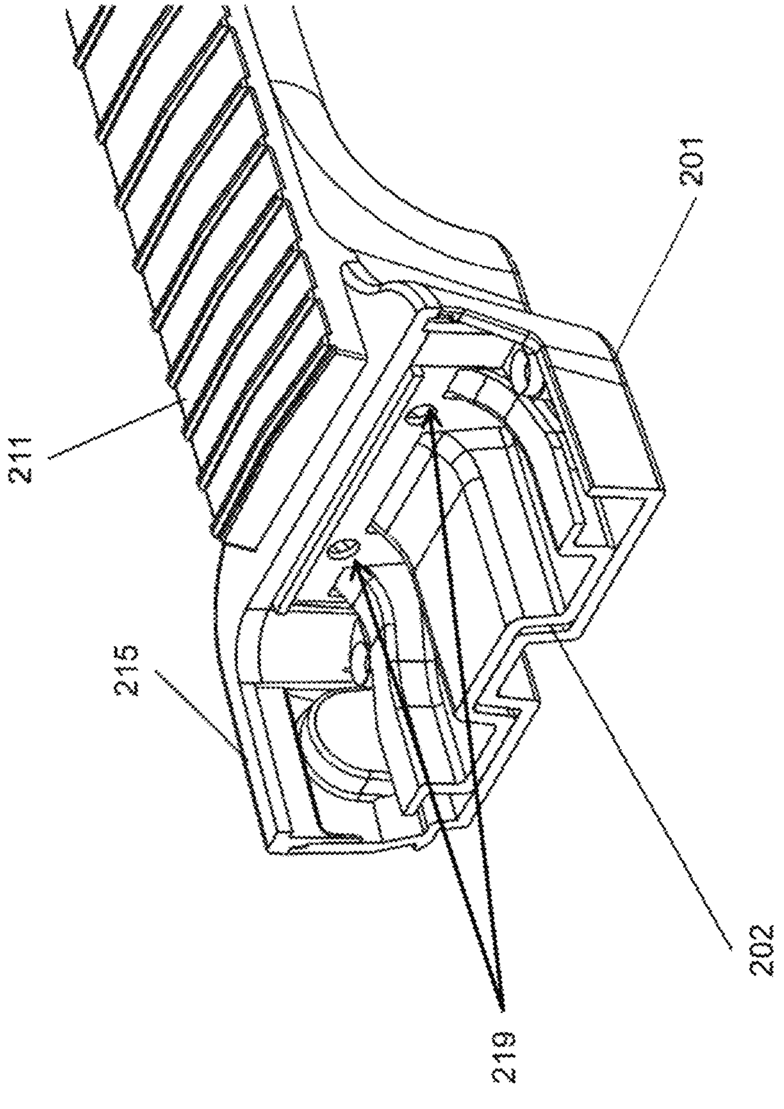
FIG. 2B schematically depicts some details concerning the construction of the core guitar 105 according to some embodiments of the current disclosure.

FIG. 2B schematically depicts some details concerning the construction of the core guitar 105 according to an exemplary embodiment of the current disclosure.

Epoxy or other resin is inserted into the gap between the Fret board 211 and the core shell 201 through holes 219 in order to fill the space between the elements within the neck section 108 only of core guitar 105.

For example, the method of manufacturing may comprise connecting a pipe which will inject the resin with pressure into the gap. In this case there should also be another hole from which redundant air may leave the gap. Optionally such hole may be connected to a vacuum that will suck the air during the process. Optionally, one may connect a pipe with a valve or some shifting element near the head, the pipe will first suck all the air out, and then inject the resin in. As known in the art of injection molding, tiny slots (“air-vents”) are usually being made so that air may flow through.

Figure 2C:
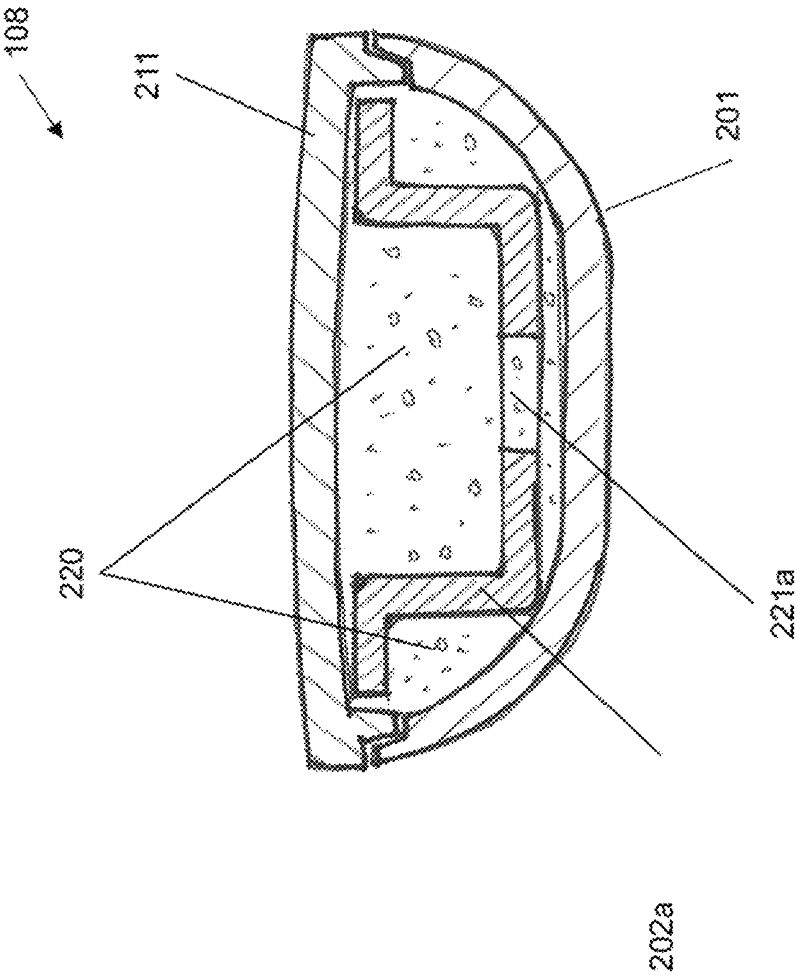
FIG. 2C schematically depicts a cross sectional view through the neck section 108 of an assembled modular guitar 105 according to some embodiments of the current disclosure.

FIG. 2C schematically depicts a cross sectional view through the neck section 108 of an assembled modular guitar 105 according to an exemplary embodiment of the current disclosure.

Epoxy 220 or other resin is inserted into the gap between the Fret board 211 and the core shell 201 in order to fill the space between the elements within the neck section 108 of core guitar 105. A “U” shaped metal chassis 202*a* is seen in this exemplary embodiment. Optional holes 221*a* are punched in the metal chassis 202*a* to let the epoxy 220 flow all around and fill the neck section 108.

FIGS. 3A to 3D schematically depict exemplary embodiments of metal chassis 202 according to exemplary embodiments of the current disclosure.

To reduce figure clattering, similar parts will not be marked in some of the drawings.

Figure 3A:
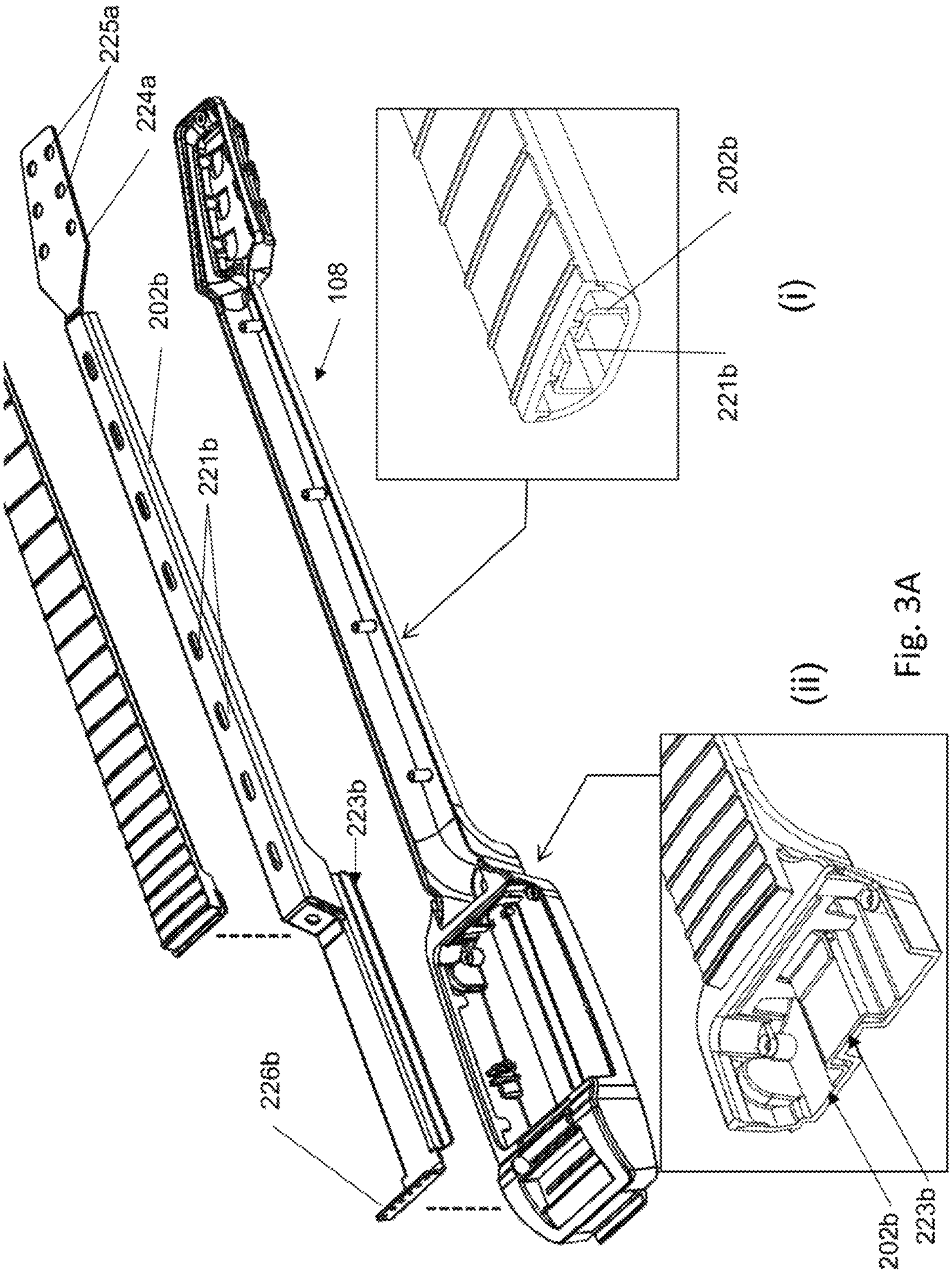

FIG. 3A schematically depicts an exemplary embodiment of metal chassis 202*b* according to an exemplary embodiment of the current disclosure.

Metal chassis 202*b* may be stamped of sheet metal or welded together from metal parts. Optionally it comprises optional holes 221*b* to let the epoxy 220 flow all around and fill the neck section 108.

FIG. 3A(i) shows the cross section of metal chassis 202*b* at the neck section 108.

FIG. 3A(ii) shows the cross section of metal chassis 202*b* at the neck base section 208, showing the metal chassis fold 223*b* that provides strength at the neck base section 208. Metal chassis told 202 starts with a head plate 224 having holes 225*a* for the poles of the string tuning machines (not seen here). The end 226*a* of metal chassis 202*b* supports the bridge (to be detailed in later figures).

Figures 1, 3B:
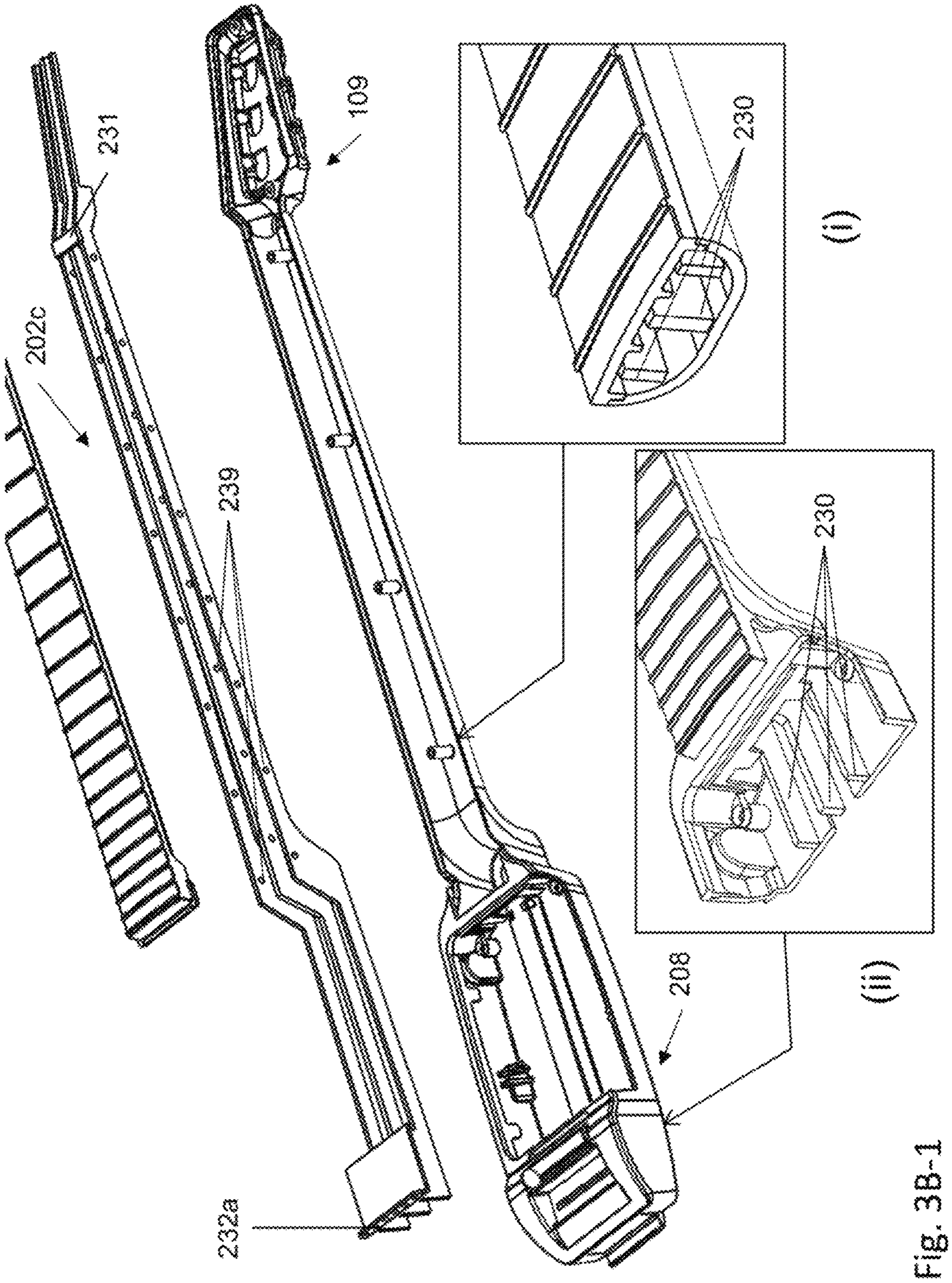

FIG. 3B-1 schematically depicts an exemplary embodiment of metal chassis 202*c* according to another exemplary embodiment of the current disclosure.

Metal chassis 202*c* comprises a plurality (three in the depicted embodiment) of beams 230 that provide the rigidity to withstand the tension of the strings. Beams 230 are connected to and held by a small steel board 231 near the head section, and to a strings anchoring bridge 232*a* at the other end. The connection may be formed using finger joints, welding, screws, or other forms known in the art. Optionally beams 230 comprises optional holes 239 to let the epoxy 220 flow all around and fill the neck section 108. In the depicted embodiment, beams 230 provide strength to the head section 109 and head plate is missing.

FIG. 3B-1(*i*) shows the cross section of metal chassis 202*c* at the neck section 108.

FIG. 3B-1(*ii*) shows the cross section of metal chassis 202*c* at the neck base section 208, showing beams 230 which provides strength to the neck base 208.

Figures 2, 3B:
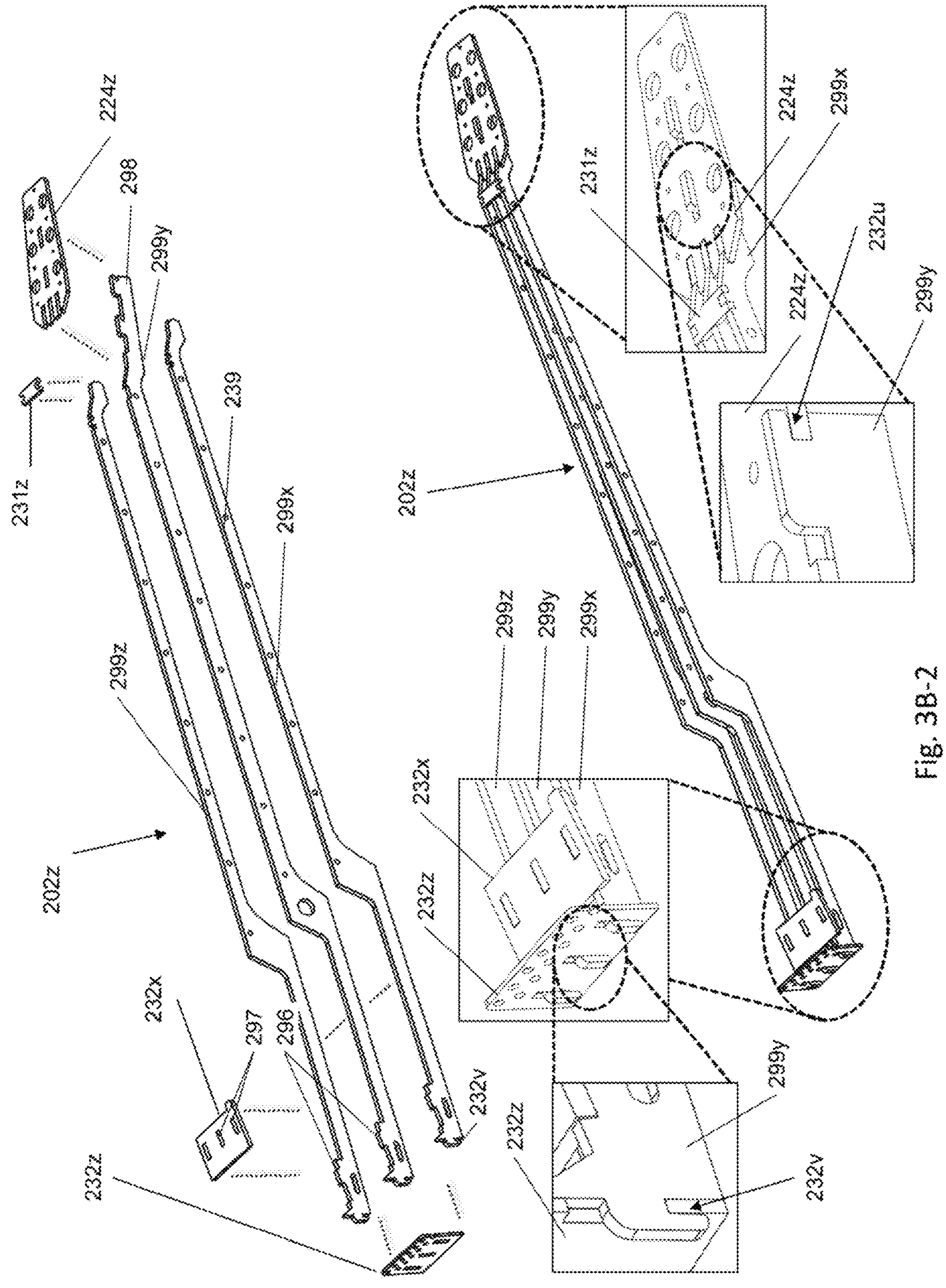

FIG. 3B-2 schematically depicts more details of the exemplary embodiment of metal laser cut chassis 202*z* for assembly with finger joints according to another exemplary embodiment of the current disclosure.

Laser cut chassis for assembly with finger joints 202*z* comprises a central rib 299*y* having a support section 298 for supporting head frame 224*z*.

Central rib 299*y* and side ribs 299*x* and 299*z* are held together on one side by Small steel board 231*z* and head frame 224*z*, and on the other side by back steel board 232*x* and strings anchoring bridge 232*z*.

Finger joints are used to connect some of the parts as can be seen in the assembled (in cut-out view) for connecting central rib 299*y* and strings anchoring bridge 232*z*. Similarly, enlarged finger joint 232*u* is seen for connecting central rib 299*y* and head frame 224*z*.

Slots, such as 297 (only few are marked) shaped to mate with bulges 296 to help aligning the parts during assembly. Joining the parts may further comprise spot welding, soldering, gluing, or other methods known in the art. It should be noted that finger joints in this formation may not be stable thru time and mechanical shocking or vibrations; however, in this case, the formation will later in the production process be stabilized by a resin, as explained regarding FIG. 2C as well as in other places thru this document. The advantage of using finger joints in this formation is in avoiding the need to use welding, screws, or other similar methods which are costly and/or has accuracy issues.

Figure 3C:
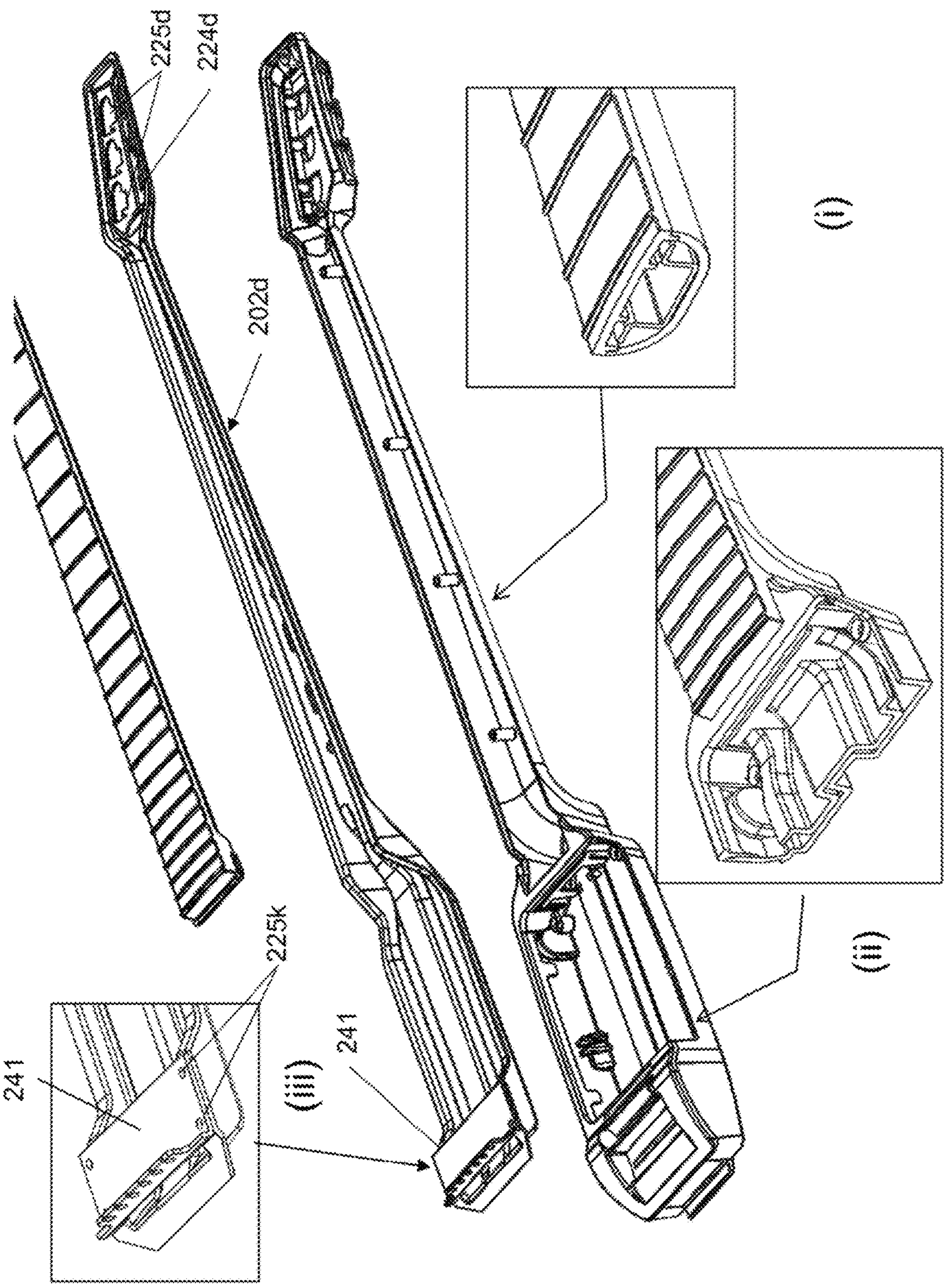

FIG. 3C schematically depicts an exemplary embodiment of metal chassis 202*d* according to another exemplary embodiment of the current disclosure.

Metal chassis 202*d* provides the rigidity to withstand the tension of the strings. Metal chassis 202*d* may be stamped and/or folded metal sheet, wherein the folds provides additional strength to withstand the tension of the strings.

Head frame 224*d* comprises holes 225*d* for the poles of the string tuning machines.

Strings anchoring bridge 241 is connected to the end of metal chassis 202*d* supports the bridge. Strings anchoring bridge 241 is optionally made of stainless steel, and is optionally connected by 4 screws 225*k* to the metal chassis 202*d*.

FIG. 3C(i) shows the cross section of metal chassis 202*d* at the neck section 108.

FIG. 3C(ii) shows the cross section of metal chassis 202*d* at the neck base section 208.

FIG. 3C(iii) shows enlargement of the strings anchoring bridge 241 and its connection to the end of metal chassis 202*d*.

Figure 3D:
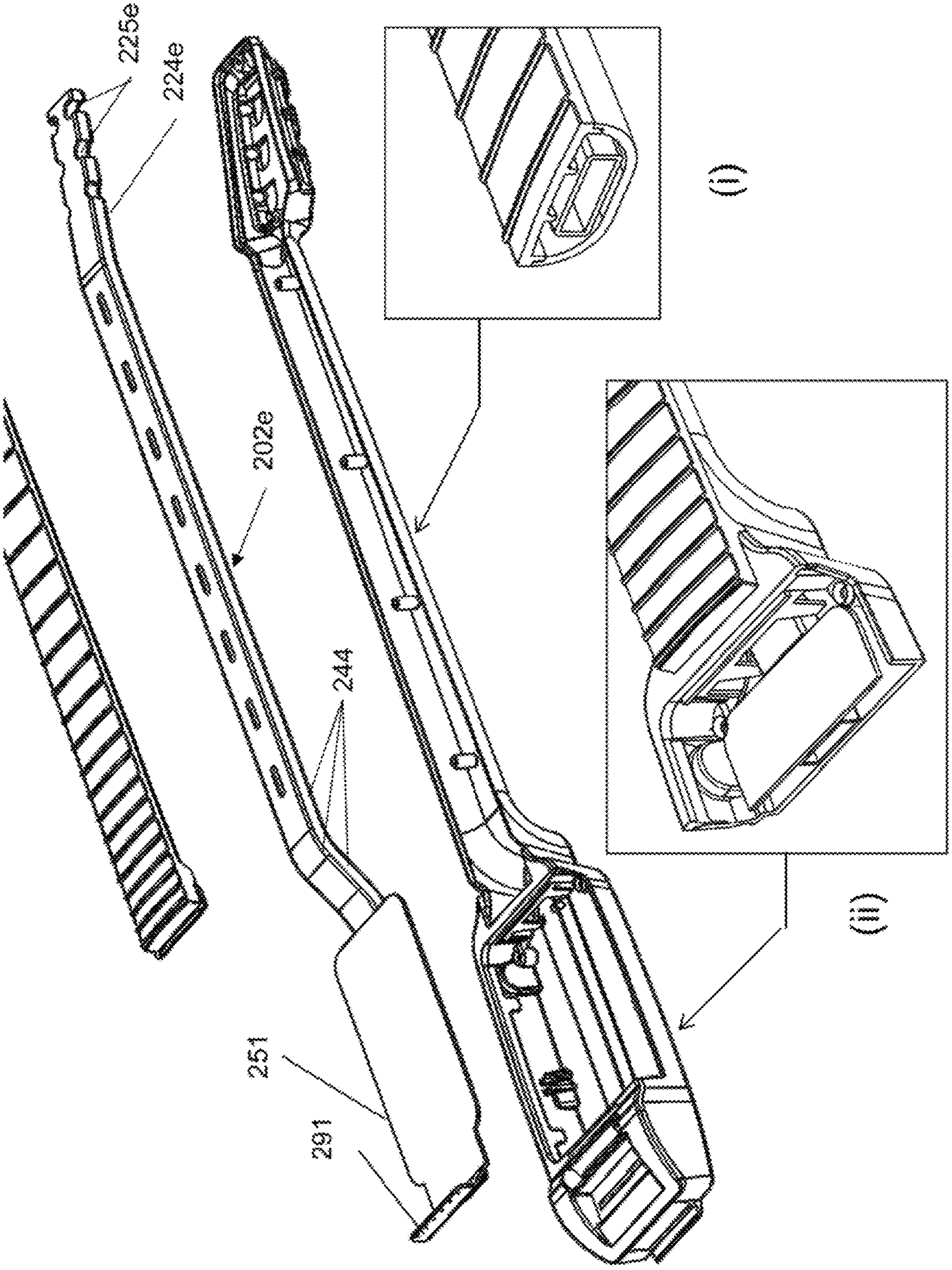

FIG. 3D schematically depicts an exemplary embodiment metal chassis 202*e* according to yet another exemplary embodiment of the current disclosure.

Metal chassis 202*e* provides the rigidity to withstand the tension of the strings. Metal chassis 202*e* has a rectangular box cross section, wherein the box shape provides additional strength to withstand the tension of the strings. Optionally metal chassis 202*e* is welded from a plurality of extruded metal profile sections 244. Alternatively, metal chassis 202*e* is welded from cut metal sheets. Other metal manufacturing processes known in the art may be used.

Head frame 224*e* comprises bays 225*e* for the poles of the string tuning machines.

A strings anchoring bridge 291 is optionally an integral part of the anchoring plate 251.

FIG. 3D(i) shows the cross section of metal chassis 202*e* at the neck section 108.

FIG. 3D(ii) shows the cross section of metal chassis 202*e* at the neck base section 208.

Figure 4A:
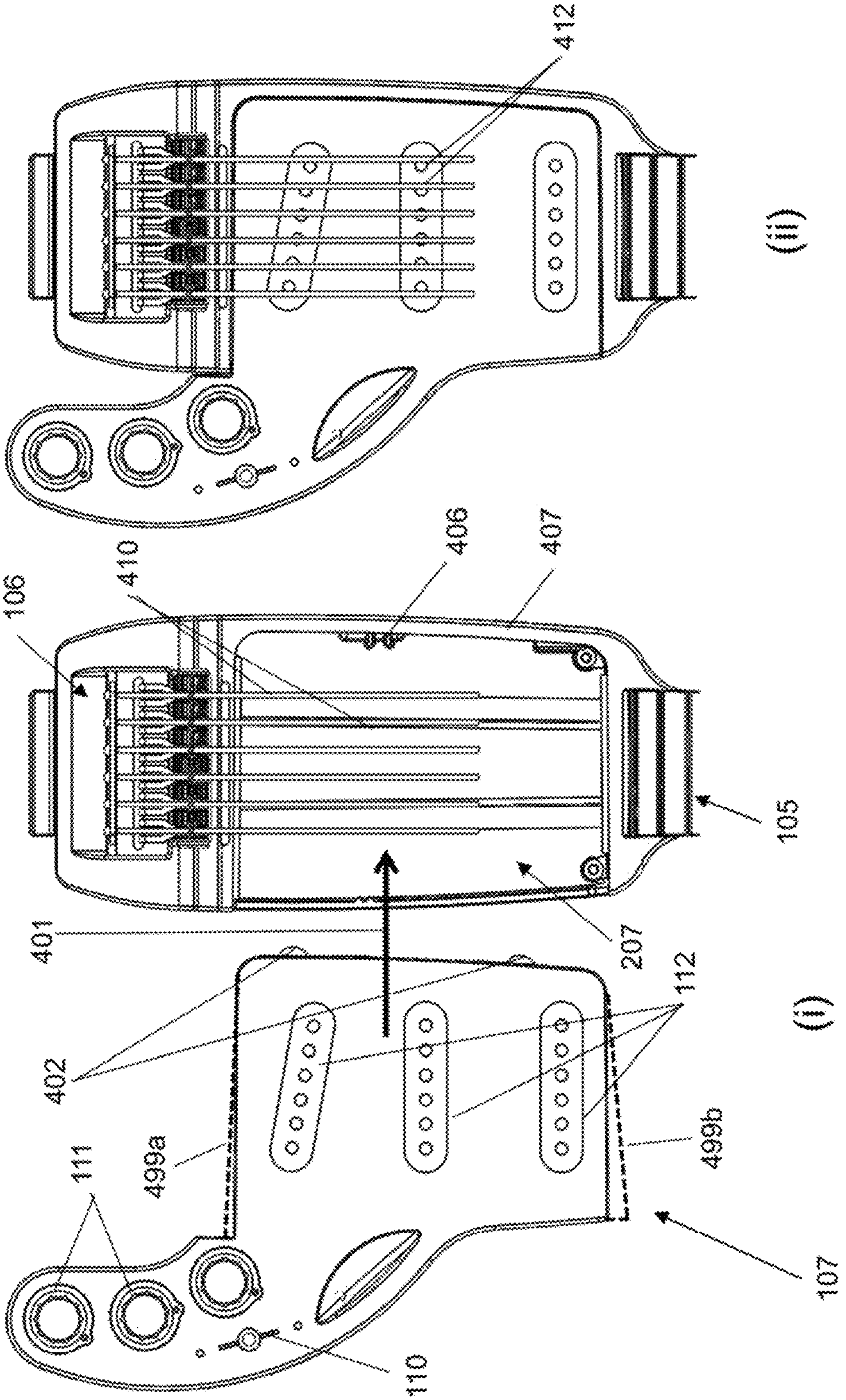
FIG. 4A schematically depicts insertion of pickup cassette 107 into pickup cassette bay 207 according to some embodiments of the current disclosure.

FIG. 4A schematically depicts insertion of pickup cassette 107 into pickup cassette bay 207 according to an exemplary embodiment of the current disclosure.

In FIG. 4A(i), pickup cassette 107 is seen before it is inserted 401 into the pickup cassette bay 207. When fully inserted, as seen in FIG. 4A(ii), the mechanical fastener 406 is engaged with the mating fastener 404 (seen in FIG. 4B(ii)) in the pickup cassette bay 207 to provide positional accuracy. Release button 421 (seen in FIG. 4B(ii)) is the actual lock of the cassette, while projection 404 is responsible to make sure it is aligned (perpendicular to the strings). As seen in FIG. 4A(ii), pickup cassette 107 is inserted below strings 410 such that pickup sensors 412 in rows of pickup sensors 112 are below the strings 410.

Elastomeric pillows 402, made for example of rubber, Silicon rubber, or other elastomer, are pushed against the back wall 407 of the pickup cassette bay 207 to prevent the pickup cassette 107 from rattling within the pickup cassette bay 207.

Preferably cassette lateral sides are slightly tilted (that is: not parallel such as marked by dotted lines 499*a* and 499*b*) to form a trapezoid shape, to prevent jamming while the insertion is taking place. As a result, the insertion is very easy until reaching the last few millimeters of the cassette bay, to engage the flex stopper catch (release button locking tooth).

Figure 4B:
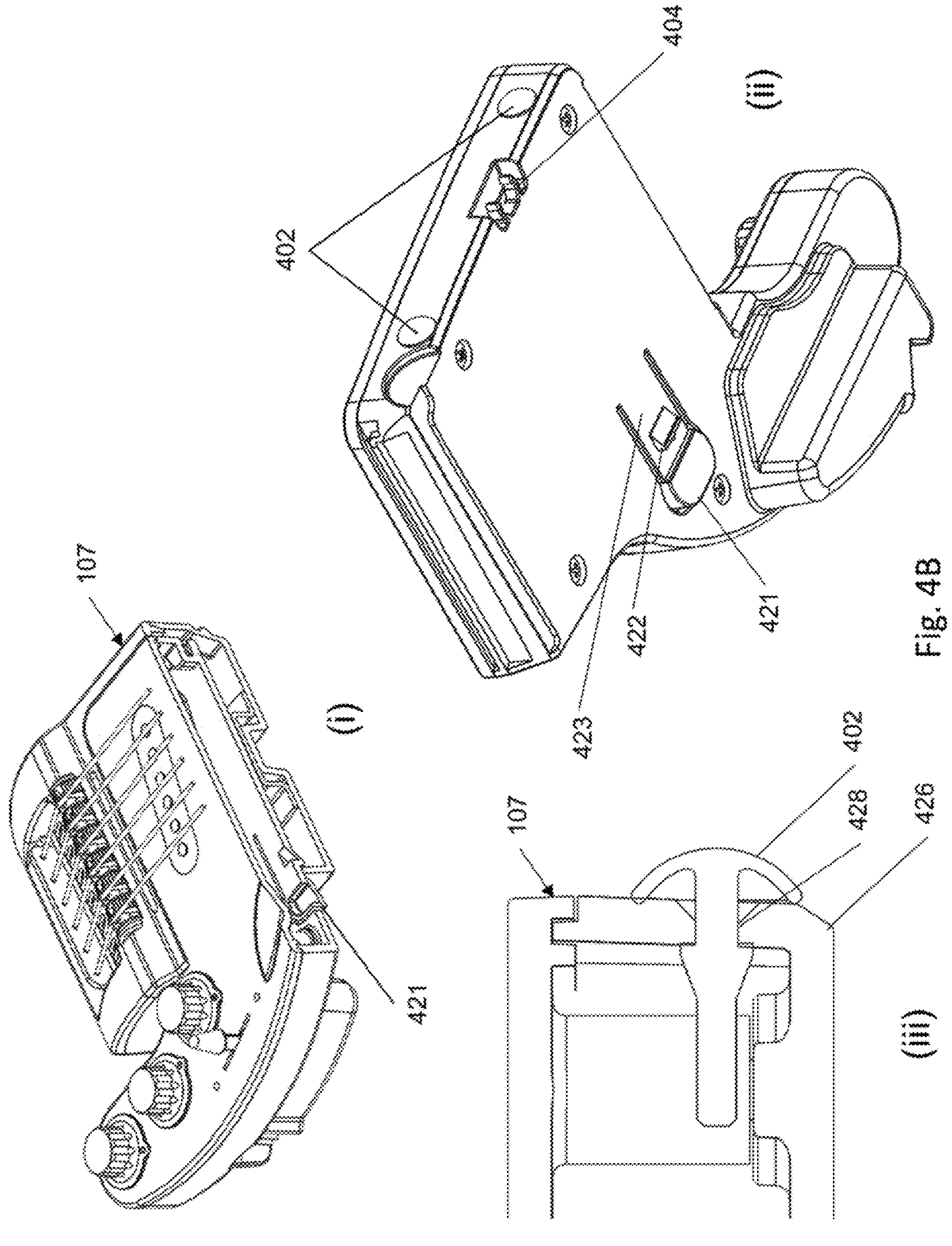
FIG. 4B schematically depicts some details of pickup cassette 107 according to some embodiments of the current disclosure.

FIG. 4B schematically depict some details of pickup cassette 107 according to an exemplary embodiment of the current disclosure.

FIG. 4B(i) shows a cut-out section of the pickup cassette 107 which is constructed as a plastic or a drawer housing the electronic components.

FIG. 4B(ii) shows the bottom of the pickup cassette 107. Exposed on the bottom of the pickup cassette 107 is the releaser button 421. To release the pickup cassette 107 from the pickup cassette bay 207, the player presses on the releaser button 421. This causes upward flexing of the flexible member 423, releasing the locking tooth 422 from a locking notch within the pickup cassette bay 207.

FIG. 4B(iii) depicts a cross section of the pickup cassette 107, showing an elastomer pillow inserted into a hole 428 in wall 426 of the pickup cassette 107.

Figure 4C:
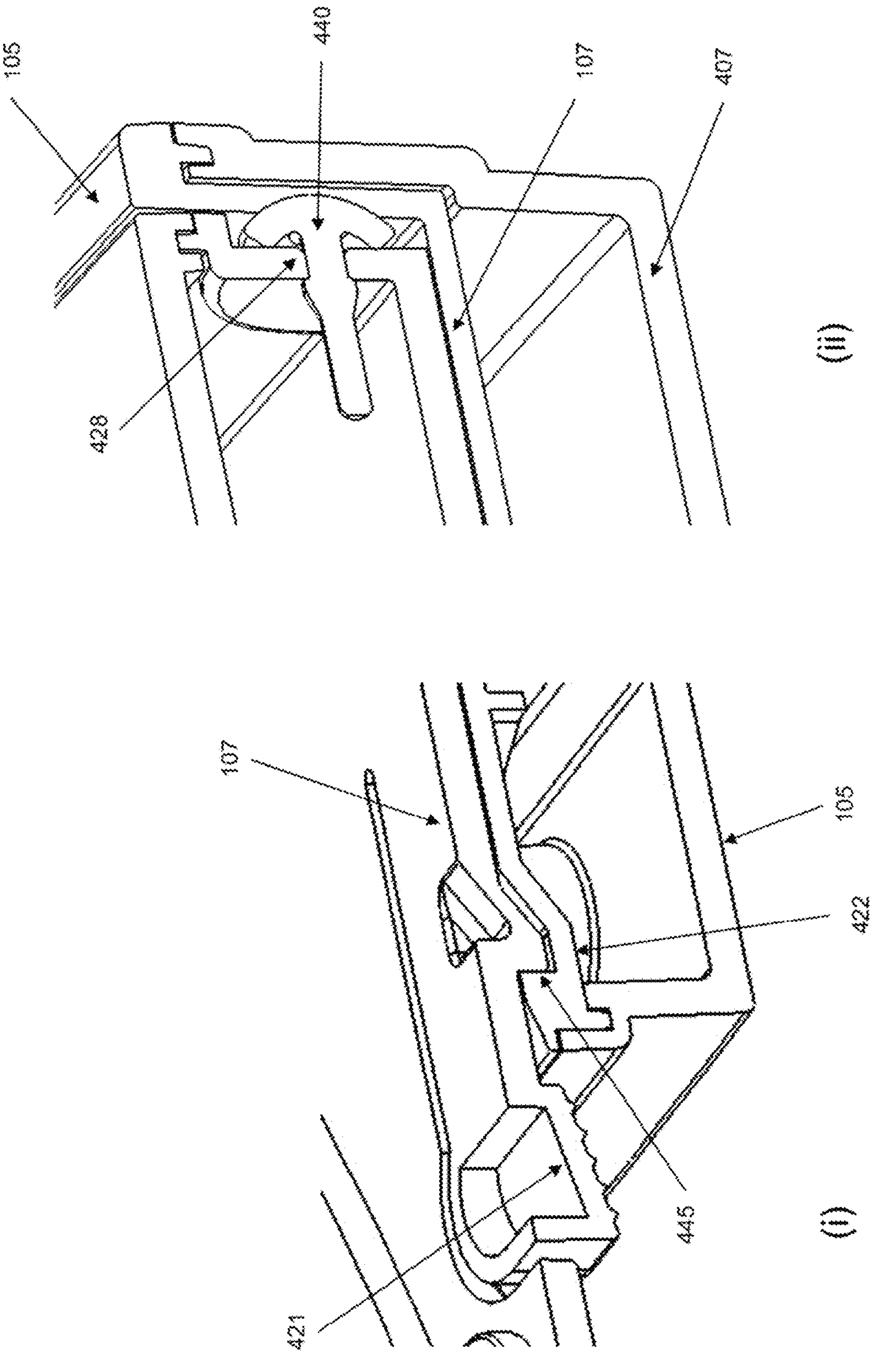
FIG. 4C schematically depicts some more details of pickup cassette 107 inserted into the pickup cassette bay 207 according to some embodiments of the current disclosure.

FIG. 4C schematically depicts some more details of pickup cassette 107 inserted into the pickup cassette bay 207 according to an exemplary embodiment of the current disclosure.

FIG. 4C(i) shows a cut out view of the bottom of the pickup cassette 107 inserted into the pickup cassette bay 207. Exposed on the bottom of the pickup cassette 107 is the releaser button 421. To release the pickup cassette 107 from the pickup cassette bay 207, the player presses on the releaser button 421. This causes upward flexing of the flexible member 423, releasing the locking tooth 422 from a locking, notch 445 within the pickup cassette slot in the guitar core 105.

FIG. 4C(ii) depicts a cut out view of the pickup cassette 107 inserted into the pickup cassette bay 207, showing an elastomer pillow 402 deforms 440 as it is pressed against the wall 407 of the pickup cassette bay within guitar core 105. The two elastomeric pillows 402 help avoiding buzzing and also create an ejection effect, pushing the pickup cassette 107 outward once the releaser button 421 is pressed.

FIGS. 5A to 5E schematically depict a bridge system 106*a* in which the Action of each string 410 is preset according to any particular standard string set In electrical guitar, the player may want to adjust the "Action" which is the height of the strings 410 relative to height of the frets on the fret board 211. Some electric guitars known in the art have an adjustable bridge that can be moved up and down. However, there is a need for a bridge system that enables a common player to adjust the individual Action of each string 410 individually, without the need for special skills and/or tools, and without using a professional repair shop at high cost.

Figure 5A:
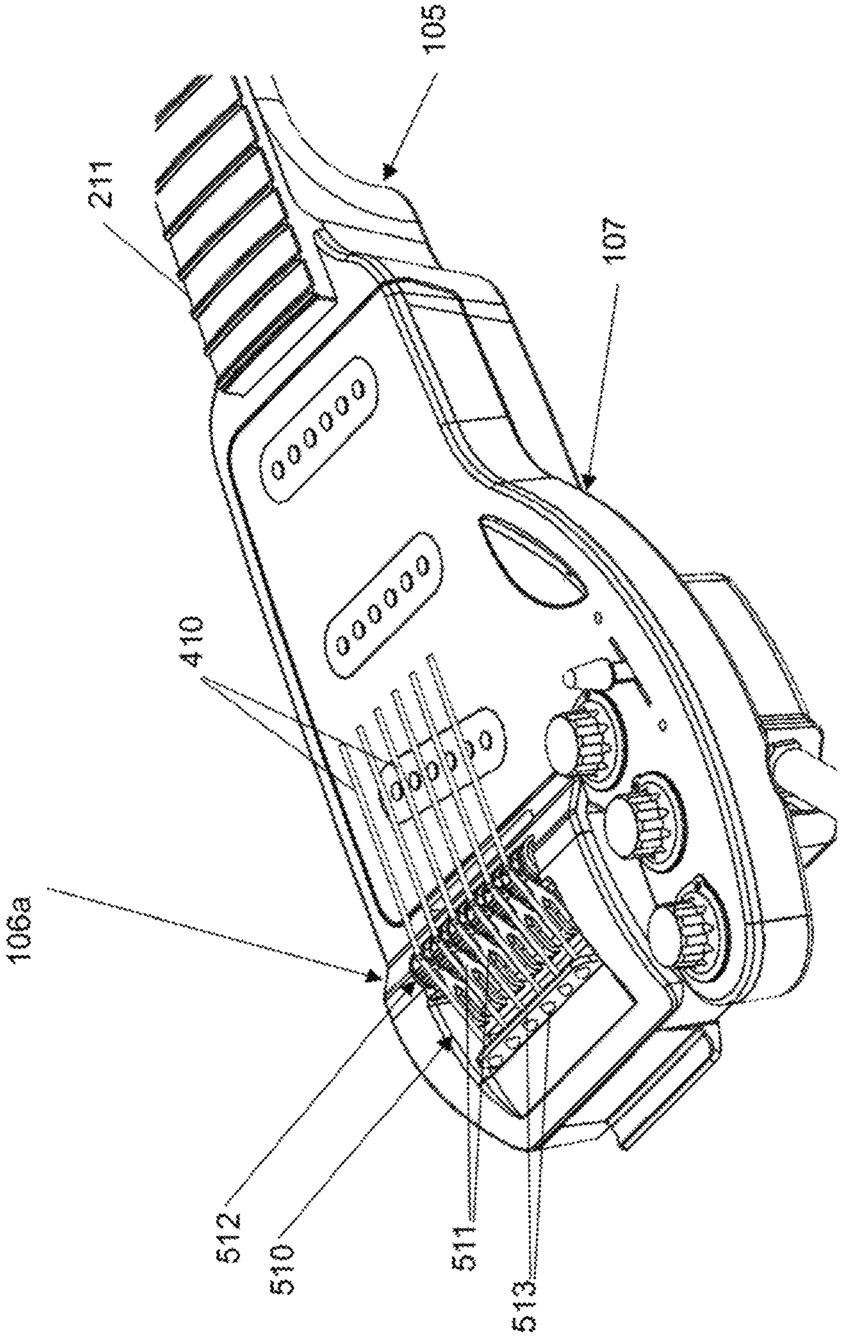
FIGS. 5A to 5E schematically depict a bridge system 106*a* in which the Action of each string 410 may be individually adjusted by the player according to some embodiments of the current disclosure.

FIG. 5A schematically depict a general view of a core guitar 105 with pickup cassette 107 installed and a bridge system 106*a* in which the Action may be adjusted.

According to an exemplary embodiment, the bridge system 106*a* device is comprised of a leg assembly 510 (also named intonation comb as will be explained later) comprising a plurality of leg members 511 for respectively holding individual ones of the plurality of strings 410; and an actuator assembly 512 comprising a plurality of rotatable units which comprise rotatable members respectively engaged with the plurality of leg members 511 for moving the plurality of leg members up and down. Leg members 511 are connected to a common base 530. In this embodiment, the length of the leg members are fixed.

According to another preferred embodiment, the device is provided wherein the plurality of rotatable members of the actuator assembly are independently movable so as to independently move the plurality of strings and thereby tune each string individually.

The bridge system 106*a* is located close to the anchoring points 513 of strings 410, in proximity to the location where the player's fingers play the guitar.

FIG. 5A(1) schematically depicts some details of a bridge system 106*a* in which the Action may be adjusted, and the intonation is pre-set by the intonation comb 510 according to some embodiments of the current disclosure. It should be noted that Intonation defines the length of each string independently, as it affects the sound and tone. Thus, bridge base 541 may comprise an intonation comb 510 configured to delicately adjust the length of the strings, such to increase sound and tone accuracy, it should be noted that Action defines the height of each string above the frets in fret board 211. Each of the strings' height may be adjusted via action wheels 516 located beneath the leg member 511. These action wheels 516 may lift or lower a string with respect to the frets, in order to ease playing the modular guitar. The bridge illustrated in the following figures is such that may be adjusted per intonation via an Allen key in an accurate manual manner, more than in the bridge illustrated in FIGS. 5A-5A(1). Adjusting the Action in both types of bridges may be accomplished by rotating the action wheels 516 comprising an eccentric axis 521 per string.

Figure 5B:
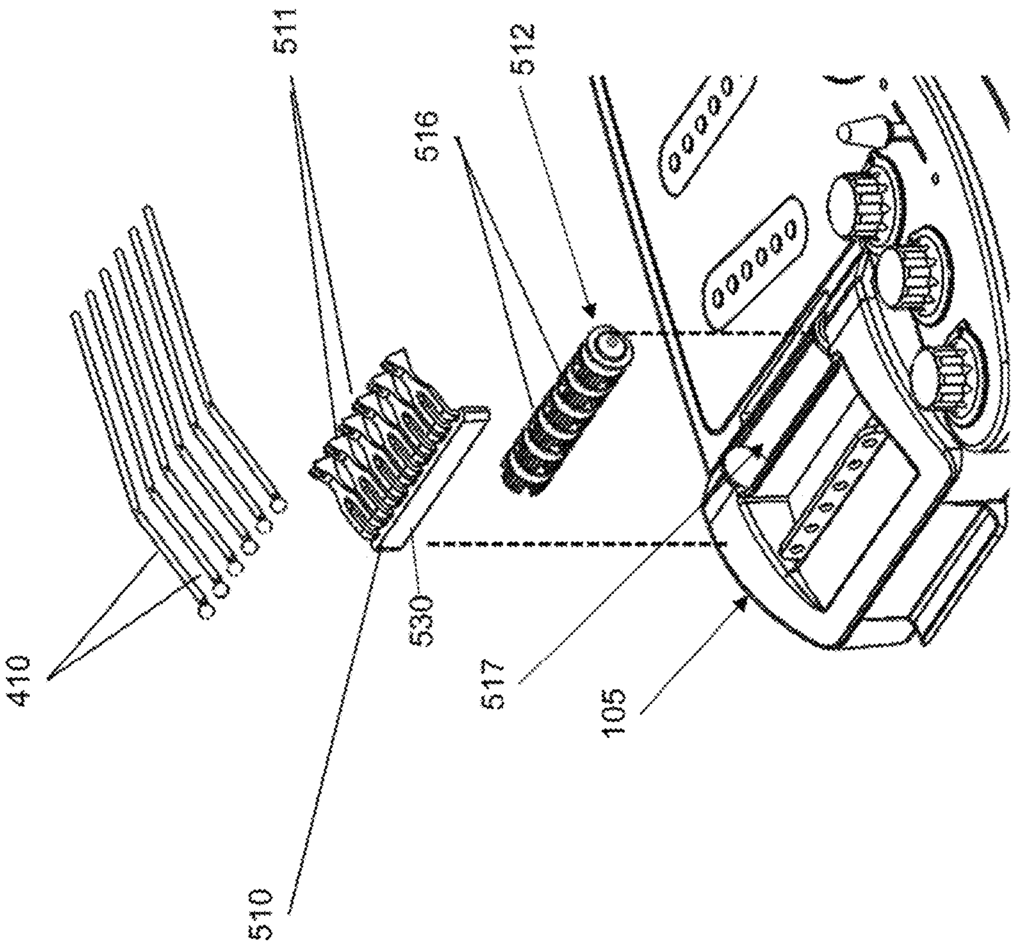

FIG. 5B schematically depicts an exploded view of a bridge system 106*a* in which the Action may be adjusted by the player according to an exemplary embodiment of the current disclosure.

Figure 5C:
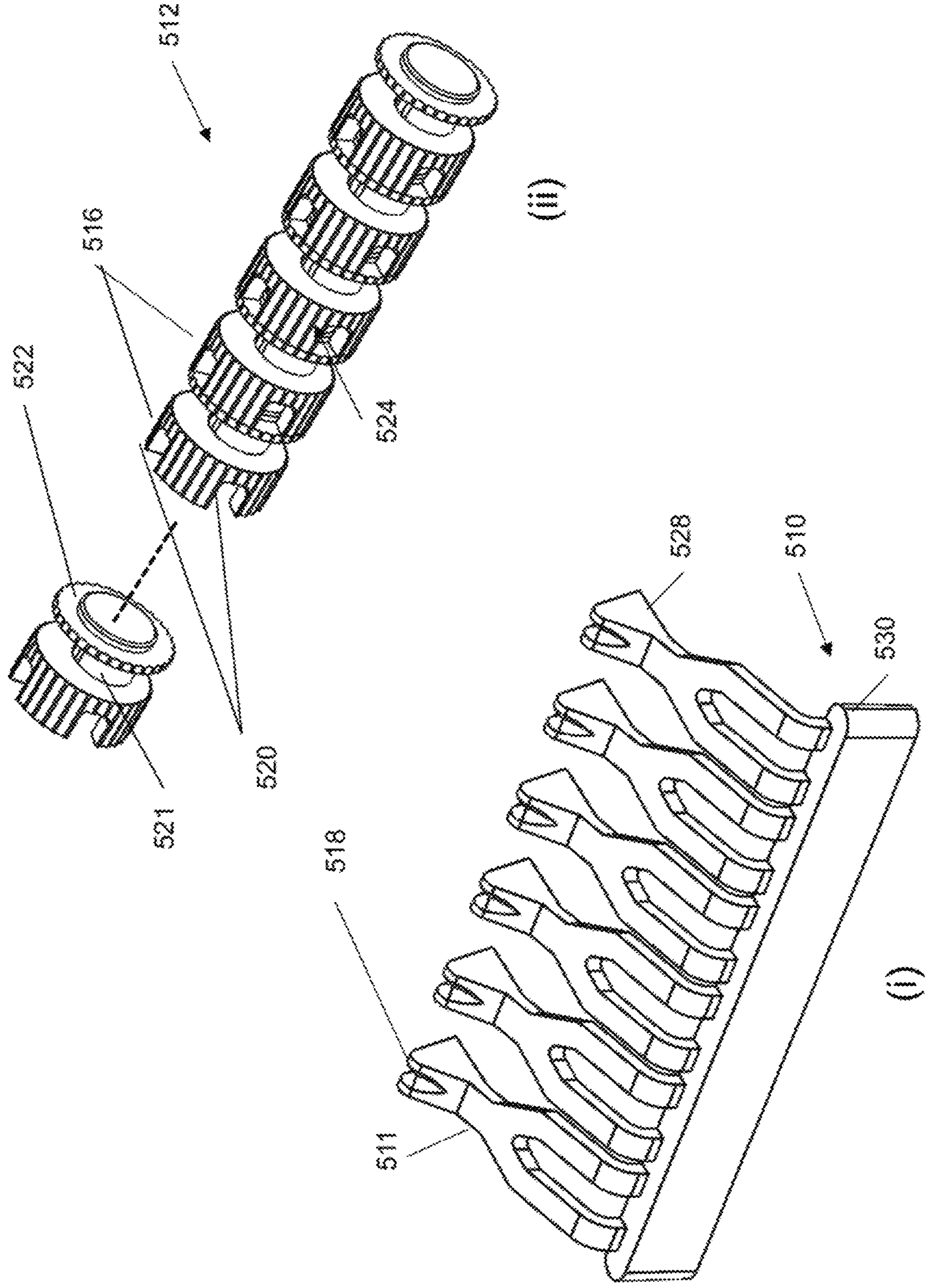

FIG. 5C schematically depicts enlarged views of the intonation comb 510 and actuator assembly 512 according to an exemplary embodiment of the current disclosure.

FIG. 5C(i) shows details of the intonation comb 510 and FIG. 5C(ii) shows details of the actuator assembly 512.

Intonation comb 510 is made of a flexible material, for example plastic, such that by rotating the action wheels 516 of actuator assembly 512, leg members 511 move up and down. Actuator assembly 512 rests in the action wheels cradle 517 which is a cylindrical recess within the core guitar 105, or within a separate part 106*b* as shown in the FIGS. 6A-C.

In a well-tuned guitar, tuned for the lower tone of each string, the high pitch notes played while pressing a string against a fret close to the bridge may not be in tune. Correcting this deficiency is called adjusting the "Intonation". Adjusting the Intonation of a guitar is usually performed at a professional repair shop by adjusting the position of the string resting point at the bridge side, thus making the string longer or shorter. Adjusting the intonation of a guitar may be required when changing a string or a plurality of strings to a different type of strings for achieving a different sound on the same guitar. Not all guitars are adjustable in this matter. For example, most acoustic guitars have a fixed bridge thus their Intonation cannot be adjusted.

In the exemplary embodiment seen in this figure the resting point in each string is the string cradle 518 on each leg member 511. Thus, by providing different intonation combs 510 having different lengths of the leg members 511 and/or the height of the string cradle 518 the Intonation of the modular guitar 100 may be changed. Lengths of the leg members 511 of the intonation combs 510 are designed to be suited for a specific set of string types. Lengths of the leg members 511 and/or the height of the string cradle 518 of a specific intonation comb 510 may be all the same, or leg members 511 may have different length and/or the height of the string cradle 518 depending on the type of strings to be used.

Preferably, intonation comb 510 is a single unit. A player may release the tension on the strings or remove the strings in order to replace an intonation comb 510.

Actuator assembly 512 comprises a plurality of action wheels 516 which can be rotated by the player by inserting a rod such as a common Allen key into spaces 520 in action wheels 516. Each action wheel 516 has an eccentric axis 521 and a concentric axis 522. The concentric axis 522 of an action wheel 516 is inserted in a concentric cavity 524 of the adjacent action wheel. In this figure, the concentric cavity 524 can be seen through the spaces 520. As will be seen in the next figures, the bottom 528 of each leg member 511 rests on the eccentric axis 521 of the corresponding action wheel 516, such that rotating the action wheel 516 causes the end of the leg member (and thus the string cradle 518) to move up or down.

Figure 5D:
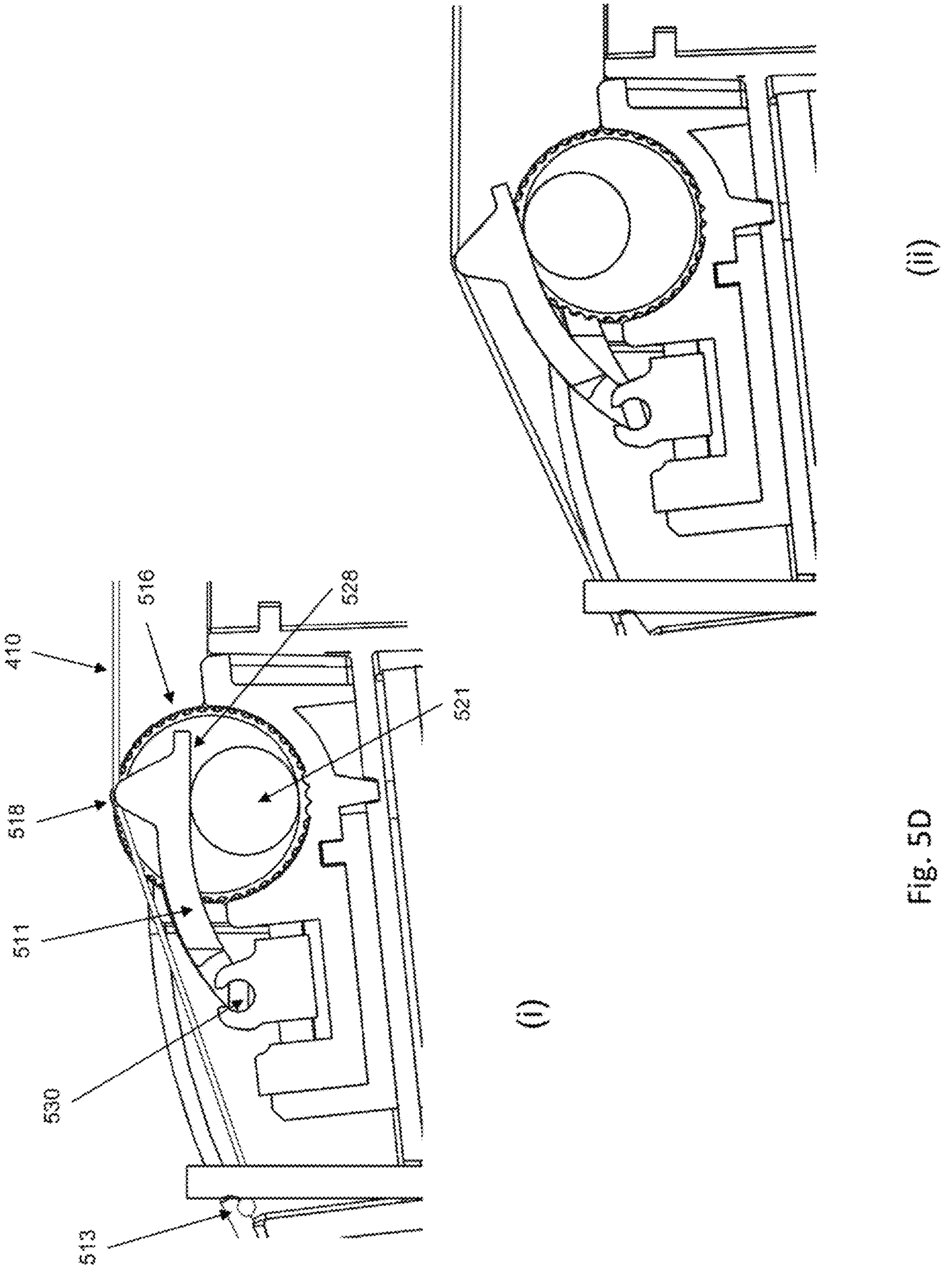

FIG. 5D(i) shows an action wheel 516 rotated such that the eccentric axis (and thus string 410) is at its minimum height.

FIG. 5D(ii) shows an action wheel 516 rotated such that the eccentric axis (and thus string 410) is at its maximum height.

Figure 5E:
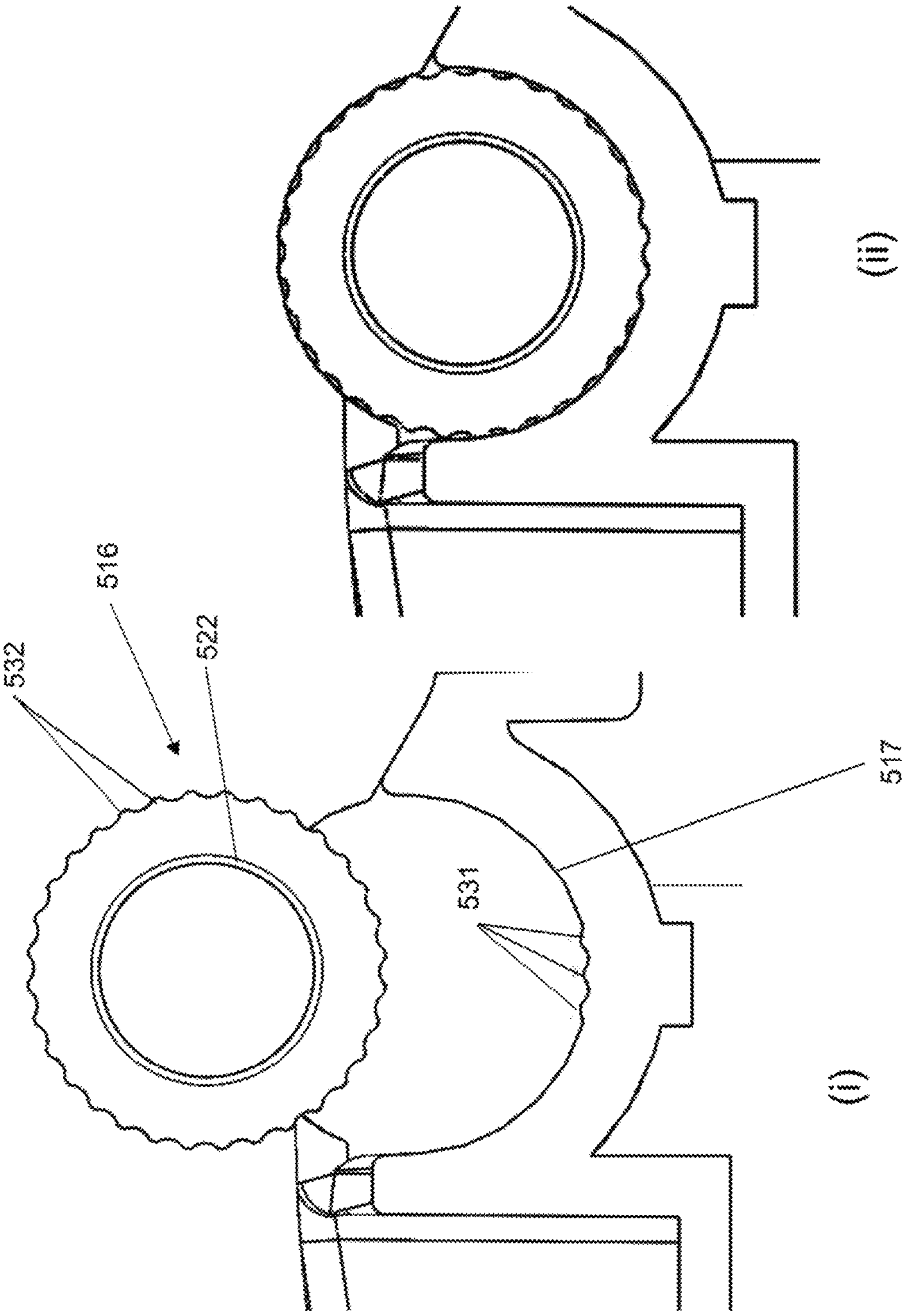

FIG. 5E(i) shows an action wheel 516 before it was inserted into wheels cradle 517 according to exemplar embodiment of the current disclosure.

FIG. 5E(ii) shows an action wheel 516 inserted into wheels cradle 517 according to an exemplary embodiment of the current disclosure.

Action wheels 516 are having striation 532 on their circumference. When the action wheels 516 are inserted into the wheels cradle 517, the striation 532 interlock with bump lines 531 on the bottom of wheels cradle 517, to avoid undesired spinning of the action wheels. The action wheels 516 can turn by skipping those bump lines in increments.

FIGS. 6A to 6E schematically depict a bridge system 106*b* in which both the Action and the Intonation of each string 410 may be individually adjusted b the player according to an exemplary embodiment of the current disclosure.

Figure 6A:
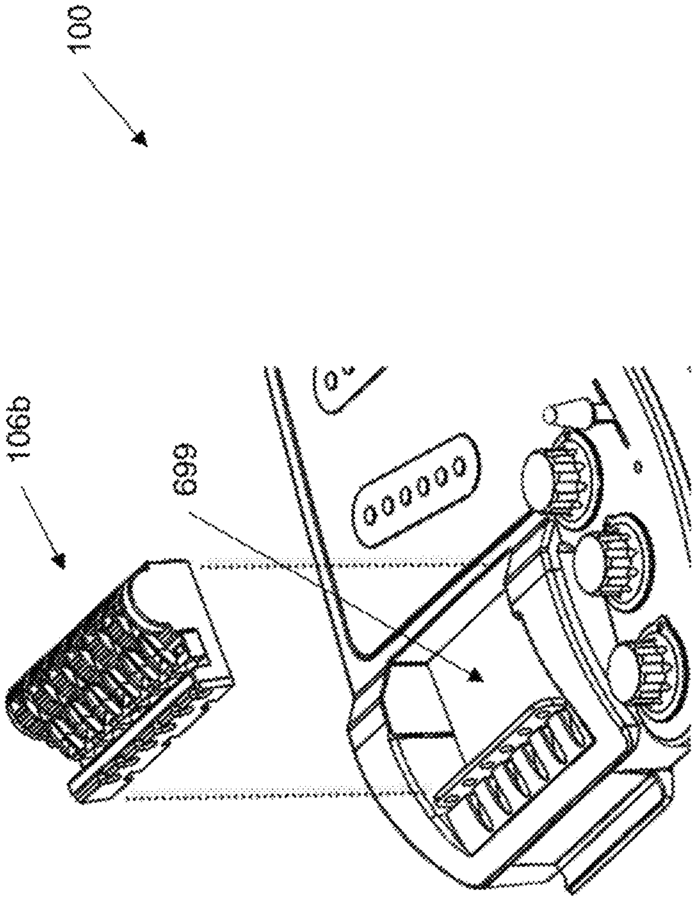
FIGS. 6A to 6C schematically depict a bridge system 106*b* in which both the Action and the Intonation of each string 410 may be individually adjusted by the player according to some embodiments of the current disclosure.
Figure 6B:
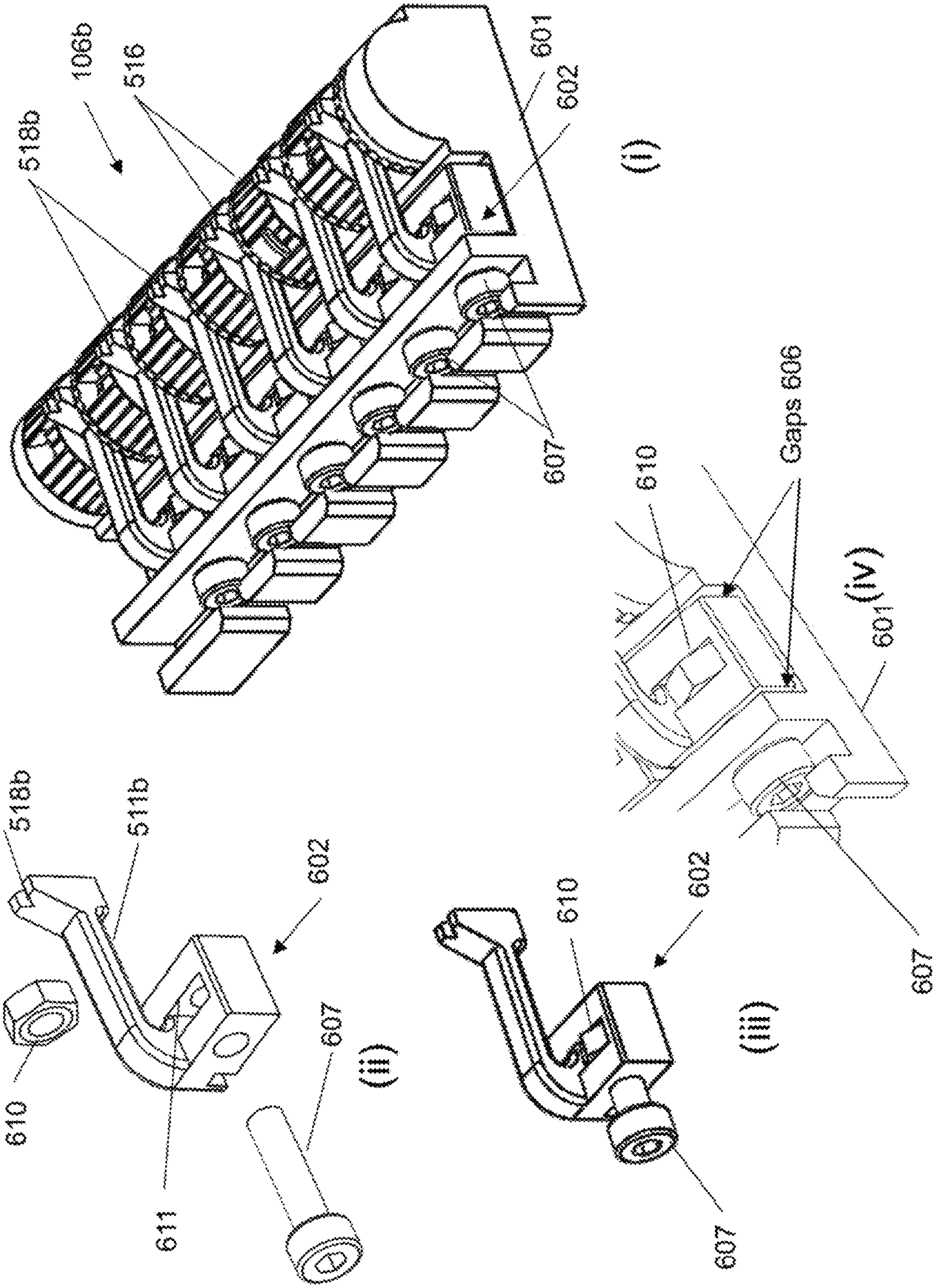
Figure 6C:
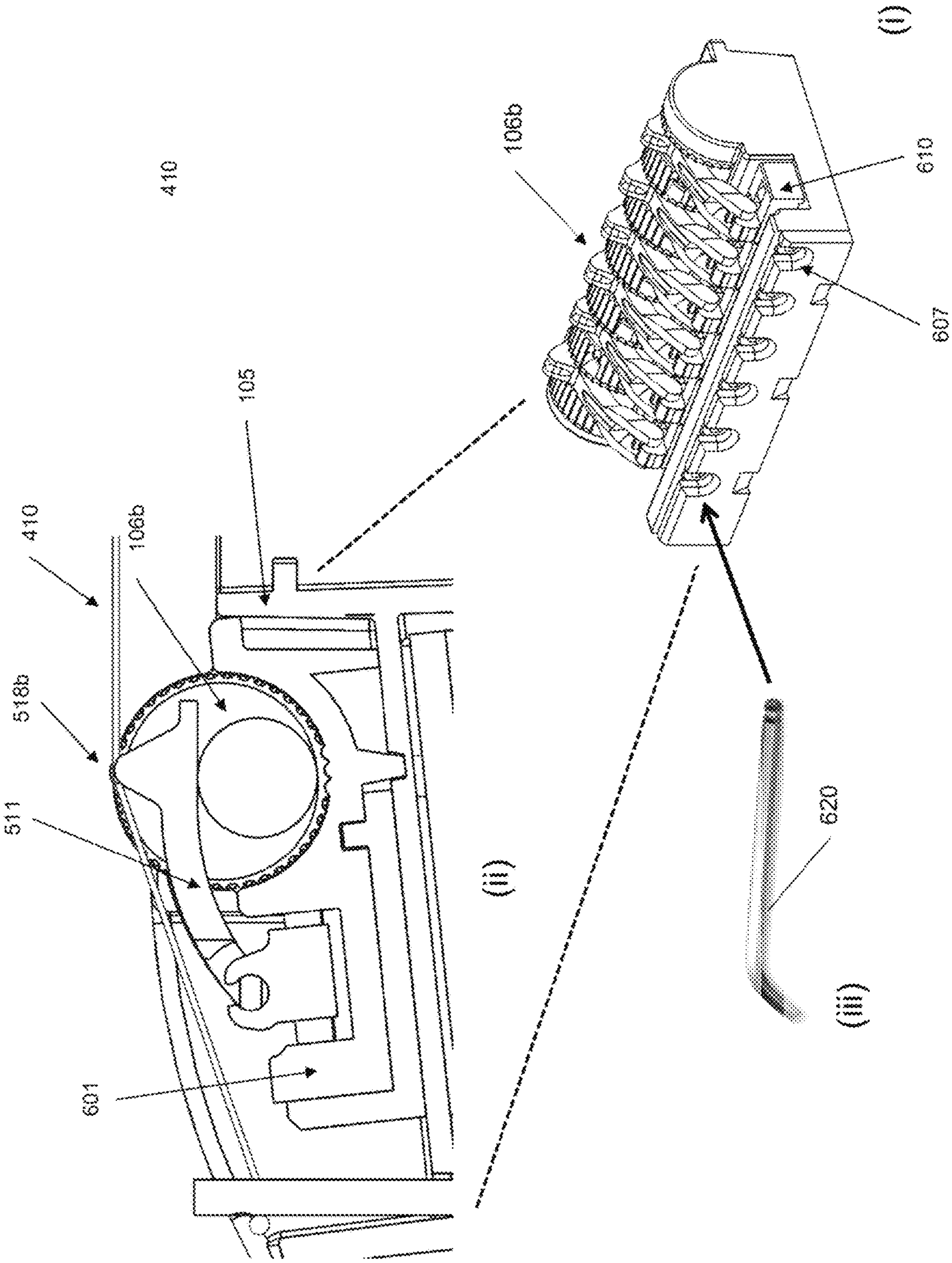
Figure 6D:
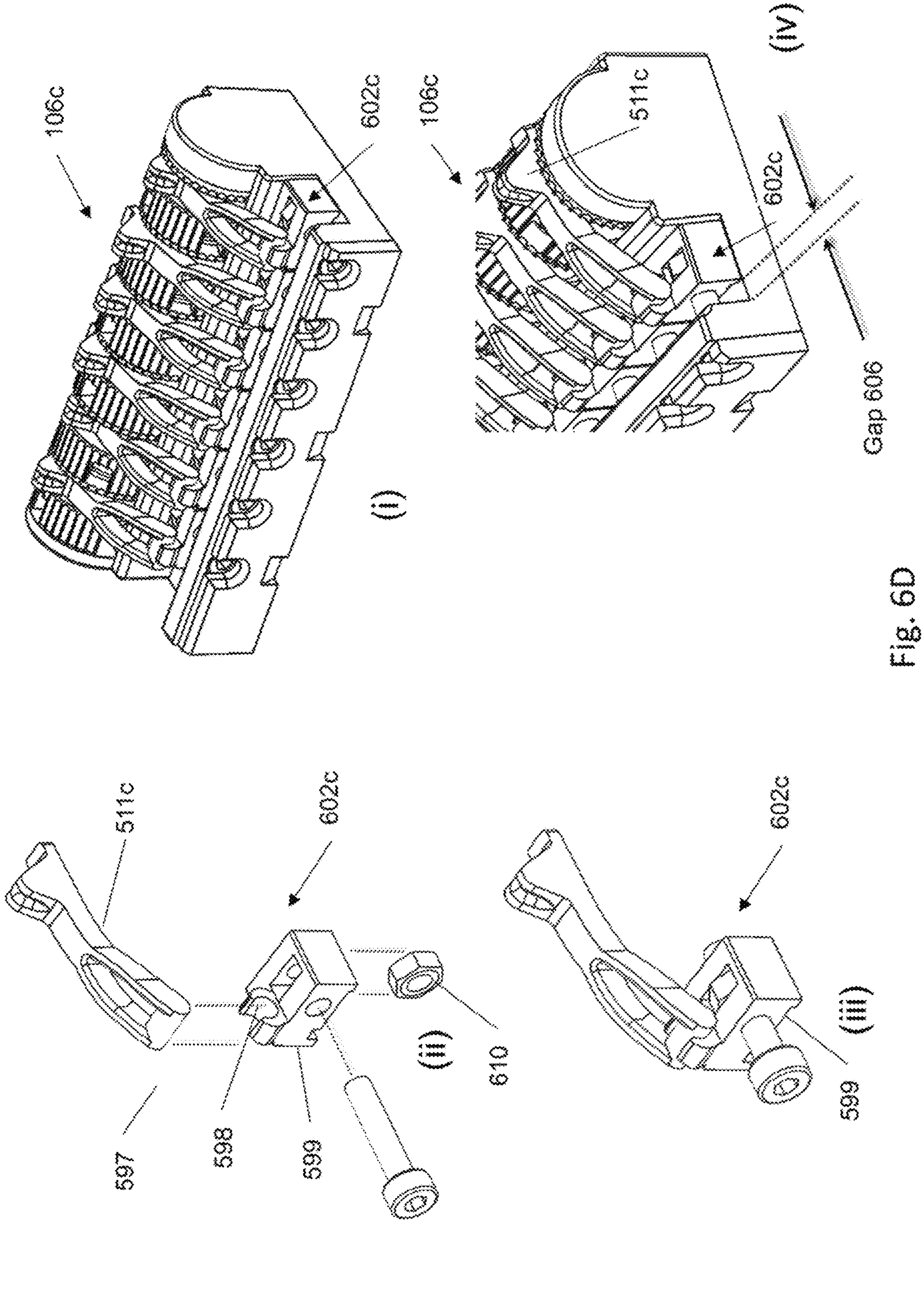
FIG. 6D schematically depicts more detailed views of bridge system 106*c* (also called calibration center housing) in which both the Action and the Intonation of each string may be individually adjusted by the player according to some embodiments of the current disclosure.
Figure 6E:
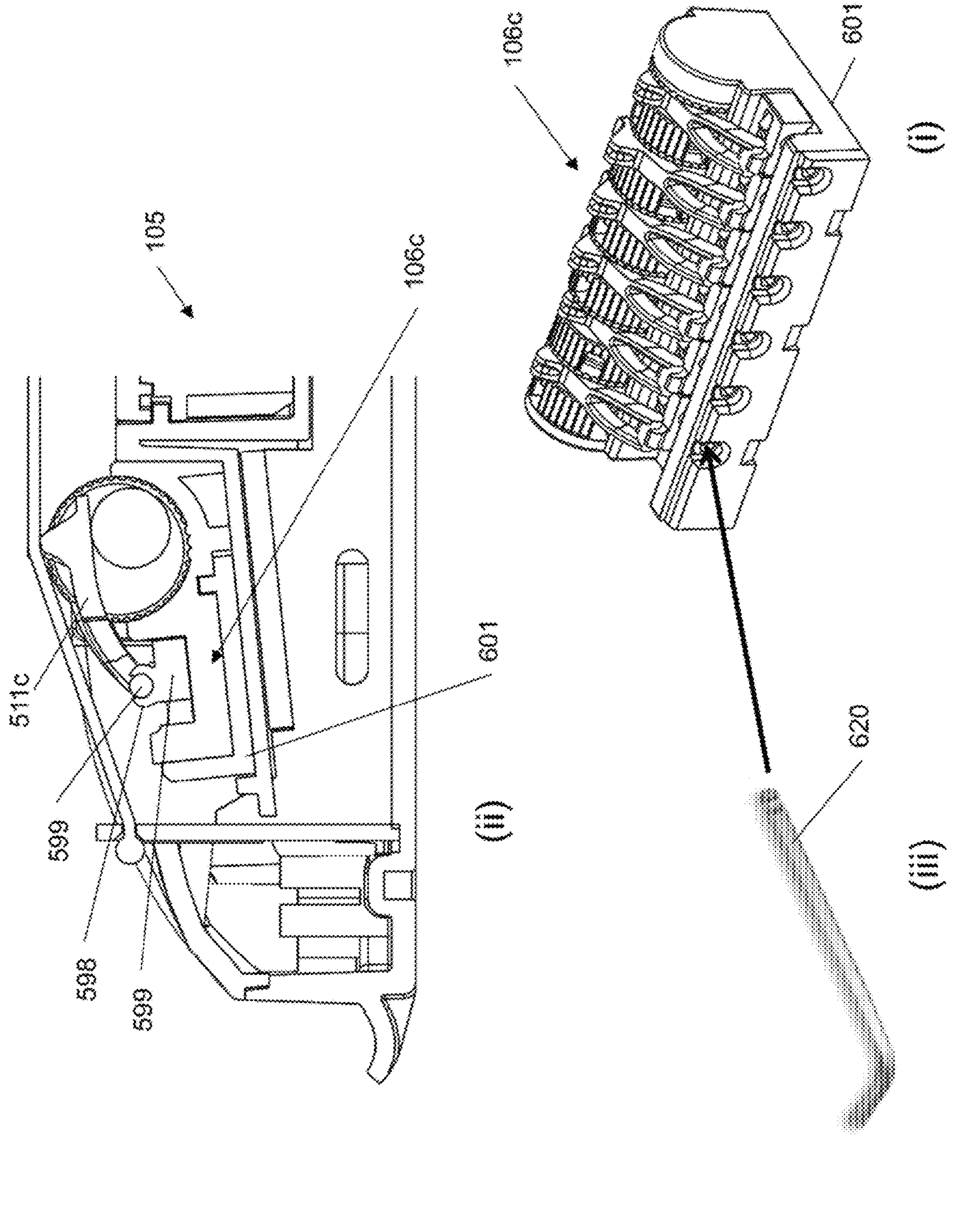
FIG. 6E schematically depicts more detailed views of bridge system 106*c* and its function according to some embodiments of the current disclosure.

FIGS. 6A to 6C schematically depict a bridge system 106*b* which flexible leg member 511*b* is used, while FIGS. 6D and 6E schematically depict a bridge system 106*c* in which leg member 511*c* is a rigid member movable within a socket in a modified intonation adjusting device 602*c*.

The adjustment of the Action in bridge system 106*b* is similar or identical to that of bridge system 106*a* and thus its explanation will not be repeated here. The difference between bridge system 106*a* and bridge system 106*b* is that intonation comb 510 of 106*a* is replaced with a set of intonation adjusting device(s) 602 in which the position of the string cradles 518*b* can be individually adjusted by the player.

FIG. 6A schematically depicts a general view of a modular guitar 100 having a bay 699 for receiving bridge system 106*b* in which both the Action and the intonation of each string 410 may be individually adjusted by the player according to an exemplary embodiment of the current disclosure.

Optionally, bridge system 106*a* and 106*b* are interchangeable in modular guitar 100, allowing easy upgrade.

FIG. 6B schematically depicts more detailed views of bridge system 106*b* (also called calibration center housing) in which both the Action and the Intonation of each string may be individually adjusted by the player according to an exemplary embodiment of the current disclosure.

FIG. 6B(i) shows the assembled bridge system 106*b*.

FIG. 6B(ii) shows an exploded view of intonation adjusting device 602.

FIG. 6B(iii) shows an assembled intonation adjusting device 602.

FIG. 6B(iv) shows the range of motion 606 of flexible leg member 511*b* allowed by intonation adjusting device 602.

In the depicted embodiment the bridge system 1061 comprises a housing 601. Action wheels 516 are exposed and may be operated as already discusses to adjust the Action (height) of the string cradle 518*b* on each leg member 511*b*.

However, in this exemplary embodiment, the position of each leg member 511*b* is adjustable by turning screw 607 with a common tool such as an Allen key. Screw 607 is engaged with a nut 610, for example an M-3 nut locked in slot 611 within the intonation adjusting device 602, causing forward/backward motion of the intonation arm 511*b*.

Gaps 606 allow sufficient motion of the intonation adjusting device 602 relative to the housing 601, for example plus/minus 1.5 mm. However, smaller or larger gaps may be used.

FIG. 6C schematically depicts more detailed views of bridge system 106*b* and its function according to an exemplary embodiment of the current disclosure. In some embodiments, bridge system 106*b* of FIG. 6C includes leg member 511*b* that move around an axis.

FIG. 6C(i) shows a cross sectional view of the assembled bridge system 106*b*.

FIG. 6C(ii) shows a cross sectional view of system 106*b* installed in a core guitar 105.

FIG. 6C(iii) demonstrates how the same Allen key 620 may be used to adjust both the Action and intonation using bridge system 106*b*.

It should be noted that while bridge systems disclosed herein in relation to a modular electric guitar, their use within non-modular guitars, or non-electric guitars or in other string musical instruments is within the scope of the current disclosure.

FIGS. 6D and 6E schematically depict a bridge system 106*c* in which leg member 511*c* is a rigid member movable within a socket in a modified intonation adjusting device 602*c*, according to another exemplary embodiment of the disclosure.

To reduce cluttering of the text and figures, only the differences between the embodiment seen in FIGS. 6A-C and the embodiment seen in FIGS. 6D and 6E are marked and explained.

FIG. 6D schematically depicts more detailed views of bridge system 106*c* (also called calibration center housing) in which both the Action and the intimation of each string may be individually adjusted by the player according to an exemplary embodiment of the current disclosure.

FIG. 6D(i) shows the assembled bridge system 106*c*.

FIG. 6D(ii) shows an exploded view of intonation adjusting device 602*c*.

FIG. 6D(iii) shows an assembled intonation adjusting device 602*c*.

FIG. 6D(iv) shows the range of motion 606 of rigid leg member 511*c* allowed by intonation adjusting device 602*c*.

As can be seen, intonation adjusting device 602*c* comprises a base 599 having a bay 598 for receiving pivot axis 597 at the proximal end of rigid leg member 511*c*. Preferably, rigid leg member 511*c* is made of plastic. The flexibility of flexible leg member 511*b* is thus replaced by pivoting rigid leg member 511*c* about the pivot axis 597 within bay 598 in base 599.

FIG. 6E schematically depicts more detailed views of bridge system 106*c* and its function according to another exemplary embodiment of the current disclosure.

FIG. 6E(i) shows a general view of the assembled bridge system 106*c*.

FIG. 6E(ii) shows a cross sectional view of bridge system 106*c* installed in a core guitar 105.

FIG. 6E(iii) demonstrates how the same Allen key 620 may be used to adjust both the Action and Intonation bridge system 106*c*.

It should be noted that while bridge systems disclosed herein in relation to a modular electric guitar, their use within non-modular guitars, or non-electric guitars or in other string musical instruments is within the scope of the current disclosure.

FIGS. 7A to 7F schematically depict the assembly and disassembly of a core guitar 105 to a body 102 by the player using a unique locking system according to an exemplary embodiment of the current disclosure.

Generally, one will not assemble the core guitar 105 into a body 102 without first inserting the pickup cassette 107 into the core 105.

Figure 7A:
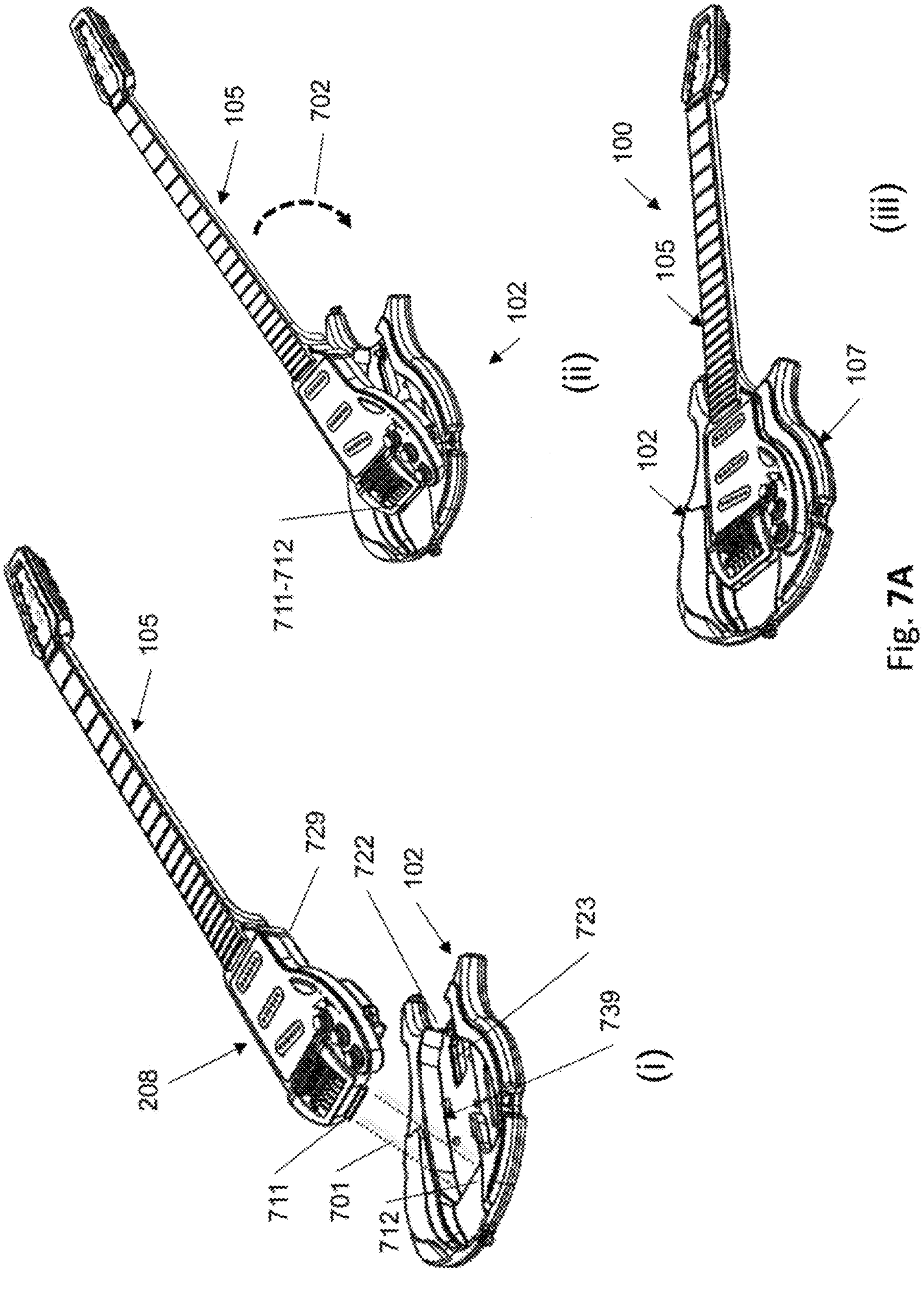
FIGS. 7A to 7F schematically depict the assembly and disassembly of a core guitar 105 to a body 102 by the player (pickup cassette 107 not shown in FIGS. 7*a*(*i*) and (*ii*)) according to some embodiments of the current disclosure.

FIG. 7A(i) schematically depict the core guitar 105 before it is attached to a body 102 by the player according to an exemplary embodiment of the current disclosure.

FIG. 7A(ii) schematically depict the core guitar 105 in the process of being attached to a body 102 by the player according to an exemplary embodiment of the current disclosure.

FIG. 7A(iii) schematically depict the core guitar 105 as it is attached to a body 102 by the player according to an exemplary embodiment of the current disclosure.

To attach core guitar 105 to a body 102, the player starts (FIG. 7A(i)) by placing 701 the neck's latch 711 at the end of core guitar 105 at the rest point 712 in the body 102. The player then (FIG. 7A(ii)) rotates 702 the core guitar 105 about the rest point 712 until the neck's release mechanism 729 in core guitar 105 is engaged with the body's lock tooth 722 on the upper shell of body 102. As the core guitar 105 is fully inserted into body bay 739, the neck's release mechanism 729 clicks into locking state, a modular guitar 100 according to this exemplary embodiment is assembled (FIG. 7A(iii)).

Figure 7B:
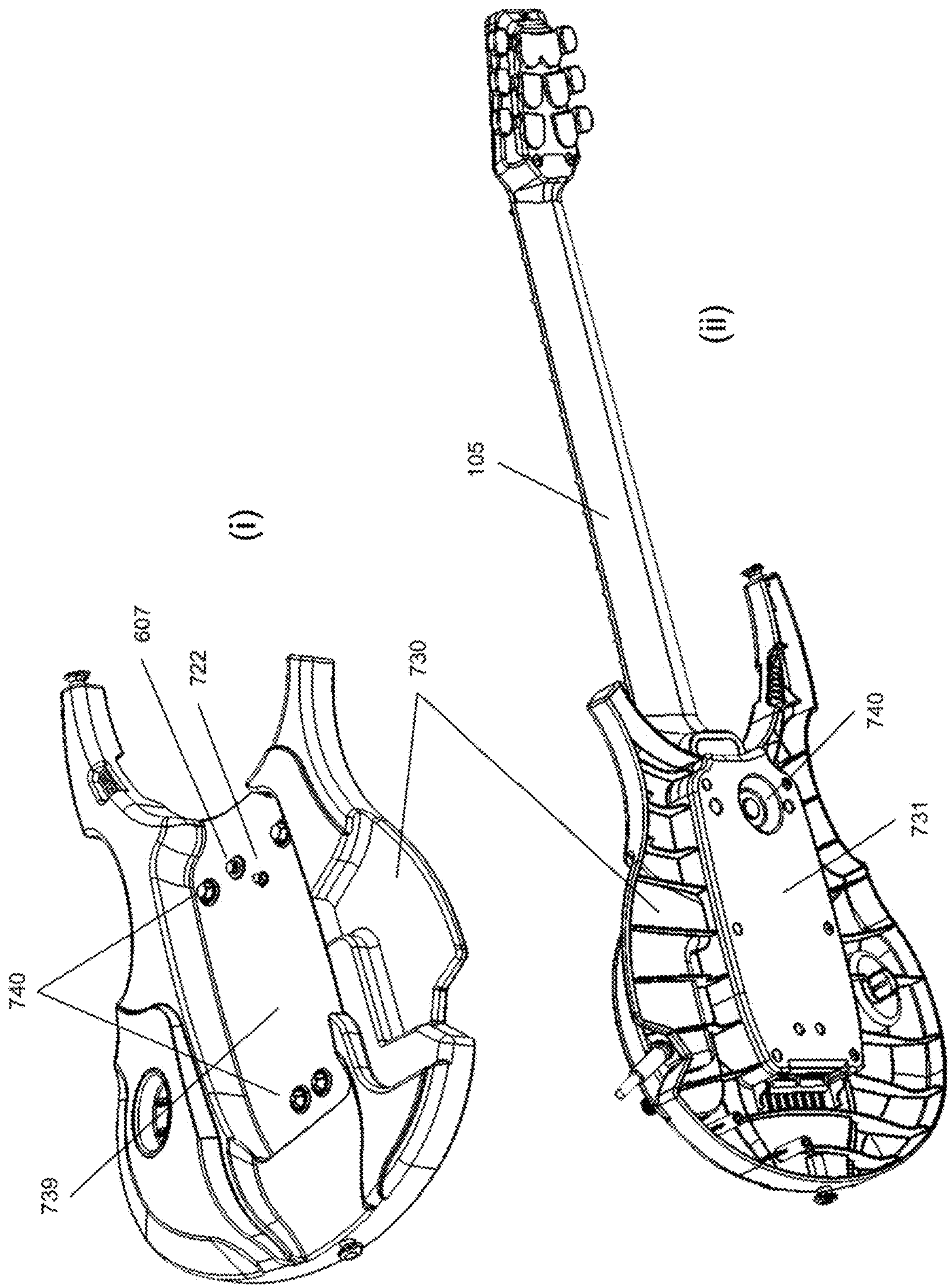

FIG. 7B(i) schematically depict the body 102 before it is attached to a core guitar 105 according to an exemplary embodiment of the current disclosure.

FIG. 7B(ii) schematically depict the back side of assembled modular guitar 100 showing the body 102 attached to a core guitar 105 according to an exemplary embodiment of the current disclosure.

In the exemplary embodiment, body 102 is a plastic box having a lower shell 730 and a lower shell 731. The shells are made of plastic and are joined together by plastic joining techniques known in the art. However, the shells may also be made of other materials like metal (e.g. aluminum, titanium), and the body 102 may also be made of solid material such as wood or by solid plastic machining. Moreover, any combination of materials may be used, formed, finished, and joined together in different techniques known in the art, to create a body 102 with different ornamental forms, as long as the body bay 739 is kept technically viable according to essential guitar 120 manufacturer(s) chosen embodiment. Moreover, Elastomeric pillows 740 prevent rattling of core guitar 105 and avoid squeaking between the two parts as a result of plastic to plastic friction when it is locked to body 102.

A body release hole 723 allows the player to press the neck's release button 721 from the lower side of body 102 (FIG. 7B(ii)).

FIG. 7B(1) schematically depicts a core guitar 105 as it is locked to a body 102 by the player, according to some embodiments of the current disclosure. After core guitar 105 is positioned tightly against body 102, the core guitar 105 and the body 102 should be locked in place. Accordingly, several means for locking these two units together may be implemented. For example, a pin 741 may be pushed into a hole at lower shell 730 and be trapped by a bent wire spring 742. In some embodiments, pin 741 may have attached a spring 742 to lock position of the pin 741. In some embodiments, screw 743 may be screwed into a hole along lower shell 730 in order to maintain connection between core guitar 105 and body 102. Screw 734 may comprise an end 744 that enables a quick and easy screwing process by the user or player of the string instrument, since screw end 744 is easy to manually handle.

FIG. 7B(2) schematically depicts elastomeric units of body 102 preventing noise from occurring due to friction between core guitar 105 and body 102, according to some embodiments of the current disclosure. According to some embodiments, body 102, specifically body bay 739 may comprise elastomeric units 750, which may be made of silicone. Elastomeric units 750 may have a shape of a cone, which is inserted between an upper cone 755 located as part of core guitar 105 and a lower cone 757 located as part of body 102, in order to substantially prevent movement in any direction of core guitar 105 and body 102 with respect to one another. Accordingly, elastomeric cones 750 are in fact location pins for locating core guitar 105 with respect to body 102, while acting as shock absorbers that prevent noise from occurring due to friction that may be present between two plastic parts, i.e., core guitar 105 and body 102.

Figure 7C:
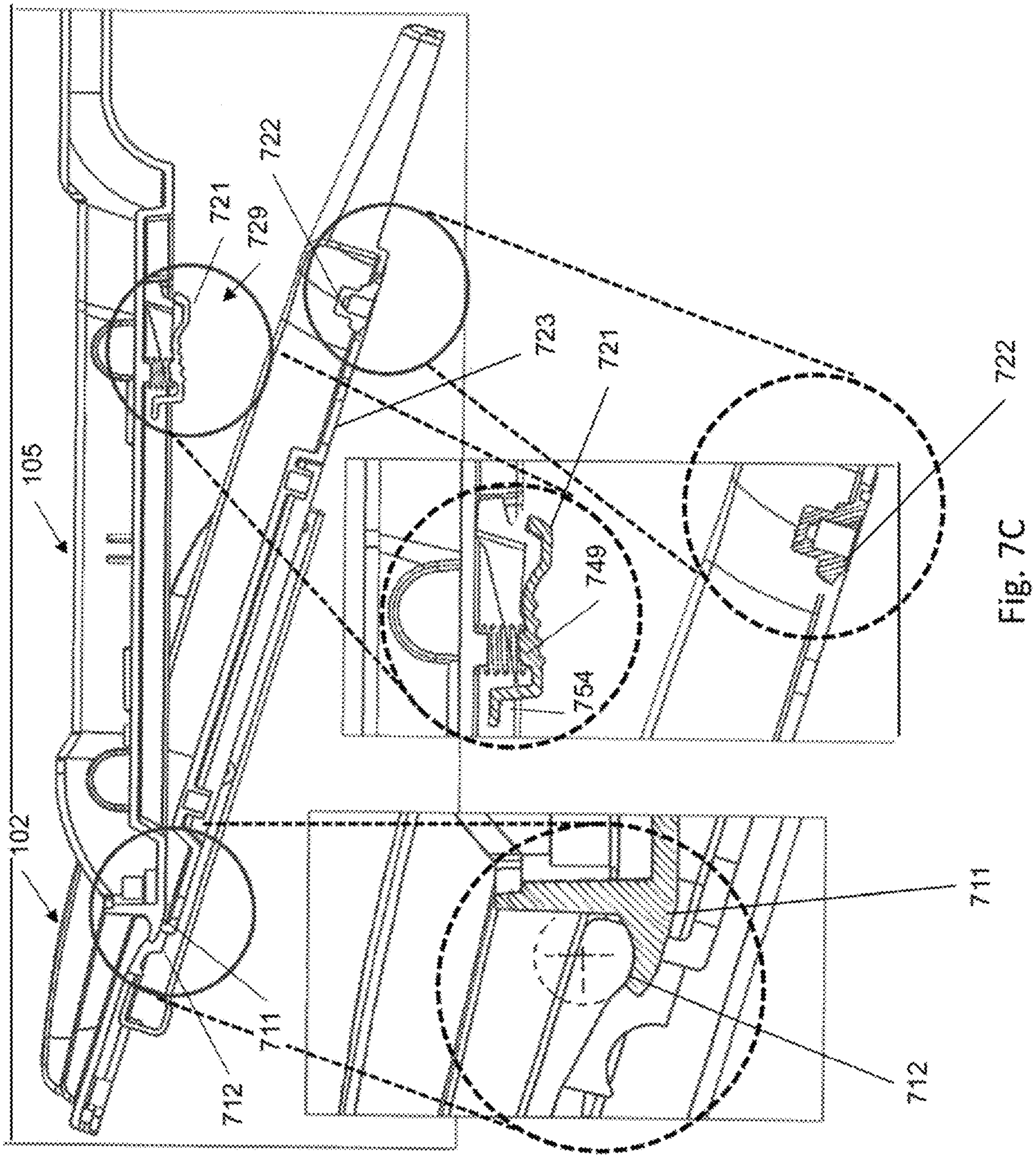

FIG. 7C schematically depicts a cutout view of a core guitar 105 in the process of being attached to a body 102 before the two parts are fully engaged (as seen in FIG. 7A(ii)), according to an exemplary embodiment of the current disclosure.

In addition to the parts already seen in FIGS. 7A and 7B, some details of the locking system can be seen. Neck's release button 721, neck's release mechanism 729, and spring 749 are clearly seen, as well as the body's lock tooth 722 designed to engage the Neck's release button 721.

Figure 7D:
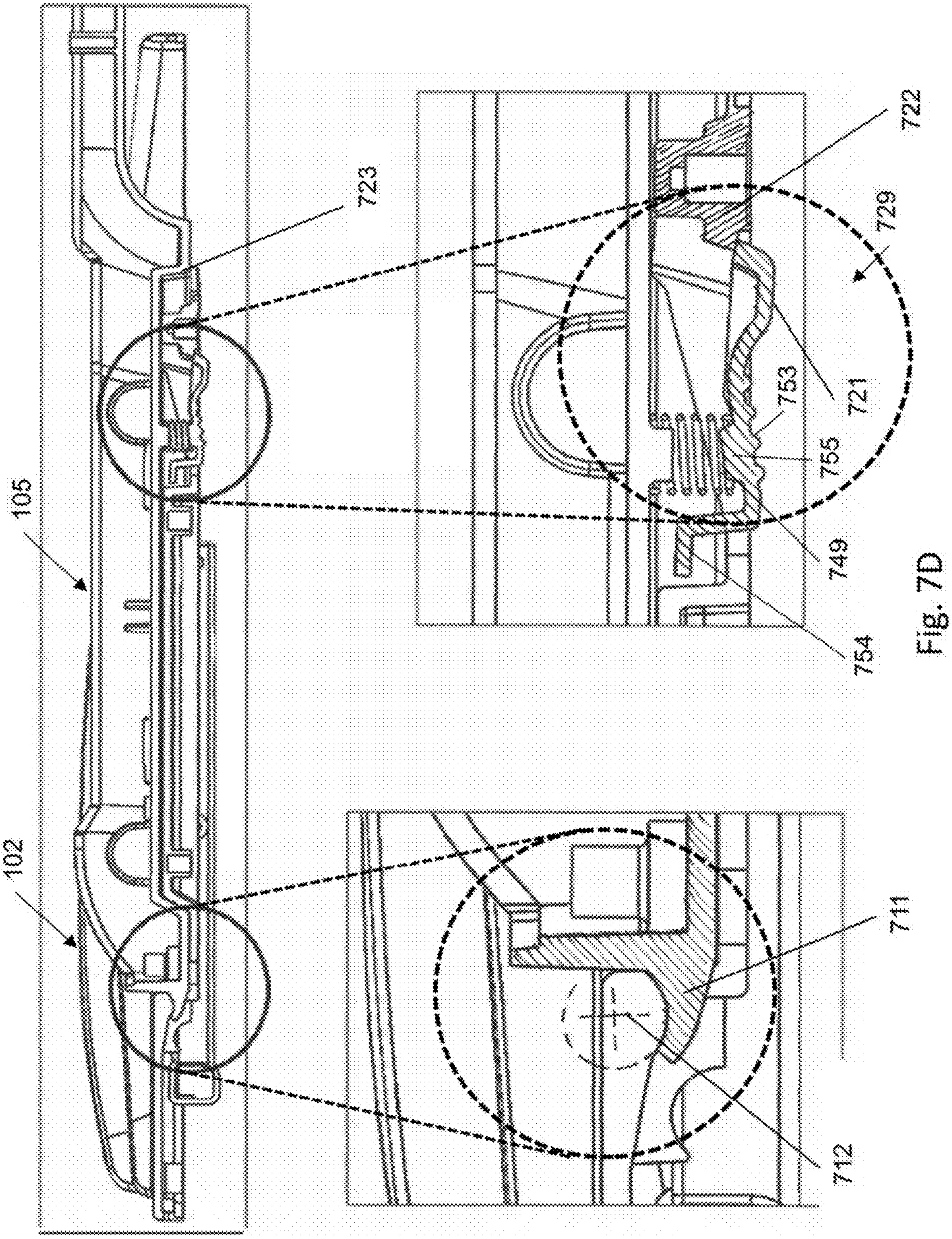

FIG. 7D schematically depicts a core guitar 105 as it is attached to a body 102 (as seen in FIG. 7A(ii)), according to an exemplary embodiment of the current disclosure. In parallel to the details seen at FIG. 7C, some details of the locking system can be seen here in a locked position.

Figure 7E:
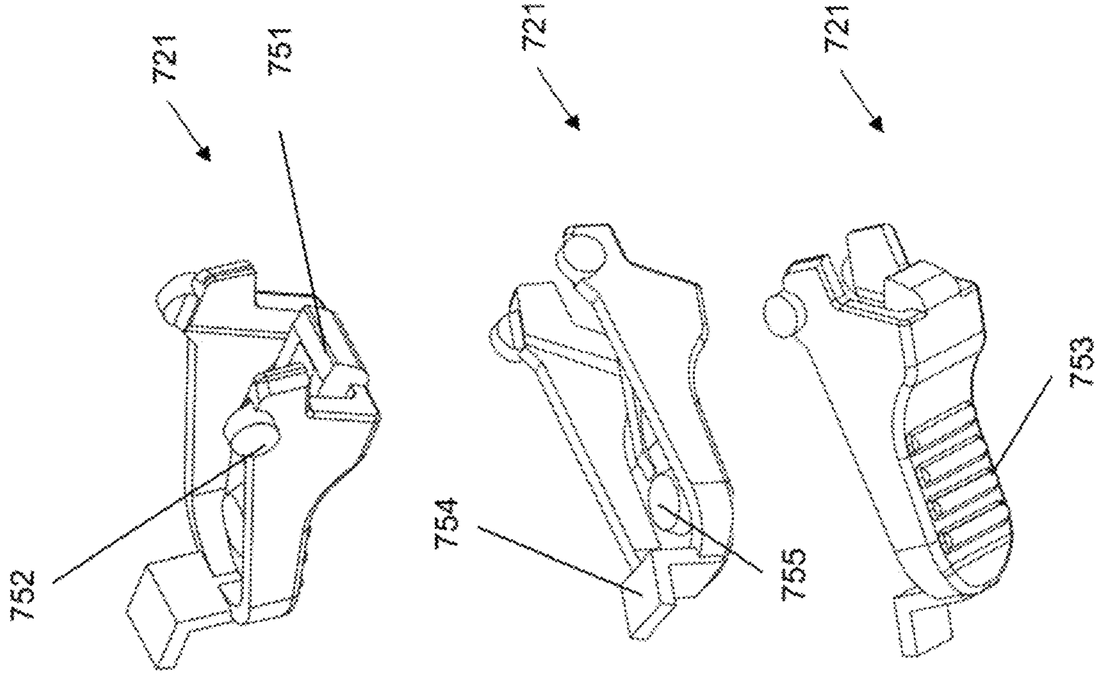

FIG. 7E schematically depicts several views of the neck's release button 721 according to an exemplary embodiment of the current disclosure.

These views show: the locking surface 751 that engages the body's lock tooth 722; the pivots 752 about which the neck's release button 721 rotates when the player presses on the finger push surface 753 in order to release the neck's release mechanism 729; The Movement limit surface 754 that holds the neck's release button 721 against the push of spring 749; and the spring cradle 755 that helps to keep spring 749 in place (some of these elements also marked in FIG. 7D).

Figure 7F:
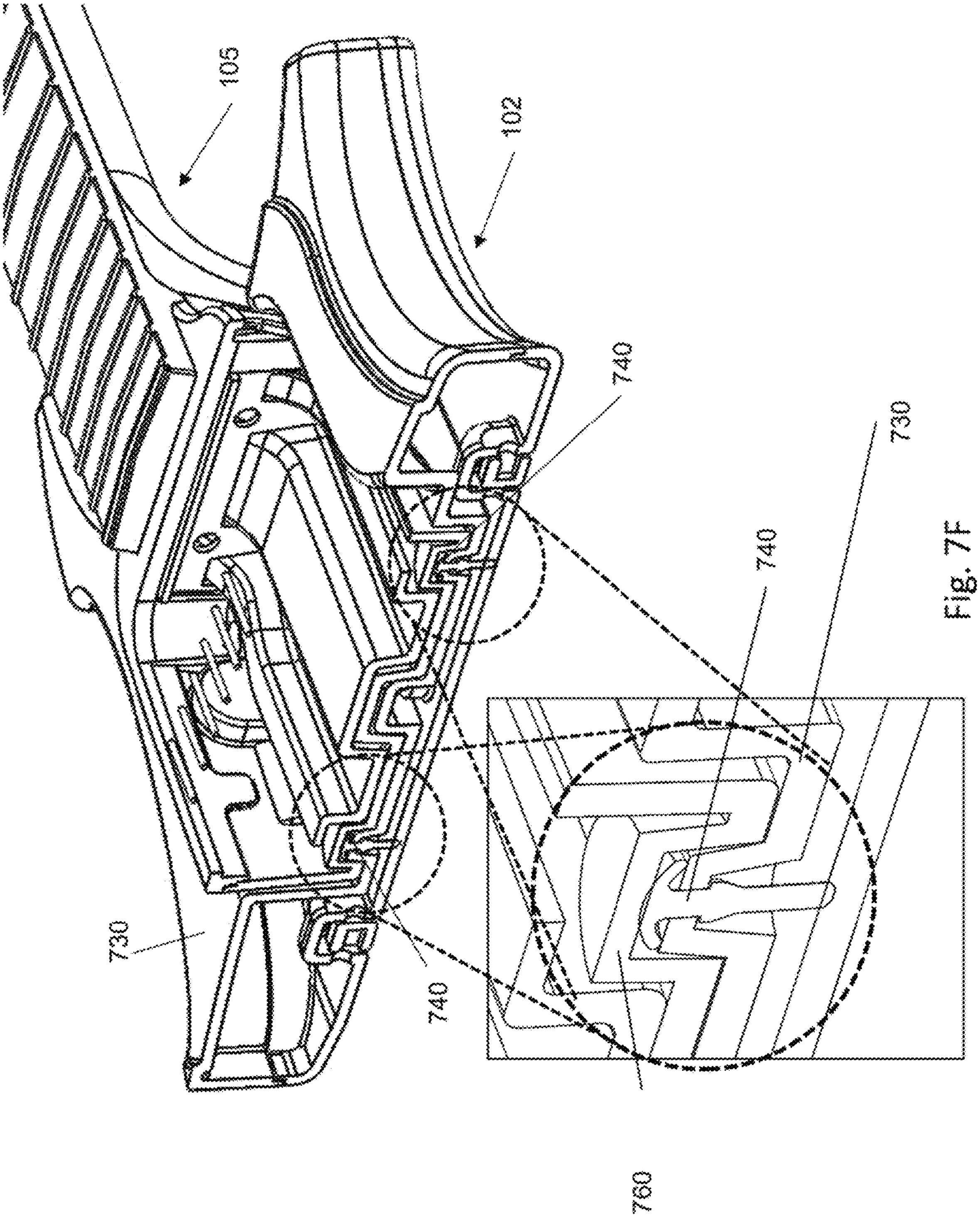

FIG. 7F schematically depicts cutoff views showing the operation of elastomeric pillows 740 according to an exemplary embodiment of the current disclosure.

When the core guitar 105 as it is attached to a body 102, elastomeric pillows 740 are pressed between the body's lower shell 730 and the neck floor 760, to stabilize the locking system and prevent rattling.

FIGS. 8A to 8D schematically depict a modular guitar 100 installed with a body 102L having a built-in retractable kickstand 800 enabling the player to stand the modular guitar on the floor when not in use, according to an exemplary embodiment of the current disclosure.

Figure 8A:
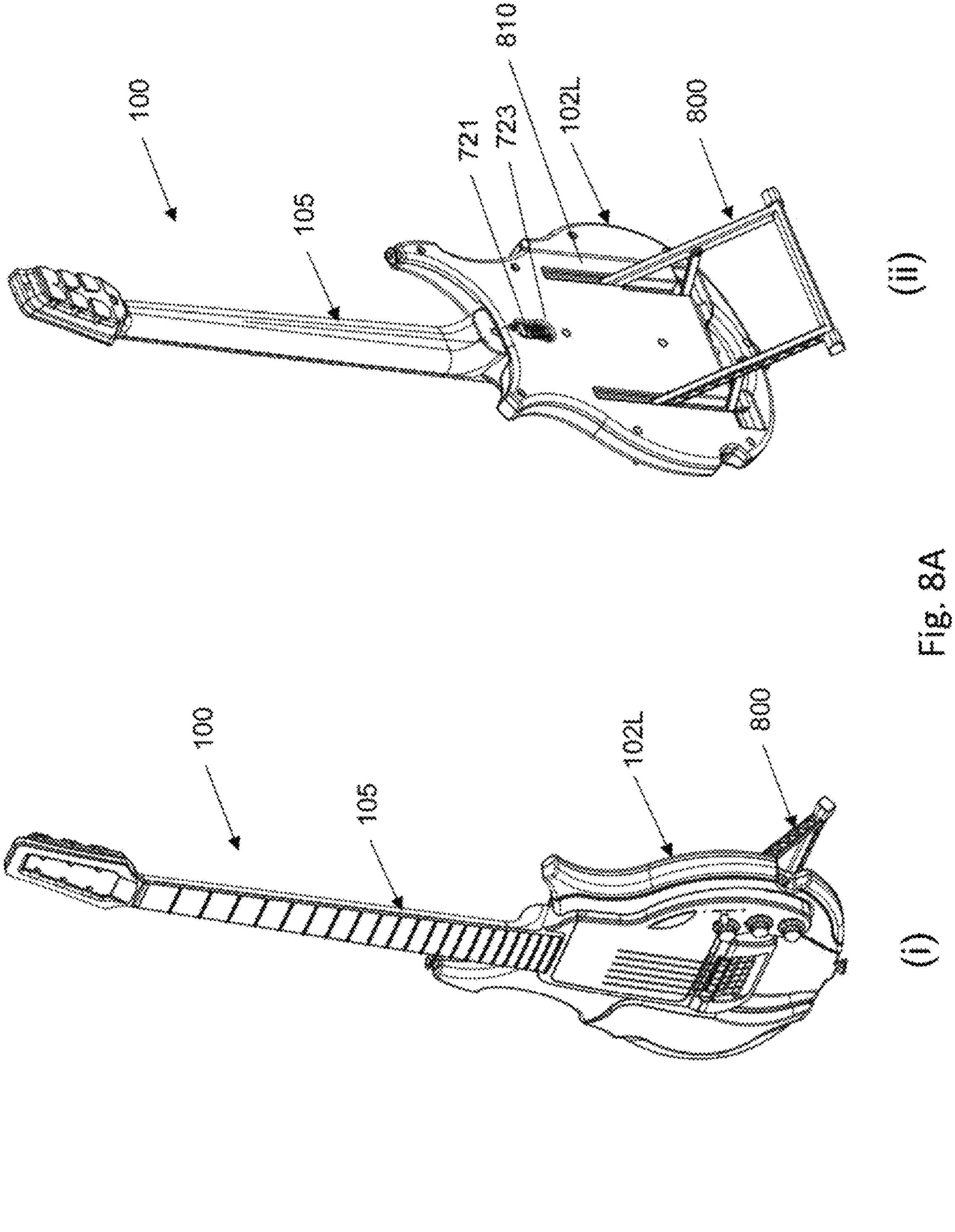
FIGS. 8A to 8D schematically depict a modular guitar 100 installed with a body 102L having a built-in retractable kickstand 800 enabling the player to stand the modular guitar on the floor when not in use, according to some embodiments of the current disclosure.

FIG. 8A(i) schematically shows a front view of a modular guitar 100 installed with a body 102L having a built-in retractable kickstand 800.

FIG. 8A(ii) schematically shows a back view of a modular guitar 100 installed with a body 102L having a built-in retractable kickstand 800.

Figure 8B:
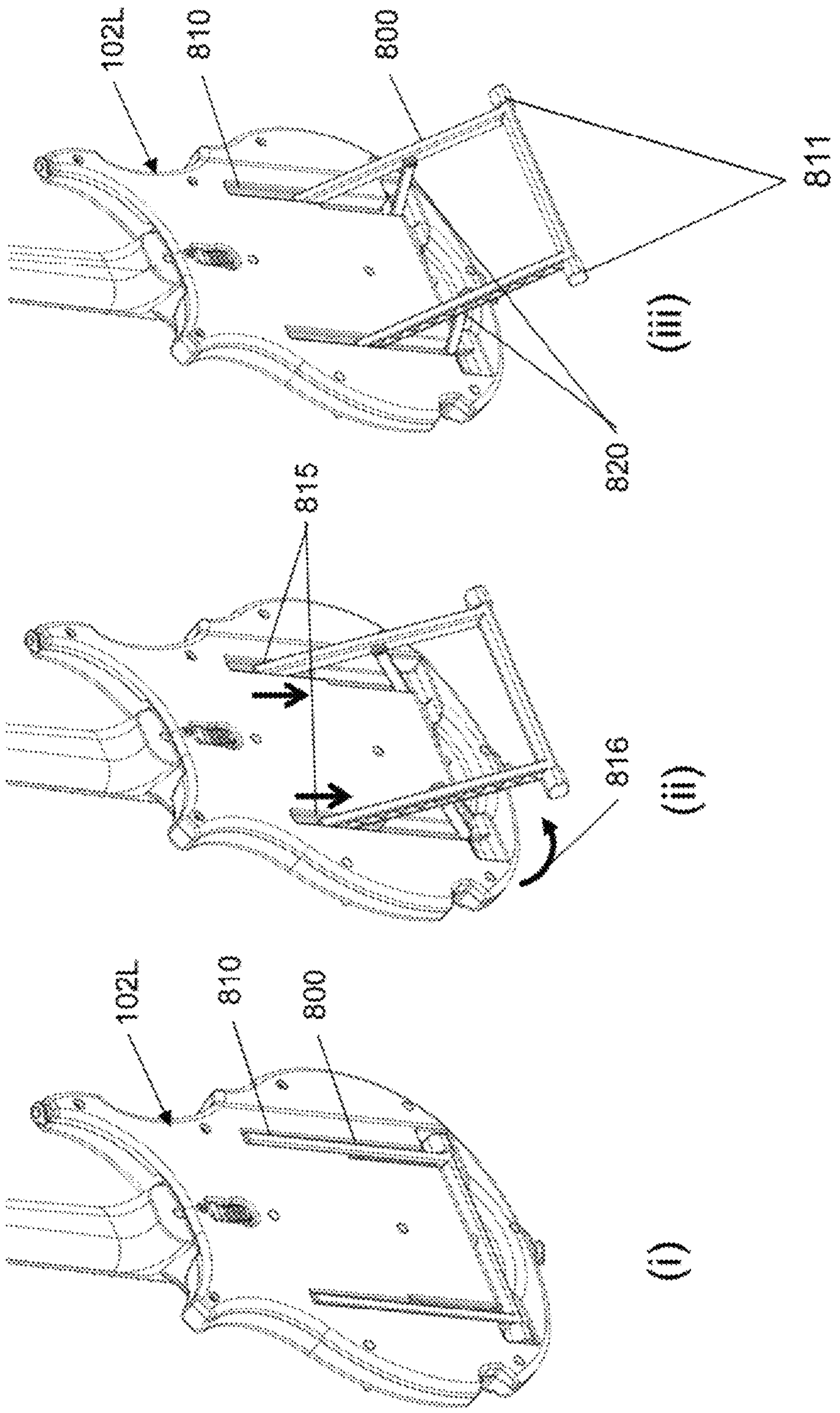

FIG. 8B schematically shows back views of a modular guitar 100 installed with a body 102L having a built-in retractable kickstand 800 in different stages of deploying the built-in retractable kickstand 800, according to an exemplary embodiment of the current disclosure.

FIG. 8B(i) schematically shows the retractable kickstand 800 in a fully retracted state, stored within a recess 810 in body 102L.

FIG. 8B(ii) schematically shows the retractable kickstand 800 in a partially deployed state.

FIG. 8B(iii) schematically shows the retractable kickstand 800 in a fully deployed state, outside recess 810. Kickstand's rubber ends 811 provide both traction with the floor, as well as preventing the kickstand 800 from rattling within recess 810 during playing the modular guitar 100.

As kickstand 800 is deployed, it slides 815 within the recess 810, and pivots outwards 816. Support members 820 stabilize kickstand 800 when in a fully deployed state.

Figure 8C:
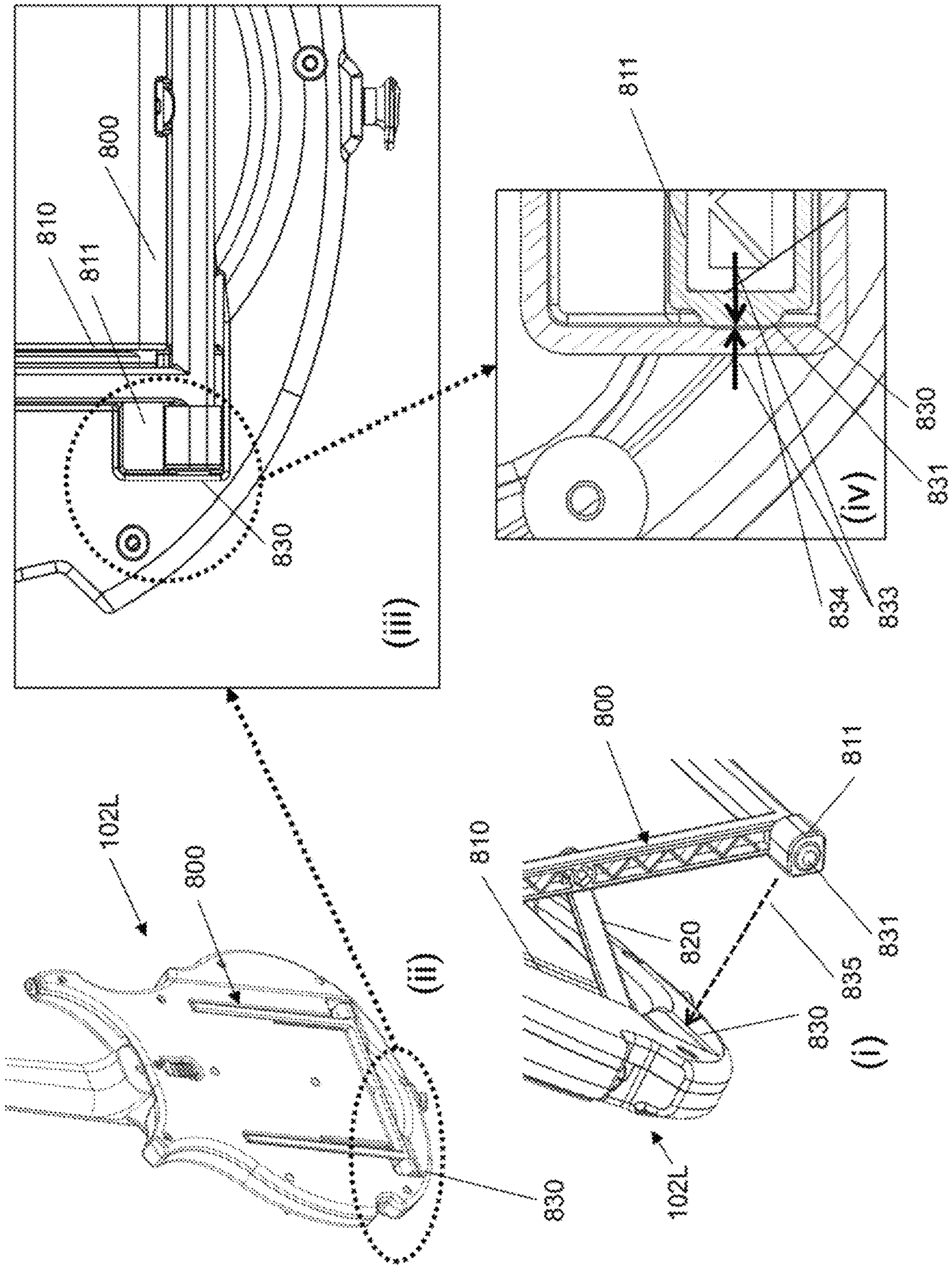

FIG. 8C schematically depicts some details of retractable kickstand 800 according to an exemplary embodiment of the current disclosure.

FIG. 8C(i) shows how retractable kickstand 800 folds such that rubber ends 811 are inserted 835 into the pockets 830 which are part of recess 810 in the back of body 102L.

FIG. 8C(ii) shows how retractable kickstand 800 already folded such that 811 rubber ends 811 are inserted 835 into the pockets 830 which are part of recess 810 in the hack of body 102L.

FIG. 8C(iii) shows an enlarged section of FIG. 8C(ii).

FIG. 8C(iv) is an enlarged section of FIG. 8C(iii), showing how the tip 831 of rubber end 811 is pressed 833 against the wall 834 of pocket 830, thus securing the retractable kickstand 800 in place, and preventing it from rattling when the modular guitar is played.

Figure 8D:
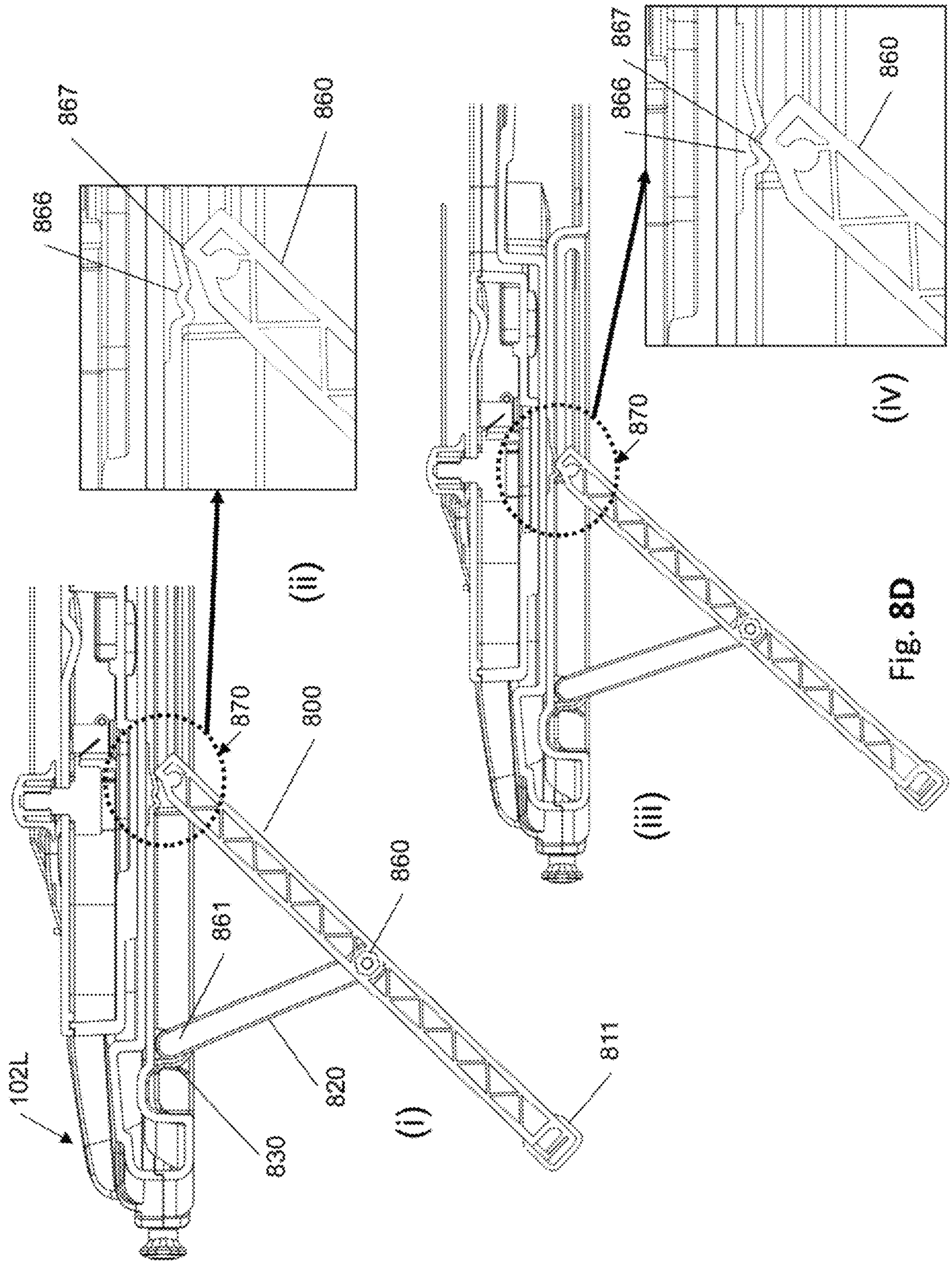

FIG. 8D schematically depicts some details showing how retractable kickstand 800 is locked in the deployed state, according to an exemplary embodiment of the current disclosure.

FIG. 8D(i) shows the retractable kickstand 800 just before it is fully deployed. The pivot points 860 and 861 of support member 820, and kickstand locking mechanism 870 are marked.

FIG. 8D(ii) is an enlarged section of FIG. 8D(i), showing flexible plastic leaf spring 866 before it catches the kickstand's corner 867.

FIG. 8D(iii) shows the retractable kickstand 800 as it is fully deployed.

FIG. 8D(iv) is an enlarged section of FIG. 8D(iii), showing plastic leaf spring 866 catches kickstand's corner 867 thus securing kickstand 800 in a secure locking position.

Figure 9:
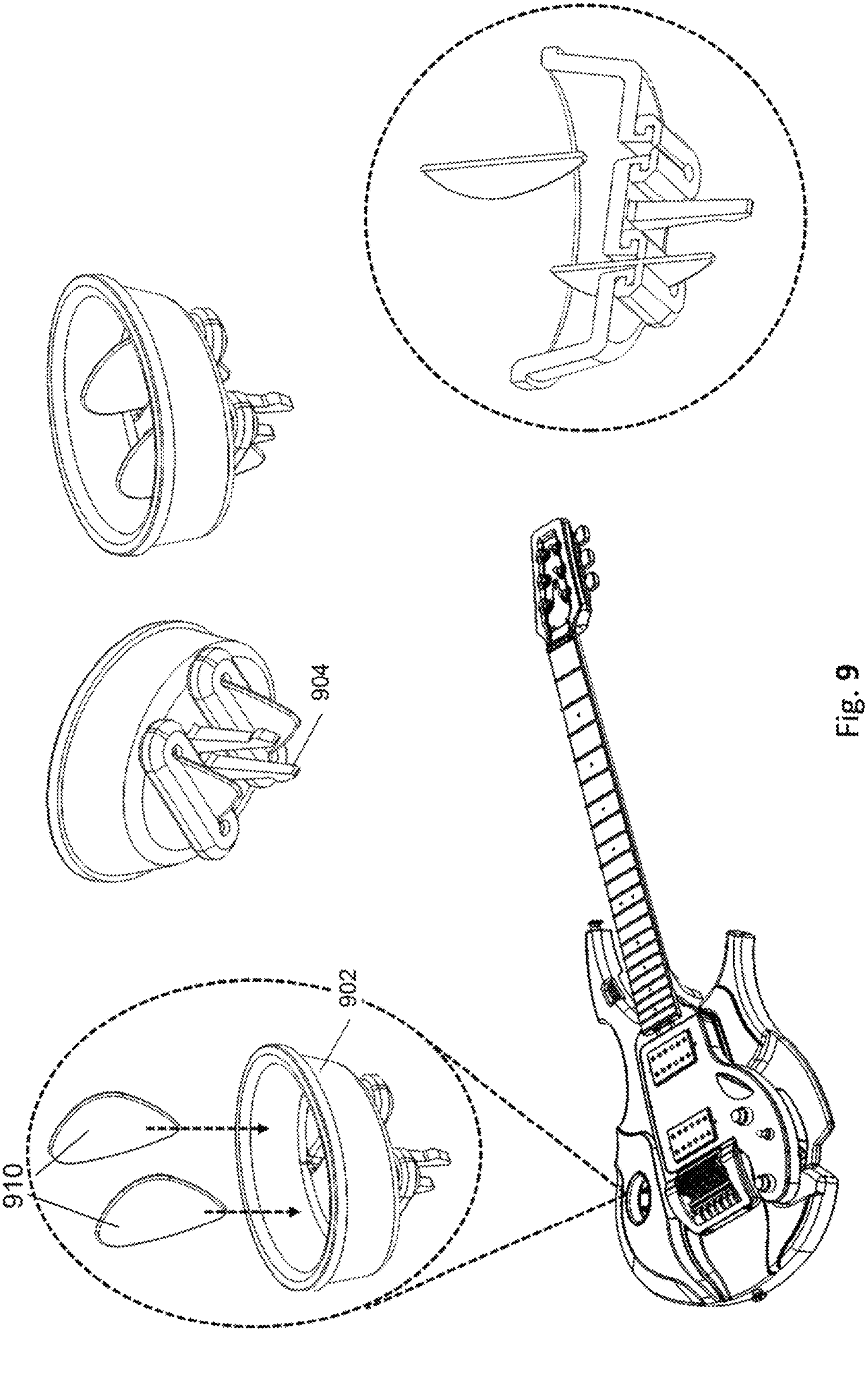
FIG. 9 schematically depicts some details of a modular guitar installed with a plectrum/pick case or housing, according to some embodiments of the current disclosure.

FIG. 9 schematically depicts some details of a modular guitar installed with a plectrum (pick) case or housing, according to some embodiments of the current disclosure. According to some embodiments, the modular guitar may comprise a case or housing 902 for holding at least one plectrum within, such as plectrum 910. In some embodiments, plectrum case 902 may be connected or attached to the modular guitar body 102 via various attachment means, for example via snaps 904, though any other attachment mean may be implemented. In some embodiments, plectrum case 902 may be disconnected from body 102 in order to enable using the space within body 102 for holding other components besides plectrums, e.g., plectrum 910. It also enables to clean the cavity of pick case 902 located on the guitar body 102, once the pick case 902 is disconnected from guitar body 102. Plectrum/pick case 902 may have different shapes and sizes, as per design choice.

Figure 10A:
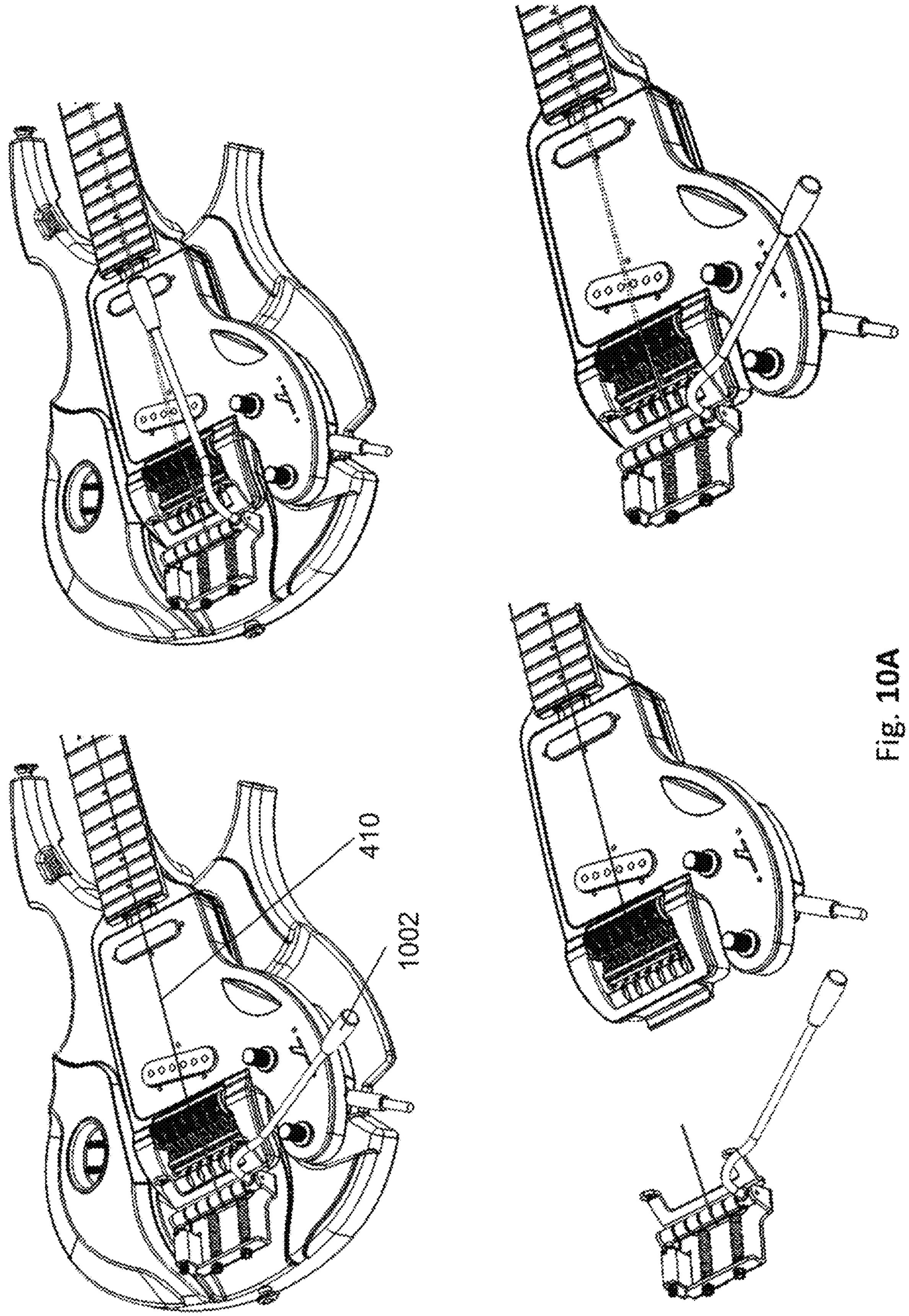
FIG. 10A schematically depicts some details of a modular guitar installed with a tremolo arm, according, to some embodiments of the current disclosure.

FIG. 10A schematically depicts some details of a modular guitar installed with a tremolo arm, according to some embodiments of the current disclosure. According to some embodiments, a modular guitar may comprise a tremolo arm or Whammy Bar 1002, which may be easily connected to the modular guitar in order to change tension of all of strings 410 altogether. The tremolo arm 1002 may be turned in order to tighten or loosen the tension of strings 410, thus enabling control of the length of the sound produced by strings 410.

Figure 10B:
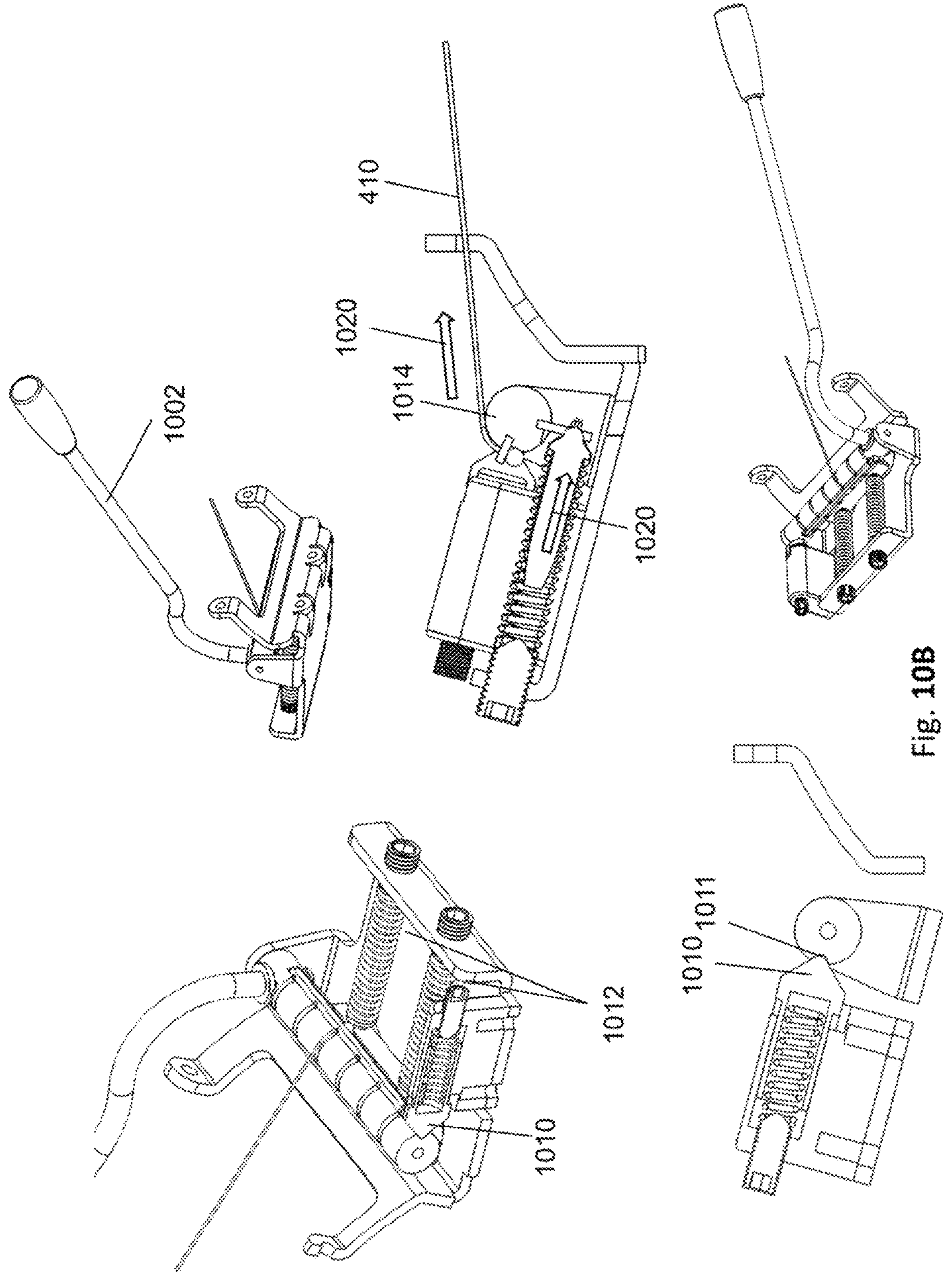
FIG. 10B schematically depicts some details of the tremolo arm, according to some embodiments of the current disclosure.

FIG. 10B schematically depicts some details of the tremolo arm, according to some embodiments of the current disclosure. In some embodiments, tremolo arm 1002 is connected to a notch 1010, which supports springs 101 and is configured to maintain a neutral stable state of the strings, which is not possible to accomplish using springs 1012 alone. As illustrated in FIG. 10B, the notch 1010 is held within a slot 1011 (in this example slot 1011 is in the shape of a triangle, though other shapes are possible), such that strength should be applied in order to remove notch 1010 from slot 1011, thereby getting the notch 1010 out of balance, i.e., out of its stable neutral state.

Figure 10C:
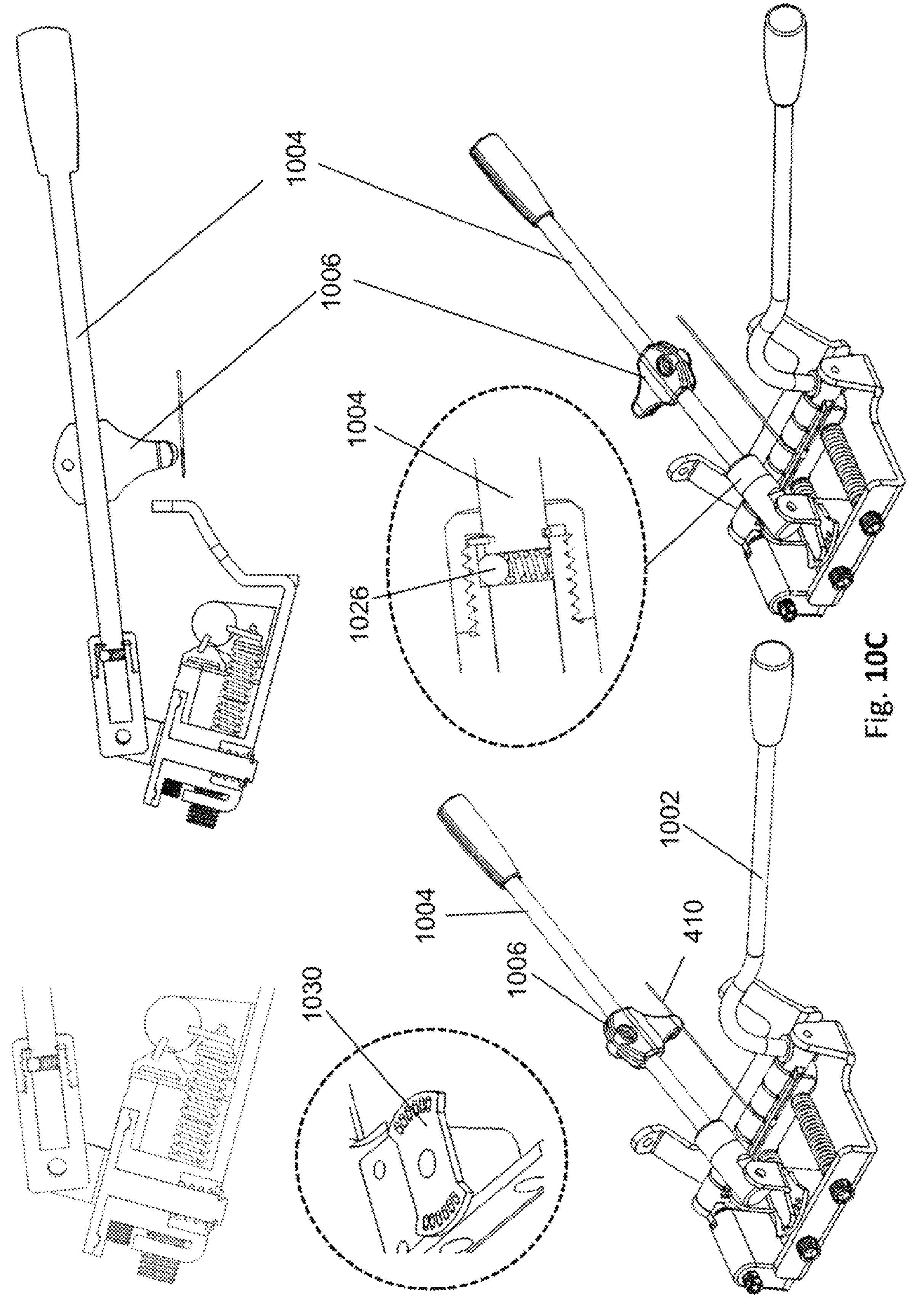
FIG. 10C schematically depicts some details of a tremolo arm installed on a modular guitar further including an additional arm with a single string catch, according to some embodiments of the current disclosure.

In some embodiments, a string, such as string 410 may be wrapped around cylinder 1014, while the tension of the string (times six) should be balanced by the tight springs 1012. A balanced system is depicted by arrows 1020, which means the system is in neutral state, and all springs are properly tensed. Lowering tremolo arm 1002 or lifting tremolo arm 1002 may thus cause great acoustic effect during operation (playing) of the guitar, enabling control of the length of the sound produced by strings 410. FIG. 10C schematically depicts some details of a tremolo installed on a modular guitar further including an additional arm with a single string catch, according to some embodiments of the current disclosure. According to some embodiments, in addition to a tremolo arm 1002, a modular guitar may further comprise arm or handle 1004, which ma comprise catch 1006 for holding a single string 410. That is, in some embodiments, it may be possible to easily adjust the tension of a single string 410 and not of all strings 410 together. Single string catch 1006 may be positioned such to catch a single string at a time, in order to adjust its tension, independently of any of the other strings, which tension may be adjusted together via operation of tremolo arm 1002.

In some embodiments, arm 1004 along with catch 1006 may change positions—in one position (left side of the figure) arm 1004 is turned or twisted such that catch 1006 is directed towards the string, e.g., string 410, i.e., arm 1004 is in activated state, while in a second position (right side or the figure) arm 1004 along with catch 1006 are directed away from the string, i.e., in idle state, when the arm is twisted or turned a quarter of a full 360 degrees turn.

In some embodiments, in order to maintain arm 1004 in position without spontaneous change, after arm 1004 is turned (for example, from idle state to activated state or vice versa), a small sphere 1026 supported by a spring may be used such that sphere 1026 would enter a hole or slot preventing further movement of arm 1004. Once a user wishes to manually change position of arm 1004, he may apply enough force to remove sphere 1026 from its hole, and twist or turn arm 1004 until a new position is determined for arm 1004.

In some embodiments, in order to enable arm 1004 and thus catch 1006 to skip from one string to the next, in order to control either of the strings tension, arm 1004 may be placed over a notched turret 1030, which may force arm 1004 to point to the desired string according to the desire of the guitar's user/player.

Figure 11:
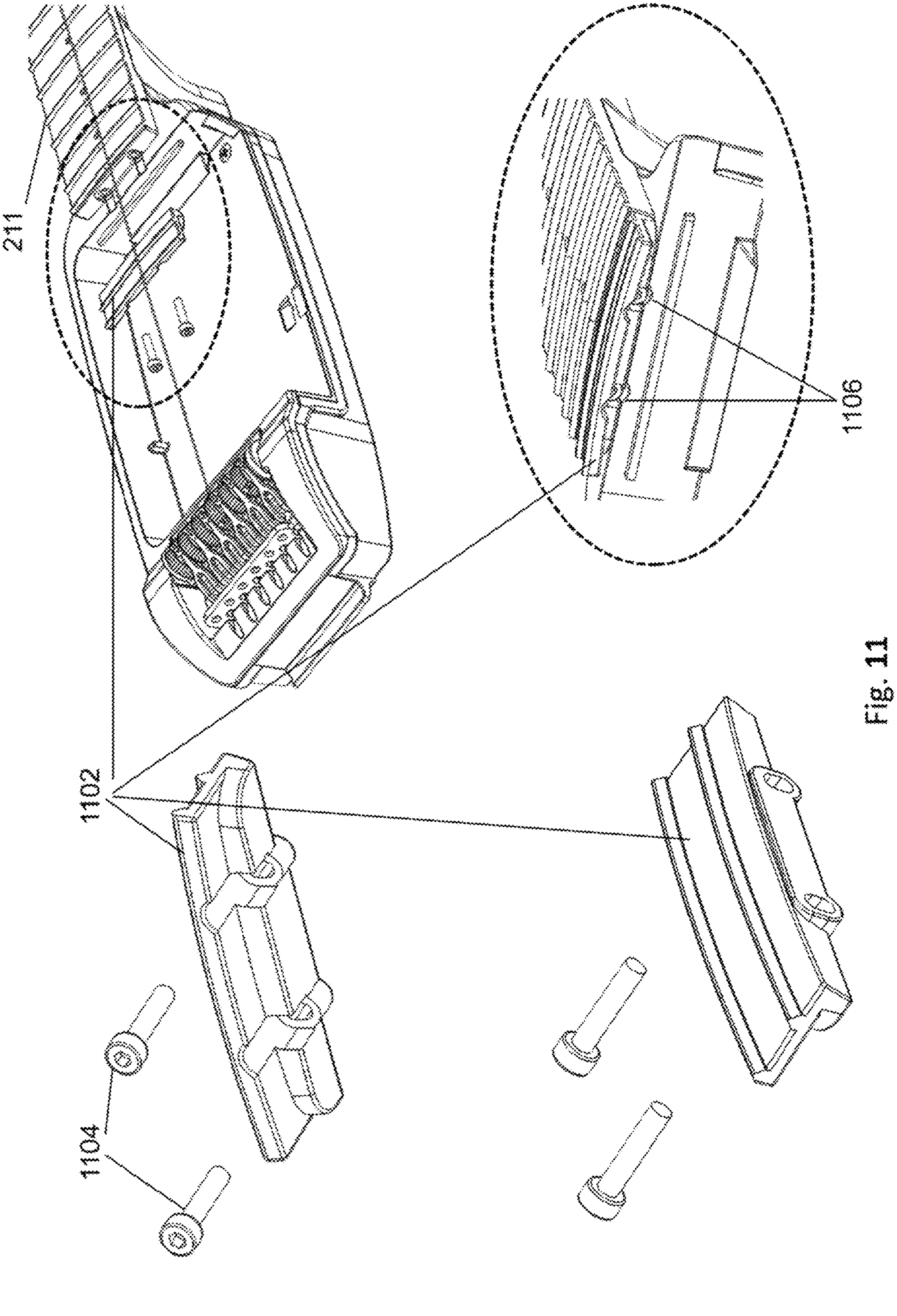
FIG. 11 schematically depicts a modular fret extension to be installed onto a guitar core, according to some embodiments of the current disclosure.

FIG. 11 schematically depicts a modular fret extension to be installed onto a guitar core, according to some embodiments of the current disclosure. In some embodiments, a modular guitar as described in the present disclosure, may comprise a modular fret extension 1102, which may be attached to fret board 211 such to add two or more frets to those frets that are part of fret hoard 211. For example, in case fret board 211 comprises 22 frets, fret extension 1102 may comprise two additional frets nos. 23 and 24 such to allow the user/player to play two whole octaves via the modular guitar. Fret extension 1102 may be connected to fret board 211 using one or more screws 1104 or other connecting means, which may be easily handled by any user, not requiring any special skill or tools. In some embodiments, fret board 211 may comprise inserts 1106 that may be configured to receive such connecting means, e.g., screws. Fret extension 1102 may be made of a metal material, e.g., Aluminum, brass, stainless steel, ZAMAK, and so on. In some embodiments, fret extension 1102 may be made of plastic, though it should be a rigid plastic to provide strength and mass to fret extension 1102 that is only connected to fret board 211 via connecting means 1104, and is in some way held in air. Any known manufacturing technology related to metal or plastic manufacturing may be implemented in order to produce fret extension 1102.

FIGS. 12A to 12D schematically depict a modular guitar installed with a Quick Release Locking System, according to some embodiments of the current disclosure.

Figure 12A:
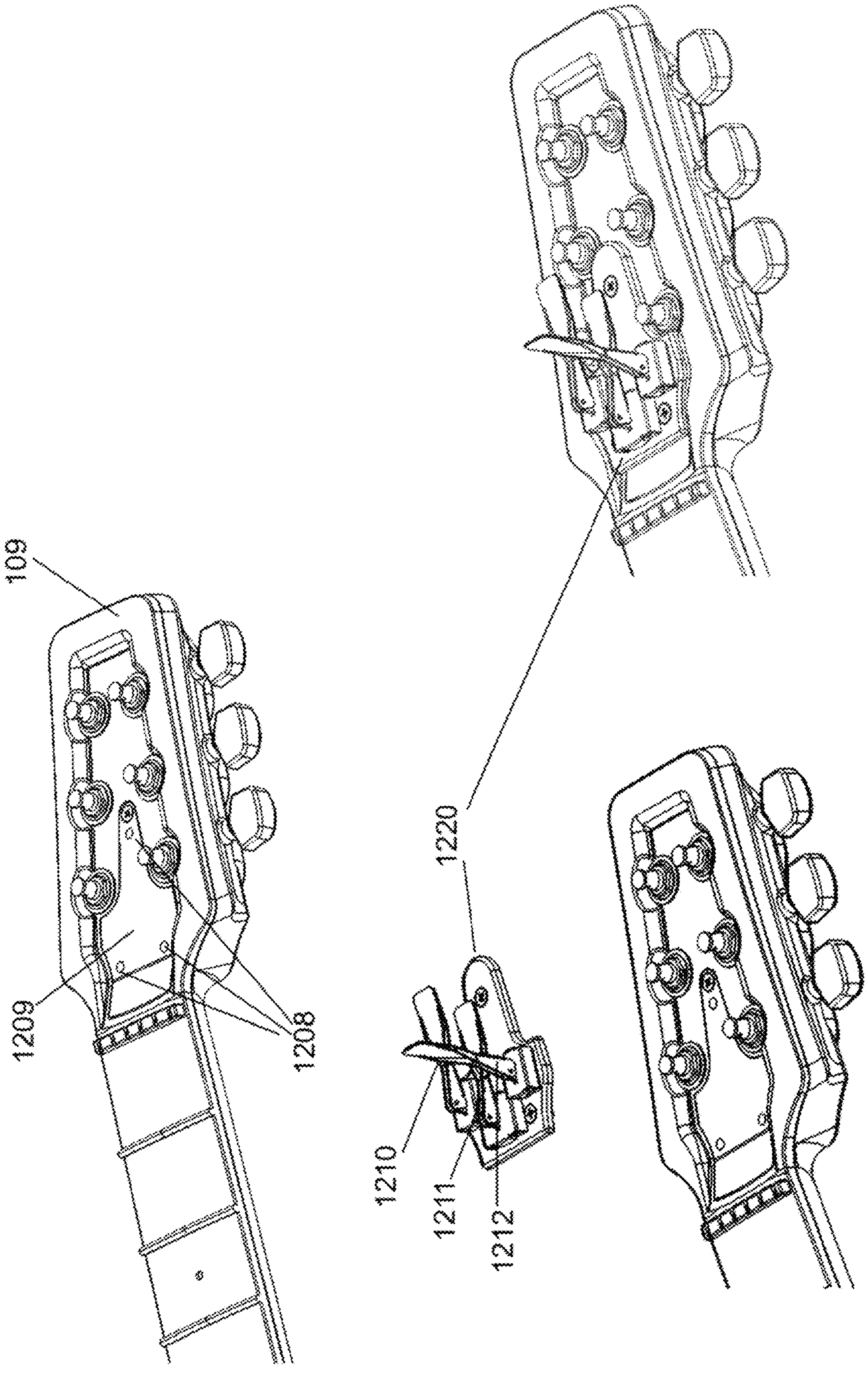
FIGS. 12A to 12D schematically depict a modular guitar installed with a Quick Release Locking System, according to some embodiments of the current disclosure.

FIG. 12A schematically depicts a modular guitar before and after installation of a Quick Release Locking System, according to some embodiments of the current disclosure. In some embodiments, guitar head 109 may comprise a plate 1209, which may be made of stainless steel, comprising several holes, e.g., three holes 1208. Plate 1209 may be attached to a modular guitar in order to enable a quick and easy attachment of Quick Release Locking System 1220 to guitar head 109. Holes 1208 are configured to have inserted connecting means, such as screws to hold Quick Release Locking System 1220 onto guitar head 109. The purpose of Quick Release Locking System 1220 under the context of using a tremolo system, is to quickly lock or release the strings in the state they are adjusted to at the moment of applying Quick Release Locking System 1220, preventing the ability to change adjustment any further.

Typically, guitar strings adjustment is enabled as a result of many strong vibrations of the strings. Tuning machines are usually worm gear and worm drive mechanisms, therefore these are built well and precisely, they are stable and not easy to release. However, when using a tremolo (Whammy Bar), strong pulling and releasing forces are applied onto the strings, which may cause the tuning to change unintentionally. One solution for overcoming this problem is using a locking system. The uniqueness of Quick Release Locking System 1220 is that it is modular and may be assembled and disassembled by any user without any special skill or tools, by merely placing connecting means through the Quick Release Locking System 1220 and the guitar plate 1209. As opposed to current locking systems, which are based on a screw above a plate holding a pair of strings, which may be released via using an Allen key, or which are assembled using wooden screws into the wooden head of neck of the guitar, which may cause unrepairable damage to the guitar, Quick Release Locking System 1220 is easy and quick to operate by any layman.

Figure 12B:
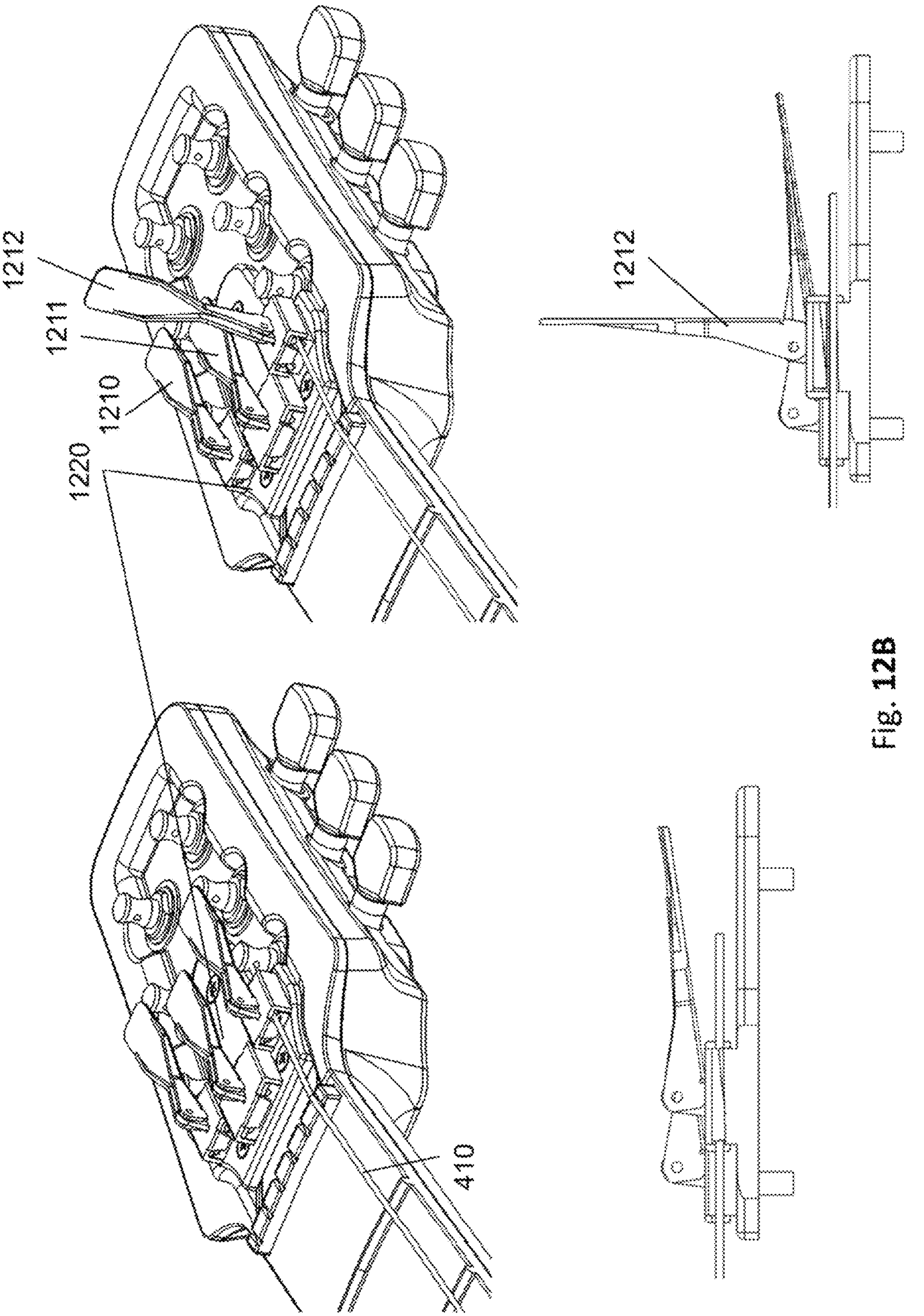

FIG. 12B schematically depicts a modular guitar installed with a Quick Release Locking System, when the entire Quick Release Locking System is locked and when one of the handles is in open state, according to some embodiments of the current disclosure. In some embodiments, Quick Release Locking System 1220 comprises three handles 1210, 1211, and 1212. On the left side of FIG. 12B is a Quick Release Locking System 1220 with all handles in locked state, while on the right side of FIG. 12B Quick Release Locking System 1220 is with one handle 1212 in open state. Each of the handles 1210, 1211, and 1212 holds two strings 410 when the corresponding handle is in locked state. The width of the strings is different between the strings, thus each handle is typically configured to hold two strings and not more, to ensure both strings are properly held by each handle. Trying to hold more than two strings via one handle might not prove efficient since one or more of the three or more strings might not be properly caught by each handle, due to the handles' flat shape.

Figure 12C:
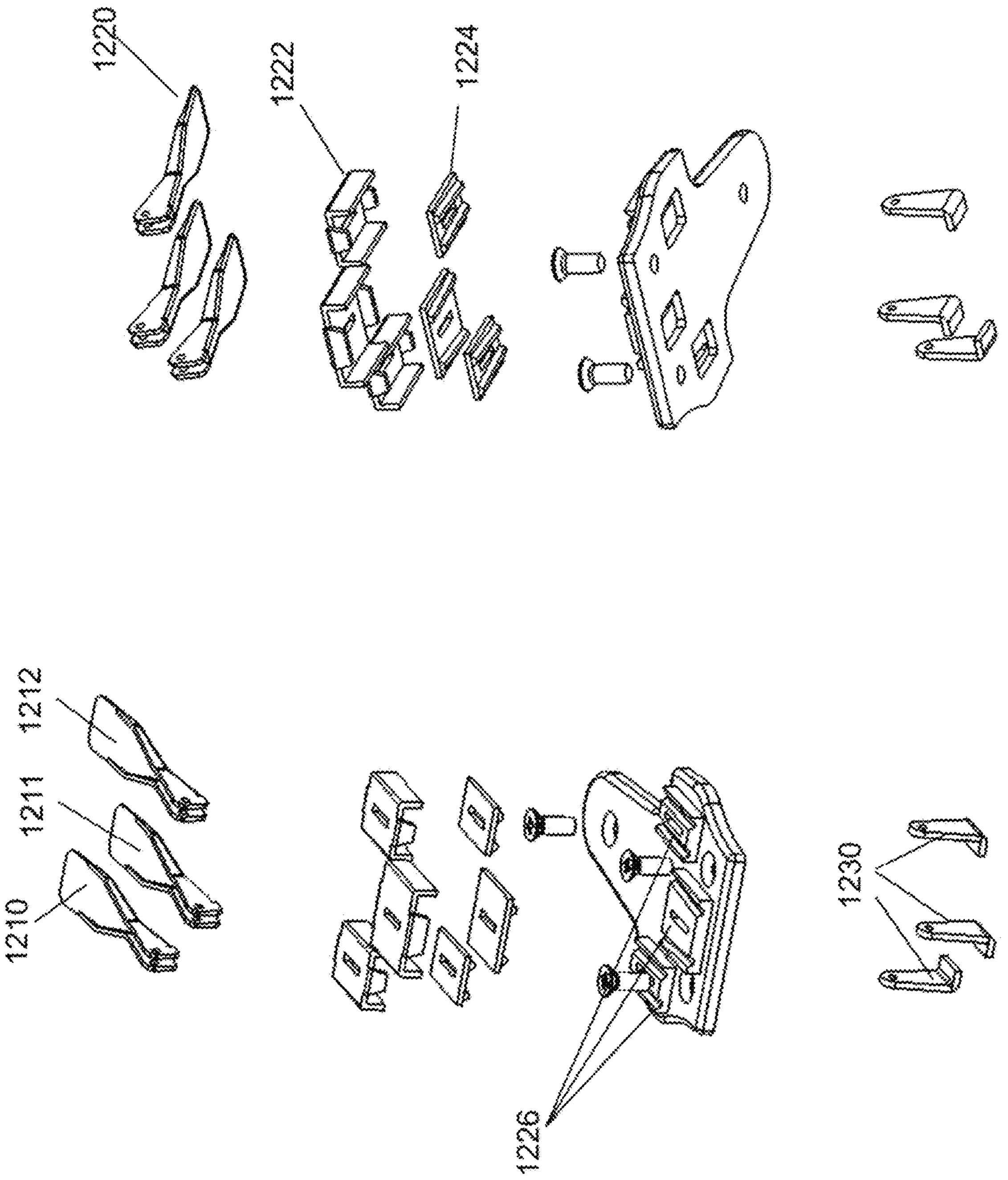

FIG. 12C schematically depicts an exploded view of a modular guitar installed with a Quick Release Locking System, according to some embodiments of the current disclosure. In some embodiments, Quick Release Locking System 1220 comprises handles 1210, 1211 and 1212 with a U shape on the upper side and plates with slots on the bottom side. In some embodiments, Quick Release Locking System 1220 may comprise several catchers 1230. When the system is assembled, the handles may be attached to these catchers 1230 via corresponding pins, which may act as the hinge of each handle.

In some embodiments, handles 1210, 1211 and 1212 may comprise eccentric levers 1220. Handles 1210, 1211 and 1212 may be connected to metal saddles 1222, which may comprise high friction-half rigid plastic liner 1224, located under each saddle 1222. In some embodiments, saddles 1222 may be connected to double String cradles 1226.

Figure 12D:
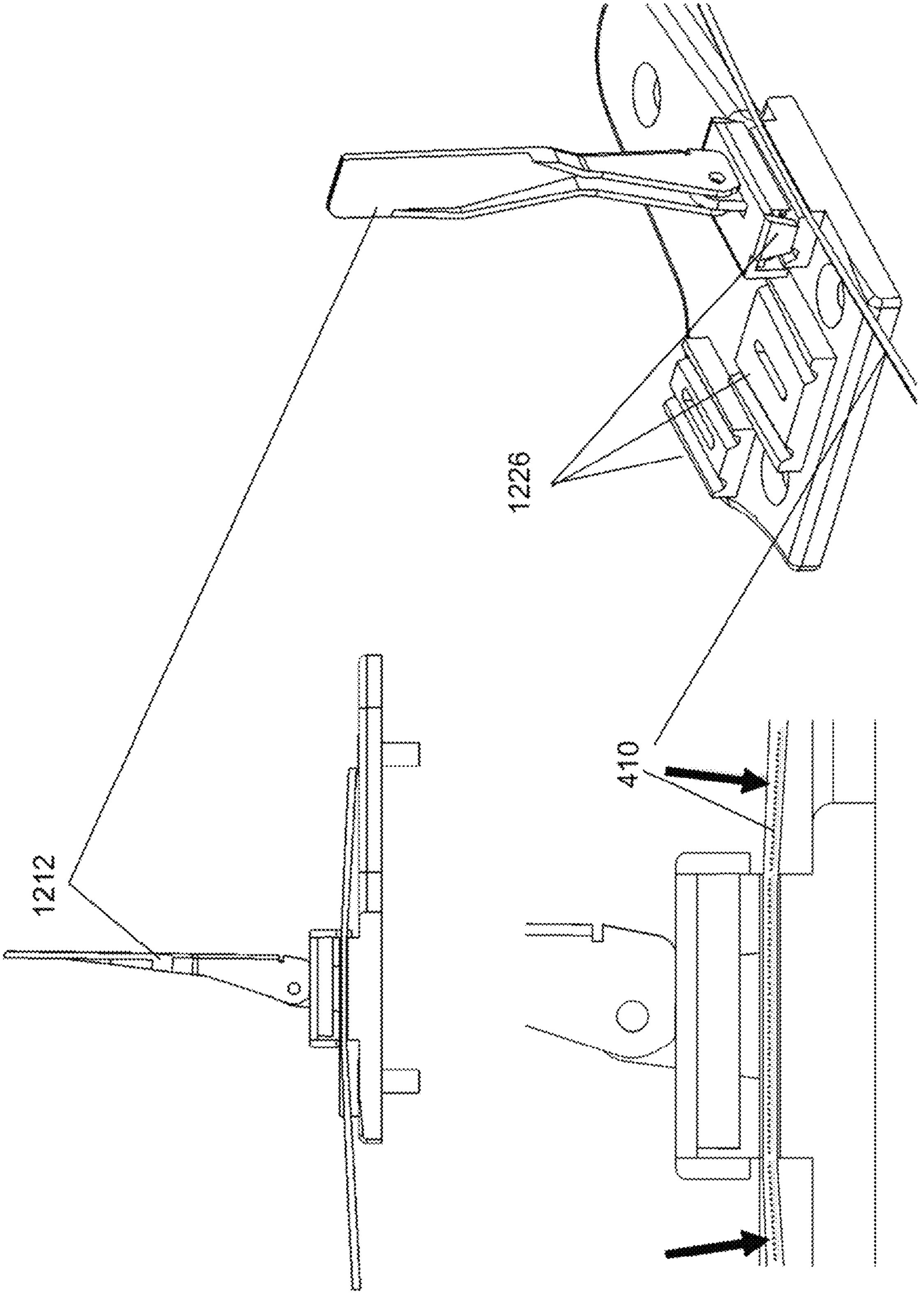

FIG. 12D schematically depicts a modular guitar installed with a Quick Release Locking System illustrating the angle at which a string is inserted into the Quick Release Locking System, according to some embodiments of the current disclosure. In some embodiments, the angle at which a string 410 enters and exits Quick Release Locking System 1220, specifically, the angle at which a string 410 enters and exits a handle of Quick Release Locking System 1220 is acoustically important. A slight angle of one or two degrees off the Quick Release Locking System 1220 of a string in entry to and exit of the handle is important for preventing vibrations. Without such an angle, the string may go into a vibrating or resonance state and begin to produce a humming sound.

It should be noted that this breaking angle of the strings 410 is quite small compared to the breaking angle occurring on the toothed bridge (known as 'nut' in the industry) separating between the head 109 and the guitar neck section 108, where there is a bending angle of 10 degrees with respect to the neck section 108. The Quick Release Locking System 1220 should be designed such that the strings enter the system and exit the system in an angle bending downwards (to avoid undesired humming of the string), below the level of the neck section 108. That is, the height and angle of Quick Release Locking System 1220 may be adjusted in order to provide the proper bending angle.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub combination.

Although the disclosure has been described in conjunction with specific embodiments thereof, it is evident that many alternatives, modifications and variations will be apparent to those skilled in the art. Accordingly, it is intended to embrace all such alternatives, modifications and variations that fail within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure.

The invention claimed is:

1. A modular string instrument comprising:

a core string instrument comprising:
- a core shell forming a basic shape of the core string instrument;
- a string instrument head connected to the core shell on a proximal end of the core shell;
- a neck base connected to the core shell on a distal end of the core shell;
- a neck section connecting between the string instrument head and the neck base;
- a chassis assembly configured to be inserted into the core shell, extending from the string instrument head to the neck base, said chassis comprising a strings anchoring bridge at the distal end of the chassis assembly to be positioned at the neck base;
- a plastic fret board and plastic frets that are an integral part of the plastic fret board, said fret board configured to cover the core shell and to encase the chassis assembly within the core shell;

a neck base cover configured to be attached to the neck base;

a pickup cassette bay configured to encase an interchangeable pickup cassette; and strings stretched from the strings anchoring bridge over the pickup cassette bay, over the neck base to the string instrument head, wherein the chassis is made of metal and the neck section is filled with liquid resin to hold the chassis assembly in place, to provide the core string instrument additional rigidity and weight, and prevent resonances and rattling of the components of the modular string instrument.

2. The modular string instrument of claim 1, wherein the core shell is made of plastic.

3. The modular string instrument of claim 1, wherein said core string instrument is configured to enable easy assembly or disassembly of the core string instrument into or out of different interchangeable string instrument body types without the need for special tools.

4. The modular string instrument of claim 3, wherein at least one elastomeric pillow is configured to prevent rattling between said core string instrument and said different interchangeable string instrument body types by the at least one elastomeric pillow being pressed between the different interchangeable string instrument body types and a floor of the neck base.

5. The modular string instrument of claim 1, wherein said pickup cassette bay is configured to enable easy insertion or extraction of different interchangeable pickup cassettes into or out of the pickup cassette bay below the strings without disengaging the strings, and without the need for special tools, wherein the pickup cassette bay comprises an opening through which the pickup cassette slides into the pickup cassette bay.

6. The modular string instrument of claim 1, wherein the strings anchoring bridge is configured to enable easy adjustment of the Action and Intonation of individual strings without using special tools.

7. The modular string instrument of claim 1, further comprising a retractable kickstand to enable the modular string instrument to securely stand on the floor when not in use.

8. The modular string instrument of claim 1, further comprising elastomeric pillows or rubber ends to suppress rattling of its components while in use.

9. The modular string instrument of claim 1, said strings anchoring bridge comprising:

an intonation comb comprising a plurality of leg members each connected to one of a plurality of string cradles; and an actuator assembly comprising a plurality of action wheels each comprising an eccentric axis, said plurality of action wheels are able to rotate such that each action wheel causes the end of each leg member to move up or down, and thus to cause a corresponding string to move up or down, thereby to control action of the modular string instrument.

10. The modular string instrument of claim 9, wherein the intonation comb is selected from different intonation combs each having different lengths of leg members and different heights of the string cradles in order to change the intonation of the modular string instrument.

11. The modular string instrument of claim 9, wherein each of the action wheels is inserted into a wheel cradle, each wheel cradle comprising striation interlock with bump lines on a bottom side of each wheel cradle, to avoid undesired spinning of each action wheel within a corresponding wheel cradle.

12. The modular string instrument of claim 9, wherein each of the plurality of leg members comprises a screw, wherein turning of the screw causes a corresponding leg member to move forward or backwards, thereby to control intonation of the modular string instrument.

13. The modular string instrument of claim 1, wherein said pickup cassette bay comprises a releaser button to be pushed before a pickup cassette is to be removed, and at least one elastomeric pillow configured to prevent buzzing and to create an ejection effect pushing a pickup cassette out of the pickup cassette bay once the releaser button is pressed.

14. The modular string instrument of claim 1, wherein the chassis assembly comprises ribs held together on one end via the string instrument head and held together on the opposite end via the strings anchoring bridge.

15. The modular string instrument of claim 14, wherein liquid resin is inserted into gaps between the ribs, the fret board and the core shell for holding the chassis assembly in place, providing the core string instrument additional rigidity and weight, and preventing resonances and rattling of the components of the modular string instrument.

* * * * *